(12) United States Patent
Fisher et al.

(10) Patent No.: US 10,474,992 B2
(45) Date of Patent: Nov. 12, 2019

(54) MACHINE LEARNING-BASED SUBJECT TRACKING

(71) Applicant: STANDARD COGNITION, CORP, San Francisco, CA (US)

(72) Inventors: Jordan E. Fisher, San Francisco, CA (US); Daniel L. Fischetti, San Francisco, CA (US); Brandon L. Ogle, San Francisco, CA (US); John F. Novak, San Francisco, CA (US); Kyle E. Dorman, San Francisco, CA (US); Kenneth S. Kihara, San Jose, CA (US); Juan C. Lasheras, San Francisco, CA (US)

(73) Assignee: Standard Cognition, Corp., San Francisco, CA (US)

( * ) Notice: Subject to any disclaimer, the term of this patent is extended or adjusted under 35 U.S.C. 154(b) by 0 days.

(21) Appl. No.: 16/256,358

(22) Filed: Jan. 24, 2019

(65) Prior Publication Data

US 2019/0156274 A1  May 23, 2019

Related U.S. Application Data

(63) Continuation of application No. 15/945,473, filed on Apr. 4, 2018, which is a continuation-in-part of
(Continued)

(51) Int. Cl.
*G06Q 10/08* (2012.01)
*G06N 3/04* (2006.01)
(Continued)

(52) U.S. Cl.
CPC ....... *G06Q 10/087* (2013.01); *G06K 9/00335* (2013.01); *G06K 9/00771* (2013.01);
(Continued)

(58) Field of Classification Search
CPC ............ G06K 9/00335; G06K 9/00771; G06T 7/194; G06T 2207/10016;
(Continued)

(56) References Cited

U.S. PATENT DOCUMENTS 6,154,559 A   11/2000   Beardsley
7,050,624 B2   5/2006   Dialameh et al.
(Continued)

FOREIGN PATENT DOCUMENTS

CN   104778690 B   6/2017
EP     1574986 B1   7/2008
(Continued)

OTHER PUBLICATIONS

Black et al., "Multi View Image Surveillance and Tracking," IEEE Proceedings of the Workshop on Motion and Video Computing, 2002, pp. 1-6.
(Continued)

*Primary Examiner* — Anner N Holder
(74) *Attorney, Agent, or Firm* — Haynes Beffel & Wolfeld LLP

(57) ABSTRACT

Systems and techniques are provided for tracking puts and takes of inventory items by subjects in an area of real space. A plurality of cameras with overlapping fields of view produce respective sequences of images of corresponding fields of view in the real space. In one embodiment, the system includes first image processors, including subject image recognition engines, receiving corresponding sequences of images from the plurality of cameras. The first image processors process images to identify subjects represented in the images in the corresponding sequences of images. The system includes second image processors, including background image recognition engines, receiving corresponding sequences of images from the plurality of
(Continued)

cameras. The second image processors mask the identified subjects to generate masked images. Following this, the second image processors process the masked images to identify and classify background changes represented in the images in the corresponding sequences of images.

30 Claims, 31 Drawing Sheets

Related U.S. Application Data application No. 15/907,112, filed on Feb. 27, 2018, now Pat. No. 10,133,933, which is a continuation-in-part of application No. 15/847,796, filed on Dec. 19, 2017, now Pat. No. 10,055,853.

(60) Provisional application No. 62/542,077, filed on Aug. 7, 2017.

(51) Int. Cl.
  *G06T 7/80* (2017.01)
  *G06T 7/194* (2017.01)
  *G06K 9/00* (2006.01)

(52) U.S. Cl.
  CPC .............. *G06N 3/04* (2013.01); *G06T 7/194* (2017.01); *G06T 7/85* (2017.01); *G06T 2207/10016* (2013.01); *G06T 2207/20084* (2013.01); *G06T 2207/30196* (2013.01)

(58) Field of Classification Search
  CPC  G06T 2207/20084; G06T 2207/30196; G06Q 10/087; G06N 3/04
  See application file for complete search history.

(56) References Cited

U.S. PATENT DOCUMENTS

| | | |
|---|---|---|
| 8,009,863 B1 | 8/2011 | Sharma et al. |
| 8,261,256 B1 | 9/2012 | Adler et al. |
| 8,577,705 B1 | 11/2013 | Baboo et al. |
| 8,624,725 B1 | 1/2014 | MacGregor |
| 9,036,028 B2 | 5/2015 | Buehler |
| 9,294,873 B1 | 3/2016 | MacGregor |
| 9,449,233 B2 | 9/2016 | Taylor |
| 9,489,623 B1 | 11/2016 | Sinyavskiy et al. |
| 9,536,177 B2 | 1/2017 | Chalasani et al. |
| 9,582,891 B2 | 2/2017 | Geiger et al. |
| 9,652,751 B2 | 5/2017 | Aaron et al. |
| 9,881,221 B2 | 1/2018 | Bala et al. |
| 9,911,290 B1 | 3/2018 | Zalewski et al. |
| 10,055,853 B1 | 8/2018 | Fisher et al. |
| 10,127,438 B1 | 11/2018 | Fisher et al. |
| 10,133,933 B1 | 11/2018 | Fisher et al. |
| 10,165,194 B1 | 12/2018 | Baldwin |
| 10,175,340 B1 | 1/2019 | Abari et al. |
| 10,210,737 B2 | 2/2019 | Zhao |
| 2003/0107649 A1 | 6/2003 | Flickner et al. |
| 2004/0099736 A1 | 5/2004 | Neumark |
| 2004/0131254 A1 | 7/2004 | Liang et al. |
| 2006/0132491 A1 | 6/2006 | Riach et al. |
| 2006/0279630 A1 | 12/2006 | Aggarwal et al. |
| 2007/0282665 A1 | 12/2007 | Buehler et al. |
| 2008/0159634 A1 | 7/2008 | Sharma et al. |
| 2008/0181507 A1 | 7/2008 | Gope et al. |
| 2008/0211915 A1 | 9/2008 | McCubbrey |
| 2008/0243614 A1 | 10/2008 | Tu et al. |
| 2009/0041297 A1 | 2/2009 | Zhang et al. |
| 2009/0057068 A1 | 3/2009 | Lin et al. |
| 2009/0083815 A1 | 3/2009 | McMaster et al. |
| 2009/0217315 A1 | 8/2009 | Malik et al. |
| 2010/0208941 A1 | 8/2010 | Broaddus et al. |
| 2010/0283860 A1 | 11/2010 | Nader |
| 2011/0317016 A1 | 12/2011 | Saeki et al. |
| 2011/0320322 A1 | 12/2011 | Roslak et al. |
| 2012/0159290 A1 | 6/2012 | Pulsipher et al. |
| 2012/0209749 A1 | 8/2012 | Hammad et al. |
| 2013/0011049 A1 | 1/2013 | Kimura |
| 2013/0076898 A1 | 3/2013 | Philippe et al. |
| 2013/0156260 A1 | 6/2013 | Craig |
| 2014/0168477 A1 | 6/2014 | David |
| 2014/0282162 A1 | 9/2014 | Fein et al. |
| 2015/0019391 A1 | 1/2015 | Kumar et al. |
| 2015/0026010 A1 | 1/2015 | Ellison |
| 2015/0039458 A1 | 2/2015 | Reid |
| 2015/0049914 A1 | 2/2015 | Alves |
| 2015/0206188 A1 | 7/2015 | Tanigawa et al. |
| 2015/0221094 A1 | 8/2015 | Marcheselli et al. |
| 2015/0262116 A1 | 9/2015 | Katircioglu et al. |
| 2015/0294397 A1 | 10/2015 | Croy et al. |
| 2015/0310459 A1 | 10/2015 | Bernal et al. |
| 2016/0125245 A1 | 5/2016 | Saitwal et al. |
| 2016/0171707 A1 | 6/2016 | Schwartz |
| 2016/0217417 A1 | 7/2016 | Ma et al. |
| 2016/0358145 A1 | 12/2016 | Montgomery |
| 2016/0381328 A1 | 12/2016 | Zhao |
| 2017/0068861 A1 | 3/2017 | Miller et al. |
| 2017/0116473 A1 | 4/2017 | Sashida et al. |
| 2017/0206669 A1 | 7/2017 | Saleemi et al. |
| 2017/0278255 A1 | 9/2017 | Shingu et al. |
| 2017/0309136 A1 | 10/2017 | Schoner |
| 2017/0323376 A1 | 11/2017 | Glaser et al. |
| 2018/0012072 A1 | 1/2018 | Glaser et al. |
| 2018/0012080 A1 | 1/2018 | Glaser et al. |
| 2018/0014382 A1 | 1/2018 | Glaser et al. |
| 2018/0025175 A1 | 1/2018 | Kato |
| 2018/0033015 A1 | 2/2018 | Opalka et al. |
| 2018/0070056 A1 | 3/2018 | DeAngelis et al. |
| 2018/0088900 A1 | 3/2018 | Glaser et al. |
| 2018/0150788 A1 | 5/2018 | Vepakomma et al. |
| 2018/0165728 A1 | 6/2018 | McDonald et al. |
| 2018/0225625 A1 | 8/2018 | DiFatta et al. |
| 2018/0232796 A1 | 8/2018 | Glaser et al. |
| 2018/0240180 A1 | 8/2018 | Glaser et al. |
| 2018/0329762 A1 | 11/2018 | Li et al. |
| 2018/0332235 A1 | 11/2018 | Glaser |
| 2018/0332236 A1 | 11/2018 | Glaser et al. |
| 2018/0343417 A1 | 11/2018 | Davey |
| 2018/0365755 A1 | 12/2018 | Bekbolatov et al. |
| 2018/0373928 A1 | 12/2018 | Glaser et al. |
| 2019/0005479 A1 | 1/2019 | Glaser et al. |
| 2019/0034735 A1* | 1/2019 | Cuban ............... G06K 9/00771 |

FOREIGN PATENT DOCUMENTS

| | | |
|---|---|---|
| JP | 2013196199 A | 9/2013 |
| JP | 201489626 A | 5/2014 |
| WO | 0021021 A1 | 4/2000 |
| WO | 02059836 A3 | 5/2003 |
| WO | 2008029159 A1 | 3/2008 |
| WO | 2017151241 A2 | 9/2017 |
| WO | 2017196822 A1 | 11/2017 |
| WO | 2018013438 A1 | 1/2018 |
| WO | 2018013439 A1 | 1/2018 |
| WO | 2018148613 A1 | 8/2018 |
| WO | 2018209156 A1 | 11/2018 |
| WO | 2018237210 A1 | 12/2018 |

OTHER PUBLICATIONS

Grinciunaite et al. "Human Pose Estimation in Space and Time Using 3D CNN," ECCV Workshop on Brave new ideas for motion representations in videos, Oct. 2016, 7 pages.

Harville, "Stereo person tracking with adaptive plan-view templates of height and occupancy statistics," Image and Vision Computing, vol. 22, Issue 2, Feb. 1, 2004, pp. 127-142.

He et al. "Identity mappings in deep residual networks" (published at https://arxiv.org/pdf/1603.05027.pdf), Jul. 25, 2016, 15 pages.

Huang, et al. "Driver's view and vehicle surround estimation using omnidirectional video stream," IEEE IV2003 Intelligent Vehicles

(56) References Cited

OTHER PUBLICATIONS

Symposium. Proceedings (Cat. No. 03TH8683), Jun. 9-11, 2003, pp. 444-449.
Longuet-Higgens, "A computer algorithm for reconstructing a scene from two projections," Nature 293, Sep. 10, 1981, pp. 133-135.
PCT/US2018/043933—International Search Report and Written Opinion dated Nov. 7, 2018, 12 pages.
PCT/US2018/043934—International Search Report and Written Opinion dated Feb. 1, 2019, 15 pages.
PCT/US2018/043937—International Search Report and Written Opinion dated Oct. 31, 2018, 17 pages.
PCT/US2018/043939—International Search Report and Written Opinion dated Jan. 2, 2019, 17 pages.
Redmon et al., "YOLO9000: Better, Faster, Stronger," (available at https://arxiv.org/pdf/1612.08242.pdf), Dec. 25, 2016, 9 pages.
Redmon et al., "You Only Look Once: Unified, Real-Time Object Detection," University of Washington, Allen Institute for Aly, Facebook AI Research, May 9, 2016, 10 pages.
Rossi et al., "Tracking and Counting Moving People," IEEE Int'l Conf. on Image Processing, ICIP-94, Nov. 13-16, 1994, 5 pages.
Toshev et al. "DeepPose: Human Pose Estimation via Deep Neural Networks," IEEE Conf. on Computer Vision and Pattern Recognition, Aug. 2014, 8 pages.
U.S. Notice of Allowance in U.S. Appl. No. 15/847,796 dated May 10, 2018, 8 pages.
U.S. Notice of Allowance in U.S. Appl. No. 15/907,112 dated Sep. 18, 2018, 7 pages.
U.S. Office Action in U.S. Appl. No. 15/907,112 dated Jun. 26, 2018, 11 pages.
U.S. Office Action in U.S. Appl. No. 15/945,466 dated Jul. 20, 2018, 12 pages.
U.S. Office Action in U.S. Appl. No. 16/255,573, dated Mar. 18, 2019, 27 pages.
U.S. Office Action in U.S. Appl. No. 16/256,904, dated Mar. 19, 2019, 15 pages.
U.S. Response to NFOA in U.S. Appl. No. 15/907,112 dated Jul. 25, 2018, 12 pages.
U.S. Response to NFOA in U.S. Appl. No. 15/945,466 dated Jul. 25, 2018, 12 pages.
U.S. Appl. No. 15/907,112—Notice of Allowance dated Sep. 18, 2018, 12 pages.
U.S. Appl. No. 15/945,466—Notice of Allowance dated Aug. 31, 2018, 7 pages.
Vincze, "Robust tracking of ellipses at frame rate," Pattern Recognition, vol. 34, Issue 2, Feb. 2001, pp. 487-498.
Zhang "A Flexible New Technique for Camera Calibration," IEEE Transactions on Pattern Analysis and Machine Intelligence, vol. 22, No. 11, Nov. 2000, 22pages.
U.S. Appl. No. 15/945,473—Office Action dated Jan. 24, 2019, 17 pages.
U.S. Office Action in U.S. Appl. No. 15/945,473 dated Aug. 8, 2018, 17 pages.
U.S. Appl. No. 16/256,904—Response to Office Action dated Mar. 19, 2019, 16 pages.
U.S. Appl. No. 16/256,361—Non-Final Office Action dated Apr. 4, 2019, 25 pages.
U.S. Appl. No. 15/945,473—Final Office Action dated Apr. 23, 2019, 9 pages.
U.S. Appl. No. 16/256,904—Office Action dated Mar. 19, 2019, 16 pages.
U.S. Appl. No. 16/256,936—Office Action dated May 16, 2019, 27 pages.
U.S. Appl. No. 15/945,473—Response to Final Office Action dated Apr. 23, 2019, 13 pages.
U.S. Appl. No. 16/256,355—Office Action dated Apr. 4, 2019, 29 pages.
U.S. Appl. No. 16/255,573—Office Action dated Mar. 18, 2019, 29 pages.
U.S. Appl. No. 16/255,573—Response to Office Action dated Mar. 18, 2019, 15 pages.

\* cited by examiner

600

```
Joint = {
    (x, y) position of joint,
    joint number (one of 19 possibilities, e.g., 1 = left-ankle, 2 = right-ankle),
    confidence number (describing how confident CNN is in its prediction),
    unique integer-ID for the joint
}
```

Joint data structure

```
Subject = {  Key   = frame_number
             Value = { Key   = camera_id
                       Value = Assigned joints to subject
                       [
                          [x of joint1, y of joint1, z of joint1],
                          [x of joint2, y of joint2, z of joint2],
                          ........
                          [x of joint18, y of joint18, z of joint18],
                       ]
                    }
          }
```

Subject Data Structure

FIG. 8 hand_region_collection.standard_store.2017-07-03T21.41.57.cam_4.frame_94600.region=117-245x370-498.person=3.item=68.png 2502, 2508, 2510, 2512, 2504, 2506

Example file name in training data for WhatCNN

FIG. 25

MACHINE LEARNING-BASED SUBJECT TRACKING

This application is a continuation of co-pending U.S. patent application Ser. No. 15/945,473 filed 4 Apr. 2018, which is a continuation-in-part of U.S. patent application Ser. No. 15/907,112 filed 27 Feb. 2018, now U.S. Pat. No. 10,133,933, which is a continuation-in-part of U.S. patent application Ser. No. 15/847,796, filed 19 Dec. 2017, now U.S. Pat. No. 10,055,853, which claims benefit of U.S. Provisional Patent Application No. 62/542,077, filed 7 Aug. 2017, which applications are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

REFERENCE TO COMPUTER PROGRAM LISTING APPENDIX

A computer program listing appendix (Copyright, Standard Cognition, Inc.) submitted electronically via the EFS-Web in ASCII text accompanies this application and is incorporated by reference. The name of the ASCII text file is "STCG_Computer_Program_Appx_annotated" created on 6 Mar. 2018 and is 22,606 bytes.

BACKGROUND

Field

The present invention relates to systems that identify and track puts and takes of items by subjects in real space.

Description of Related Art

A difficult problem in image processing arises when images from multiple cameras disposed over large spaces are used to identify and track actions of subjects.

Tracking actions of subjects within an area of real space, such as a people in a shopping store, present many technical challenges. For example, consider such an image processing system deployed in a shopping store with multiple customers moving in aisles between the shelves and open spaces within the shopping store. Customers take items from shelves and put those in their respective shopping carts or baskets. Customers may also put items on the shelf, if they do not want the item.

While the customers are performing these actions, different portions of customers and different portions of the shelves or other display configurations holding inventory of the store will be occluded in images from different cameras because of the presence of other customers, shelves, and product displays, etc. Also, there can be many customers in the store at any given time, making it difficult to identify and track individuals and their actions over time.

It is desirable to provide a system that can more effectively and automatically identify and track put and take actions of subjects in large spaces.

SUMMARY

A system, and method for operating a system, are provided for tracking changes by subjects, such as persons, in an area of real space using image processing. This function of tracking changes by image processing presents a complex problem of computer engineering, relating to the type of image data to be processed, what processing of the image data to perform, and how to determine actions from the image data with high reliability. The system described herein can perform these functions using only images from cameras disposed overhead in the real space, so that no retrofitting of store shelves and floor space with sensors and the like is required for deployment in a given setting.

A system and method are provided for tracking put and takes of inventory items by subjects in an area of real space including inventory display structures that comprise using a plurality of cameras disposed above the inventory display structures to produce respective sequences of images of inventory display structures in corresponding fields of view in the real space, the field of view of each camera overlapping with the field of view of at least one other camera in the plurality of cameras. Using these sequences of images, a system and method are described for detecting puts and takes of inventory items by identifying semantically significant changes in the sequences of images relating to inventory items on inventory display structures and associating the semantically significant changes with subjects represented in the sequences of images.

A system and method are provided for tracking put and takes of inventory items by subjects in an area of real space, that comprise using a plurality of cameras disposed above the inventory display structures to produce respective sequences of images of inventory display structures in corresponding fields of view in the real space, the field of view of each camera overlapping with the field of view of at least one other camera in the plurality of cameras. Using these sequences of images, a system and method are described for detecting puts and takes of inventory items by identifying gestures of subjects and inventory items associated with the gestures by processing foreground data in the sequences of images.

Also, a system and method are described that combines foreground processing and background processing in the same sequences of images. In this combined approach, the system and method provided include using these sequences of images for detecting puts and takes of inventory items by identifying gestures of subjects and inventory items associated with the gestures by processing foreground data in the sequences of images; and using these sequences of images for detecting puts and takes of inventory items by identifying semantically significant changes in the sequences of images relating to inventory items on inventory display structures by processing background data in the sequences of images, and associating the semantically significant changes with subjects represented in the sequences of images.

In an embodiment described herein, the system uses a plurality of cameras to produce respective sequences of images of corresponding fields of view in the real space. The field of view of each camera overlaps with the field of view of at least one other camera in the plurality of cameras. The system includes first image processors, including subject image recognition engines, receiving corresponding sequences of images from the plurality of cameras. The first images processors process images to identify subjects represented in the images in the corresponding sequences of images. The system further includes, second image processors, including background image recognition engines, receiving corresponding sequences of images from the plurality of cameras. The second image processors mask the identified subjects to generate masked images, and process the masked images to identify and classify background changes represented in the images in the corresponding sequences of images.

In one embodiment, the background image recognition engines comprise convolutional neural networks. The system includes logic to associate identified background changes with identified subjects.

In one embodiment, the second image processors include a background image store to store background images for corresponding sequences of images. The second image processors further include mask logic to process images in the sequences of images to replace foreground image data representing the identified subjects with background image data. The background image data is collected from the background images for the corresponding sequences of images to provide the masked images.

In one embodiment, the mask logic combines sets of N masked images in the sequences of images to generate sequences of factored images for each camera. The second image processors identify and classify background changes by processing the sequence of factored images.

In one embodiment, the second image processors include logic to produce change data structures for the corresponding sequences of images. The change data structures include coordinates in the masked images of identified background changes, identifiers of an inventory item subject of the identified background changes and classifications of the identified background changes. The second image processors further include coordination logic to process change data structures from sets of cameras having overlapping fields of view to locate the identified background changes in real space.

In one embodiment, the classifications of identified background changes in the change data structures indicate whether the identified inventory item has been added or removed relative to the background image.

In another embodiment, the classifications of identified background changes in the change data structures indicate whether the identified inventory item has been added or removed relative to the background image. The system further includes logic to associate background changes with identified subjects. Finally, the system includes the logic to make detections of takes of inventory items by the identified subjects and of puts of inventory items on inventory display structures by the identified subjects.

In another embodiment, the system includes logic to associate background changes with identified subjects. The system further includes the logic to make detections of takes of inventory items by the identified subjects and of puts of inventory items on inventory display structures by the identified subjects.

The system can include third image processors as described herein, including foreground image recognition engines, receiving corresponding sequences of images from the plurality of cameras. The third image processors process images to identify and classify foreground changes represented in the images in the corresponding sequences of images.

In a system including plural image recognition engines, such as both foreground and background image recognition engines, the system can make a first set of detections of takes of inventory items by the identified subjects and of puts of inventory items on inventory display structures by the identified subjects, and a second set of detections of takes of inventory items by the identified subjects and of puts of inventory items on inventory display structures by the identified subjects. Selection logic to process the first and second sets of detections can be used to generate log data structures. The log data structures include lists of inventory items for identified subjects.

In embodiments described herein, the sequences of images from cameras in the plurality of cameras are synchronized. The same cameras and the same sequences of images are used by both the foreground and background image processors in one preferred implementation. As a result, redundant detections of puts and takes of inventory items are made using the same input data allowing for high confidence, and high accuracy, in the resulting data.

In one technology described herein, the system comprises logic to detect puts and takes of inventory items by identifying gestures of subjects and inventory items associated with the gestures represented in the sequences of images. This can be done using foreground image recognition engines in coordination with subject image recognition engines as described herein.

In another technology described herein, the system comprises logic to detect puts and takes of inventory items by identifying semantically significant changes in inventory items on inventory display structures, such as shelves, over time and associating the semantically significant changes with subjects represented in the sequences of images. This can be done using background image recognition engines in coordination with subject image recognition engines as described herein.

In systems applying technology described herein, both gesture analysis and semantic difference analysis can be combined, and executed on the same sequences of synchronized images from an array of cameras.

Methods and computer program products which can be executed by computer systems are also described herein.

Other aspects and advantages of the present invention can be seen on review of the drawings, the detailed description and the claims, which follow.

BRIEF DESCRIPTION OF THE DRAWINGS

FIG. 6 shows an example data structure for storing joint information.

FIG. 8 shows an example data structure for storing a subject including the information of associated joints.

FIG. 19 is an illustration of a WhatCNN model in an embodiment of the system of FIG. 15a.

FIG. 20 is an illustration of a WhenCNN model in an embodiment of the system of FIG. 15a.

FIG. 25 is an example name of an image file stored as part of the training data set for a WhatCNN model.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

A system and various implementations of the subject technology is described with reference to FIGS. 1-28A/28B. The system and processes are described with reference to FIG. 1, an architectural level schematic of a system in accordance with an implementation. Because FIG. 1 is an architectural diagram, certain details are omitted to improve the clarity of the description.

Figure 1:
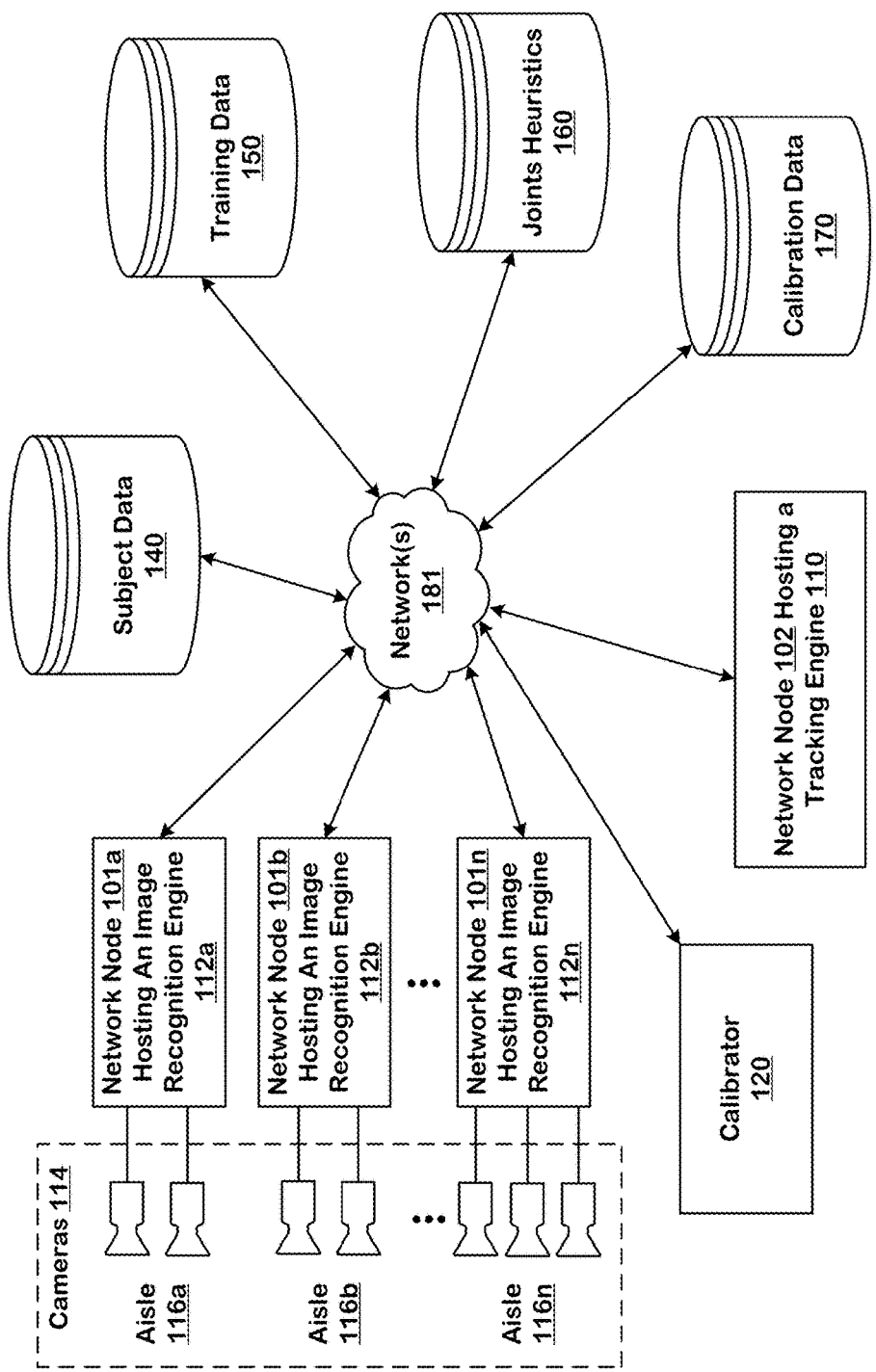
FIG. 1 illustrates an architectural level schematic of a system in which a tracking engine tracks subjects using joint data generated by image recognition engines.

The discussion of FIG. 1 is organized as follows. First, the elements of the system are described, followed by their interconnections. Then, the use of the elements in the system is described in greater detail.

FIG. 1 provides a block diagram level illustration of a system 100. The system 100 includes cameras 114, network nodes hosting image recognition engines 112a, 112b, and 112n, a tracking engine 110 deployed in a network node (or nodes) on the network, a calibrator 120, a subject database 140, a training database 150, a heuristics database 160 for joints heuristics, for put and take heuristics, and other heuristics for coordinating and combining the outputs of multiple image recognition engines as described below, a calibration database 170, and a communication network or networks 181. The network nodes can host only one image recognition engine, or several image recognition engines as described herein. The system can also include an inventory database and other supporting data.

As used herein, a network node is an addressable hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system. More than one virtual device configured as a network node can be implemented using a single physical device.

For the sake of clarity, only three network nodes hosting image recognition engines are shown in the system 100. However, any number of network nodes hosting image recognition engines can be connected to the tracking engine 110 through the network(s) 181. Also, an image recognition engine, a tracking engine and other processing engines described herein can execute using more than one network node in a distributed architecture.

The interconnection of the elements of system 100 will now be described. Network(s) 181 couples the network nodes 101a, 101b, and 101c, respectively, hosting image recognition engines 112a, 112b, and 112n, the network node 102 hosting the tracking engine 110, the calibrator 120, the subject database 140, the training database 150, the joints heuristics database 160, and the calibration database 170. Cameras 114 are connected to the tracking engine 110 through network nodes hosting image recognition engines 112a, 112b, and 112n. In one embodiment, the cameras 114 are installed in a shopping store (such as a supermarket) such that sets of cameras 114 (two or more) with overlapping fields of view are positioned over each aisle to capture images of real space in the store. In FIG. 1, two cameras are arranged over aisle 116a, two cameras are arranged over aisle 116b, and three cameras are arranged over aisle 116n. The cameras 114 are installed over aisles with overlapping fields of view. In such an embodiment, the cameras are configured with the goal that customers moving in the aisles of the shopping store are present in the field of view of two or more cameras at any moment in time.

Cameras 114 can be synchronized in time with each other, so that images are captured at the same time, or close in time, and at the same image capture rate. The cameras 114 can send respective continuous streams of images at a predetermined rate to network nodes hosting image recognition engines 112a-112n. Images captured in all the cameras covering an area of real space at the same time, or close in time, are synchronized in the sense that the synchronized images can be identified in the processing engines as representing different views of subjects having fixed positions in the real space. For example, in one embodiment, the cameras send image frames at the rates of 30 frames per second (fps) to respective network nodes hosting image recognition engines 112a-112n. Each frame has a timestamp, identity of the camera (abbreviated as "camera_id"), and a frame identity (abbreviated as "frame_id") along with the image data.

Cameras installed over an aisle are connected to respective image recognition engines. For example, in FIG. 1, the two cameras installed over the aisle 116a are connected to the network node 101a hosting an image recognition engine 112a. Likewise, the two cameras installed over aisle 116b are connected to the network node 101b hosting an image recognition engine 112b. Each image recognition engine 112a-112n hosted in a network node or nodes 101a-101n, separately processes the image frames received from one camera each in the illustrated example.

In one embodiment, each image recognition engine 112a, 112b, and 112n is implemented as a deep learning algorithm such as a convolutional neural network (abbreviated CNN). In such an embodiment, the CNN is trained using a training database 150. In an embodiment described herein, image recognition of subjects in the real space is based on identifying and grouping joints recognizable in the images, where the groups of joints can be attributed to an individual subject. For this joints based analysis, the training database 150 has a large collection of images for each of the different types of joints for subjects. In the example embodiment of a shopping store, the subjects are the customers moving in the aisles between the shelves. In an example embodiment, during training of the CNN, the system 100 is referred to as a "training system". After training the CNN using the training database 150, the CNN is switched to production mode to process images of customers in the shopping store in real time. In an example embodiment, during production, the system 100 is referred to as a runtime system (also referred to as an inference system). The CNN in each image recognition engine produces arrays of joints data structures for images in its respective stream of images. In an embodiment as described herein, an array of joints data structures is produced for each processed image, so that each image recognition engine 112a-112n produces an output stream of arrays of joints data structures. These arrays of joints data structures from cameras having overlapping fields of view are further processed to form groups of joints, and to identify such groups of joints as subjects.

The cameras 114 are calibrated before switching the CNN to production mode. The calibrator 120 calibrates the cameras and stores the calibration data in the calibration database 170.

The tracking engine 110, hosted on the network node 102, receives continuous streams of arrays of joints data structures for the subjects from image recognition engines 112a-112n. The tracking engine 110 processes the arrays of joints data structures and translates the coordinates of the elements in the arrays of joints data structures corresponding to images in different sequences into candidate joints having coordinates in the real space. For each set of synchronized images, the combination of candidate joints identified throughout the real space can be considered, for the purposes of analogy, to be like a galaxy of candidate joints. For each succeeding point in time, movement of the candidate joints is recorded so that the galaxy changes over time. The output of the tracking engine 110 is stored in the subject database 140.

The tracking engine 110 uses logic to identify groups or sets of candidate joints having coordinates in real space as subjects in the real space. For the purposes of analogy, each set of candidate points is like a constellation of candidate joints at each point in time. The constellations of candidate joints can move over time.

The logic to identify sets of candidate joints comprises heuristic functions based on physical relationships amongst joints of subjects in real space. These heuristic functions are used to identify sets of candidate joints as subjects. The heuristic functions are stored in heuristics database 160. The output of the tracking engine 110 is stored in the subject database 140. Thus, the sets of candidate joints comprise individual candidate joints that have relationships according to the heuristic parameters with other individual candidate joints and subsets of candidate joints in a given set that has been identified, or can be identified, as an individual subject.

The actual communication path through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™.

Camera Arrangement

The cameras 114 are arranged to track multi-joint entities (or subjects) in a three-dimensional (abbreviated as 3D) real space. In the example embodiment of the shopping store, the real space can include the area of the shopping store where items for sale are stacked in shelves. A point in the real space can be represented by an (x, y, z) coordinate system. Each point in the area of real space for which the system is deployed is covered by the fields of view of two or more cameras 114.

Figure 2:
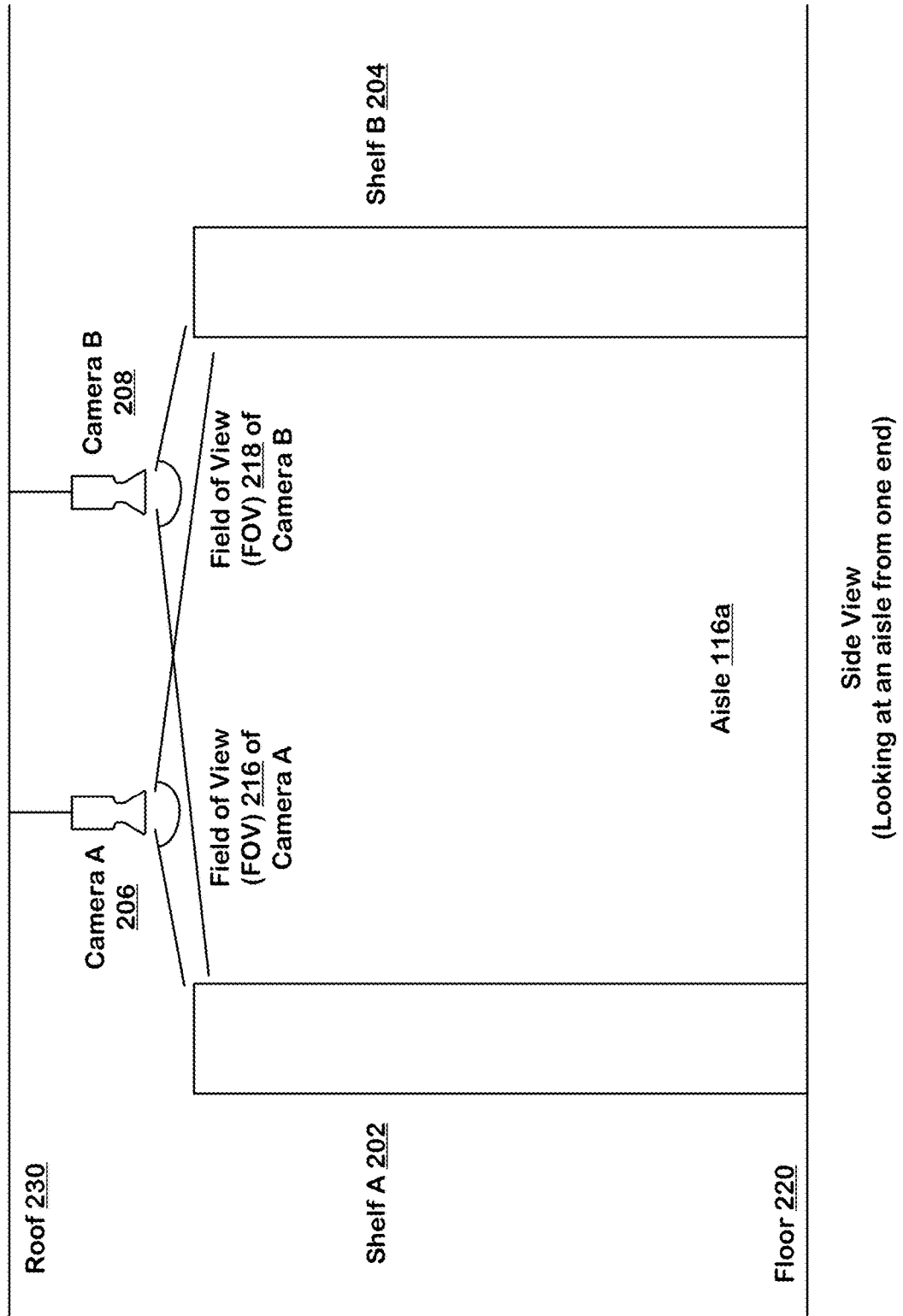
FIG. 2 is a side view of an aisle in a shopping store illustrating a camera arrangement.
Figure 13:
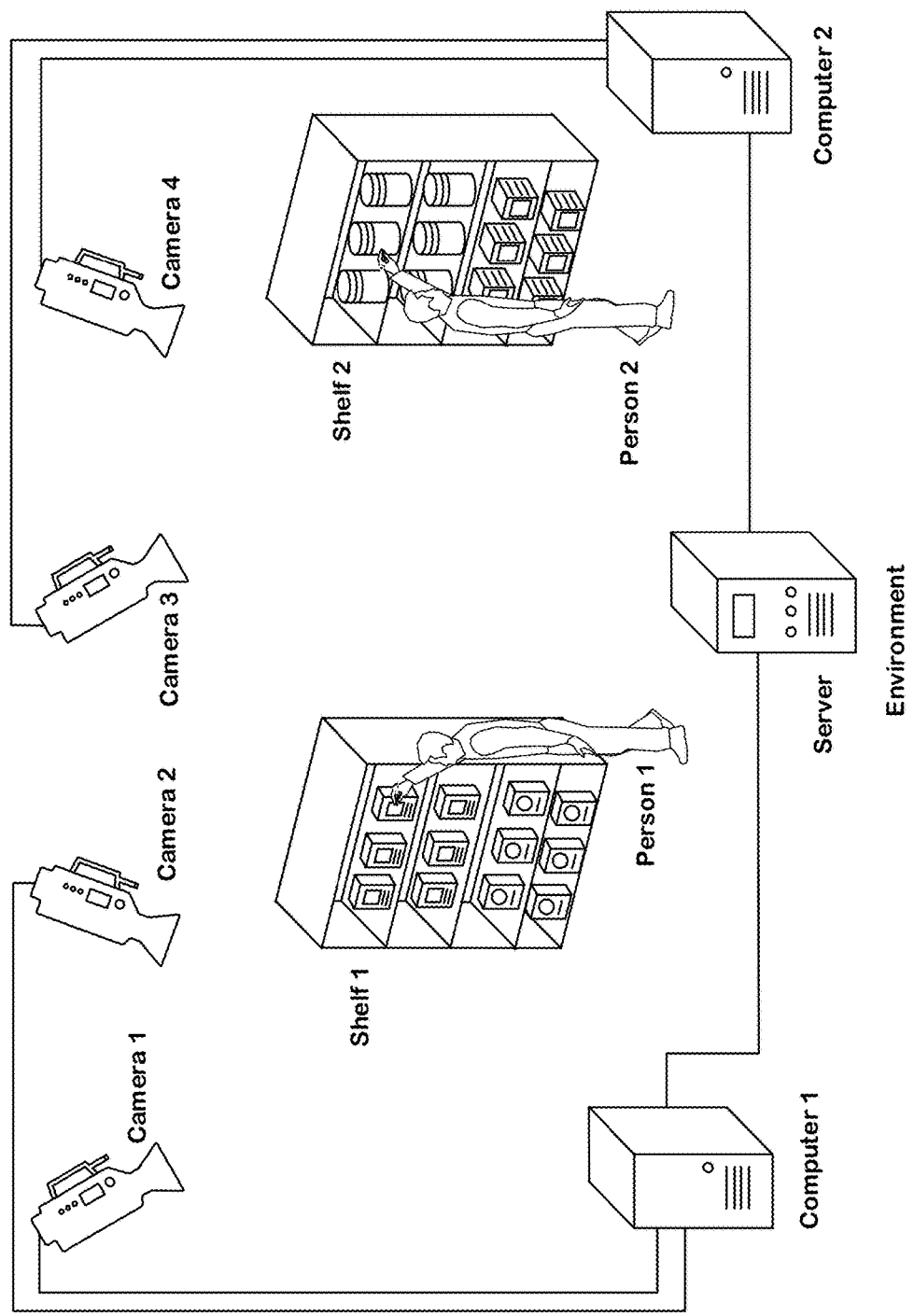
FIG. 13 is an illustration of an environment in which an embodiment of the system of FIG. 1 is used.

In a shopping store, the shelves and other inventory display structures can be arranged in a variety of manners, such as along the walls of the shopping store, or in rows forming aisles or a combination of the two arrangements. FIG. 2 shows an arrangement of shelves, forming an aisle 116a, viewed from one end of the aisle 116a. Two cameras, camera A 206 and camera B 208 are positioned over the aisle 116a at a predetermined distance from a roof 230 and a floor 220 of the shopping store above the inventory display structures such as shelves. The cameras 114 comprise cameras disposed over and having fields of view encompassing respective parts of the inventory display structures and floor area in the real space. The coordinates in real space of members of a set of candidate joints, identified as a subject, identify locations in the floor area of the subject. In the example embodiment of the shopping store, the real space can include all of the floor 220 in the shopping store from which inventory can be accessed. Cameras 114 are placed and oriented such that areas of the floor 220 and shelves can be seen by at least two cameras. The cameras 114 also cover at least part of the shelves 202 and 204 and floor space in front of the shelves 202 and 204. Camera angles are selected to have both steep perspective, straight down, and angled perspectives that give more full body images of the customers. In one example embodiment, the cameras 114 are configured at an eight (8) foot height or higher throughout the shopping store. FIG. 13 presents an illustration of such an embodiment.

In FIG. 2, the cameras 206 and 208 have overlapping fields of view, covering the space between a shelf A 202 and a shelf B 204 with overlapping fields of view 216 and 218, respectively. A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration.

Figure 3:
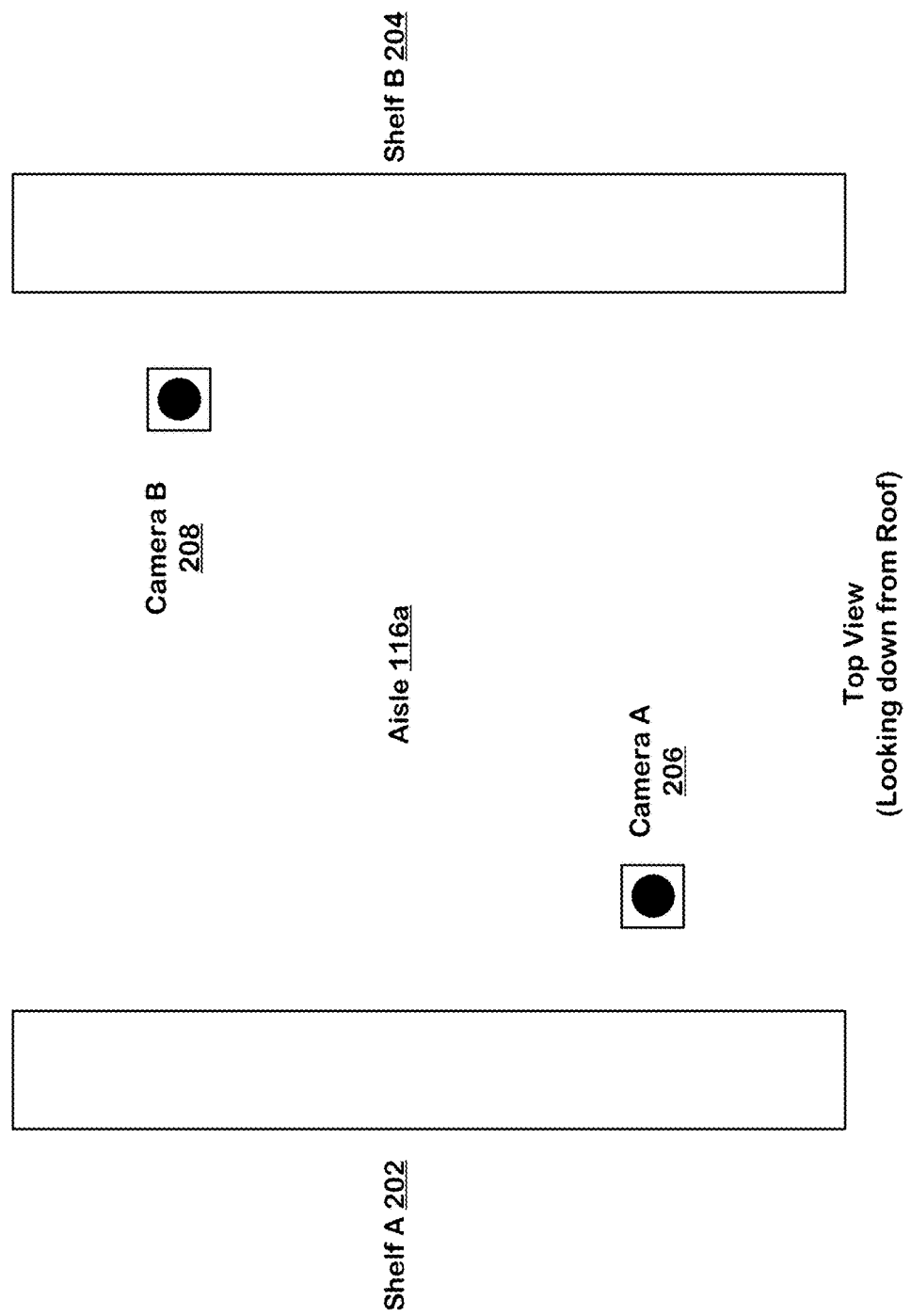
FIG. 3 is a top view of the aisle of FIG. 2 in a shopping store illustrating a camera arrangement.

FIG. 3 illustrates the aisle 116a viewed from the top of FIG. 2, further showing an example arrangement of the positions of cameras 206 and 208 over the aisle 116a. The cameras 206 and 208 are positioned closer to opposite ends of the aisle 116a. The camera A 206 is positioned at a predetermined distance from the shelf A 202 and the camera B 208 is positioned at a predetermined distance from the shelf B 204. In another embodiment, in which more than two cameras are positioned over an aisle, the cameras are positioned at equal distances from each other. In such an embodiment, two cameras are positioned close to the opposite ends and a third camera is positioned in the middle of the aisle. It is understood that a number of different camera arrangements are possible.

Camera Calibration

The camera calibrator 120 performs two types of calibrations: internal and external. In internal calibration, the internal parameters of the cameras 114 are calibrated. Examples of internal camera parameters include focal length, principal point, skew, fisheye coefficients, etc. A variety of techniques for internal camera calibration can be used. One such technique is presented by Zhang in "A flexible new technique for camera calibration" published in IEEE Transactions on Pattern Analysis and Machine Intelligence, Volume 22, No. 11, November 2000.

In external calibration, the external camera parameters are calibrated in order to generate mapping parameters for translating the 2D image data into 3D coordinates in real space. In one embodiment, one subject, such as a person, is introduced into the real space. The subject moves through the real space on a path that passes through the field of view of each of the cameras 114. At any given point in the real space, the subject is present in the fields of view of at least two cameras forming a 3D scene. The two cameras, however, have a different view of the same 3D scene in their respective two-dimensional (2D) image planes. A feature in the 3D scene such as a left-wrist of the subject is viewed by two cameras at different positions in their respective 2D image planes.

A point correspondence is established between every pair of cameras with overlapping fields of view for a given scene. Since each camera has a different view of the same 3D scene, a point correspondence is two pixel locations (one location from each camera with overlapping field of view) that represent the projection of the same point in the 3D scene. Many point correspondences are identified for each 3D scene using the results of the image recognition engines 112a-112n for the purposes of the external calibration. The image recognition engines identify the position of a joint as (x, y) coordinates, such as row and column numbers, of pixels in the 2D image planes of respective cameras 114. In one embodiment, a joint is one of 19 different types of joints of the subject. As the subject moves through the fields of view of different cameras, the tracking engine 110 receives (x, y) coordinates of each of the 19 different types of joints of the subject used for the calibration from cameras 114 per image.

For example, consider an image from a camera A and an image from a camera B both taken at the same moment in time and with overlapping fields of view. There are pixels in an image from camera A that correspond to pixels in a synchronized image from camera B. Consider that there is a specific point of some object or surface in view of both camera A and camera B and that point is captured in a pixel of both image frames. In external camera calibration, a multitude of such points are identified and referred to as corresponding points. Since there is one subject in the field of view of camera A and camera B during calibration, key joints of this subject are identified, for example, the center of left wrist. If these key joints are visible in image frames from both camera A and camera B then it is assumed that these represent corresponding points. This process is repeated for many image frames to build up a large collection of corresponding points for all pairs of cameras with overlapping fields of view. In one embodiment, images are streamed off of all cameras at a rate of 30 FPS (frames per second) or more and a resolution of 720 pixels in full RGB (red, green, and blue) color. These images are in the form of one-dimensional arrays (also referred to as flat arrays).

The large number of images collected above for a subject can be used to determine corresponding points between cameras with overlapping fields of view. Consider two cameras A and B with overlapping field of view. The plane passing through camera centers of cameras A and B and the joint location (also referred to as feature point) in the 3D scene is called the "epipolar plane". The intersection of the epipolar plane with the 2D image planes of the cameras A and B defines the "epipolar line". Given these corresponding points, a transformation is determined that can accurately map a corresponding point from camera A to an epipolar line in camera B's field of view that is guaranteed to intersect the corresponding point in the image frame of camera B. Using the image frames collected above for a subject, the transformation is generated. It is known in the art that this transformation is non-linear. The general form is furthermore known to require compensation for the radial distortion of each camera's lens, as well as the non-linear coordinate transformation moving to and from the projected space. In external camera calibration, an approximation to the ideal non-linear transformation is determined by solving a non-linear optimization problem. This non-linear optimization function is used by the tracking engine 110 to identify the same joints in outputs (arrays of joints data structures) of different image recognition engines 112a-112n, processing images of cameras 114 with overlapping fields of view. The results of the internal and external camera calibration are stored in the calibration database 170.

A variety of techniques for determining the relative positions of the points in images of cameras 114 in the real space can be used. For example, Longuet-Higgins published, "A computer algorithm for reconstructing a scene from two projections" in Nature, Volume 293, 10 Sep. 1981. This paper presents computing a three-dimensional structure of a scene from a correlated pair of perspective projections when spatial relationship between the two projections is unknown. The Longuet-Higgins paper presents a technique to determine the position of each camera in the real space with respect to other cameras. Additionally, their technique allows triangulation of a subject in the real space, identifying the value of the z-coordinate (height from the floor) using images from cameras 114 with overlapping fields of view. An arbitrary point in the real space, for example, the end of a shelf in one corner of the real space, is designated as a (0, 0, 0) point on the (x, y, z) coordinate system of the real space.

In an embodiment of the technology, the parameters of the external calibration are stored in two data structures. The first data structure stores intrinsic parameters. The intrinsic parameters represent a projective transformation from the 3D coordinates into 2D image coordinates. The first data structure contains intrinsic parameters per camera as shown below. The data values are all numeric floating point numbers. This data structure stores a 3×3 intrinsic matrix, represented as "K" and distortion coefficients. The distortion coefficients include six radial distortion coefficients and two tangential distortion coefficients. Radial distortion occurs when light rays bend more near the edges of a lens than they do at its optical center. Tangential distortion occurs when the lens and the image plane are not parallel. The following data structure shows values for the first camera only. Similar data is stored for all the cameras 114.

```
{
   1: {
      K: [[x, x, x], [x, x, x], [x, x, x]],
      distortion _coefficients: [x, x, x, x, x, x, x, x]
   },
   ......
}
```

The second data structure stores per pair of cameras: a 3×3 fundamental matrix (F), a 3×3 essential matrix (E), a 3×4 projection matrix (P), a 3×3 rotation matrix (R) and a 3×1 translation vector (t). This data is used to convert points in one camera's reference frame to another camera's reference frame. For each pair of cameras, eight homography coefficients are also stored to map the plane of the floor 220 from one camera to another. A fundamental matrix is a relationship between two images of the same scene that constrains where the projection of points from the scene can occur in both images. Essential matrix is also a relationship between two images of the same scene with the condition that the cameras are calibrated. The projection matrix gives a vector space projection from 3D real space to a subspace. The rotation matrix is used to perform a rotation in Euclidean space. Translation vector "t" represents a geometric transformation that moves every point of a figure or a space by the same distance in a given direction. The homography_floor_coefficients are used to combine images of features of subjects on the floor 220 viewed by cameras with overlapping fields of views. The second data structure is shown below. Similar data is stored for all pairs of cameras. As indicated previously, the x's represents numeric floating point numbers.

```
{
   1: {
      2: {
         F: [[x, x, x], [x, x, x], [x, x, x]],
         E: [[x, x, x], [x, x, x], [x, x, x]],
         P: [[x, x, x, x], [x, x, x, x], [x, x, x, x]],
         R: [[x, x, x], [x, x, x], [x, x, x]],
         t: [x, x, x],
         homography_floor_coefficients: [x, x, x, x, x, x, x, x]
      }
   },
   ......
}
```

Network Configuration

Figure 4:
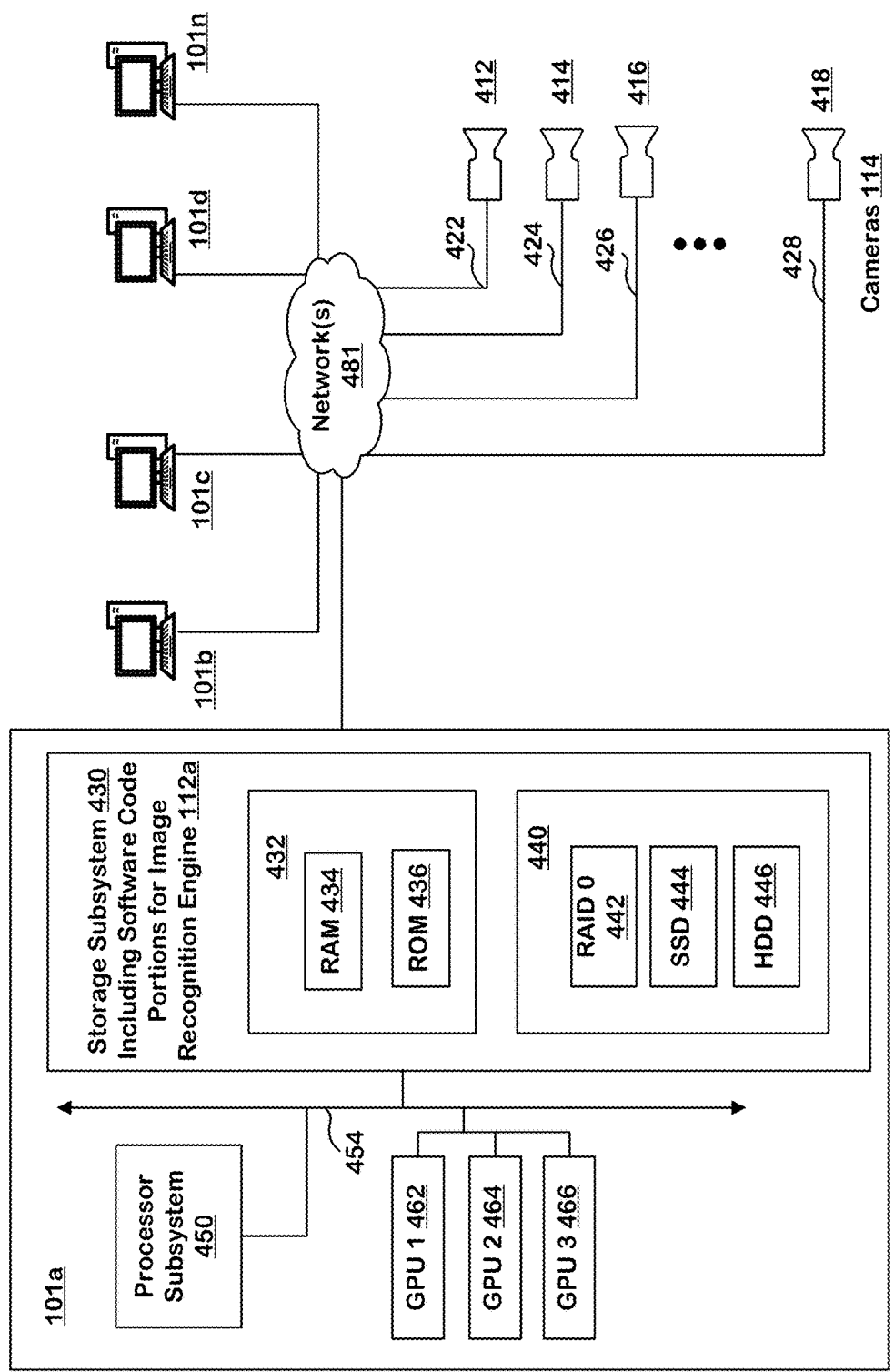
FIG. 4 is a camera and computer hardware arrangement configured for hosting an image recognition engine of FIG. 1.

FIG. 4 presents an architecture 400 of a network hosting image recognition engines. The system includes a plurality of network nodes 101a-101n in the illustrated embodiment. In such an embodiment, the network nodes are also referred to as processing platforms. Processing platforms 101a-101n and cameras 412, 414, 416, . . . 418 are connected to network(s) 481.

FIG. 4 shows a plurality of cameras 412, 414, 416, . . . 418 connected to the network(s). A large number of cameras can be deployed in particular systems. In one embodiment, the cameras 412 to 418 are connected to the network(s) 481 using Ethernet-based connectors 422, 424, 426, and 428, respectively. In such an embodiment, the Ethernet-based connectors have a data transfer speed of 1 gigabit per second, also referred to as Gigabit Ethernet. It is understood that in other embodiments, cameras 114 are connected to the network using other types of network connections which can have a faster or slower data transfer rate than Gigabit Ethernet. Also, in alternative embodiments, a set of cameras can be connected directly to each processing platform, and the processing platforms can be coupled to a network.

Storage subsystem 430 stores the basic programming and data constructs that provide the functionality of certain embodiments of the present invention. For example, the various modules implementing the functionality of a plurality of image recognition engines may be stored in storage subsystem 430. The storage subsystem 430 is an example of a computer readable memory comprising a non-transitory data storage medium, having computer instructions stored in the memory executable by a computer to perform the all or any combination of the data processing and image processing functions described herein, including logic to identify changes in real space, to track subjects and to detect puts and takes of inventory items in an area of real space by processes as described herein. In other examples, the computer instructions can be stored in other types of memory, including portable memory, that comprise a non-transitory data storage medium or media, readable by a computer.

These software modules are generally executed by a processor subsystem 450. A host memory subsystem 432 typically includes a number of memories including a main random access memory (RAM) 434 for storage of instructions and data during program execution and a read-only memory (ROM) 436 in which fixed instructions are stored. In one embodiment, the RAM 434 is used as a buffer for storing video streams from the cameras 114 connected to the platform 101a.

A file storage subsystem 440 provides persistent storage for program and data files. In an example embodiment, the storage subsystem 440 includes four 120 Gigabyte (GB) solid state disks (SSD) in a RAID 0 (redundant array of independent disks) arrangement identified by a numeral 442. In the example embodiment, in which CNN is used to identify joints of subjects, the RAID 0 442 is used to store training data. During training, the training data which is not in RAM 434 is read from RAID 0 442. Similarly, when images are being recorded for training purposes, the data which is not in RAM 434 is stored in RAID 0 442. In the example embodiment, the hard disk drive (HDD) 446 is a 10 terabyte storage. It is slower in access speed than the RAID 0 442 storage. The solid state disk (SSD) 444 contains the operating system and related files for the image recognition engine 112a.

In an example configuration, three cameras 412, 414, and 416, are connected to the processing platform 101a. Each camera has a dedicated graphics processing unit GPU 1 462, GPU 2 464, and GPU 3 466, to process images sent by the camera. It is understood that fewer than or more than three cameras can be connected per processing platform. Accordingly, fewer or more GPUs are configured in the network node so that each camera has a dedicated GPU for processing the image frames received from the camera. The processor subsystem 450, the storage subsystem 430 and the GPUs 462, 464, and 466 communicate using the bus subsystem 454.

A number of peripheral devices such as a network interface subsystem, user interface output devices, and user interface input devices are also connected to the bus subsystem 454 forming part of the processing platform 101a. These subsystems and devices are intentionally not shown in FIG. 4 to improve the clarity of the description. Although bus subsystem 454 is shown schematically as a single bus, alternative embodiments of the bus subsystem may use multiple busses.

In one embodiment, the cameras 412 can be implemented using Chameleon3 1.3 MP Color USB3 Vision (Sony ICX445), having a resolution of 1288×964, a frame rate of 30 FPS, and at 1.3 MegaPixels per image, with Varifocal Lens having a working distance (mm) of 300-∞, a field of view field of view with a ⅓" sensor of 98.2°-23.8°.

Convolutional Neural Network

The image recognition engines in the processing platforms receive a continuous stream of images at a predetermined rate. In one embodiment, the image recognition engines comprise convolutional neural networks (abbreviated CNN).

Figure 5:
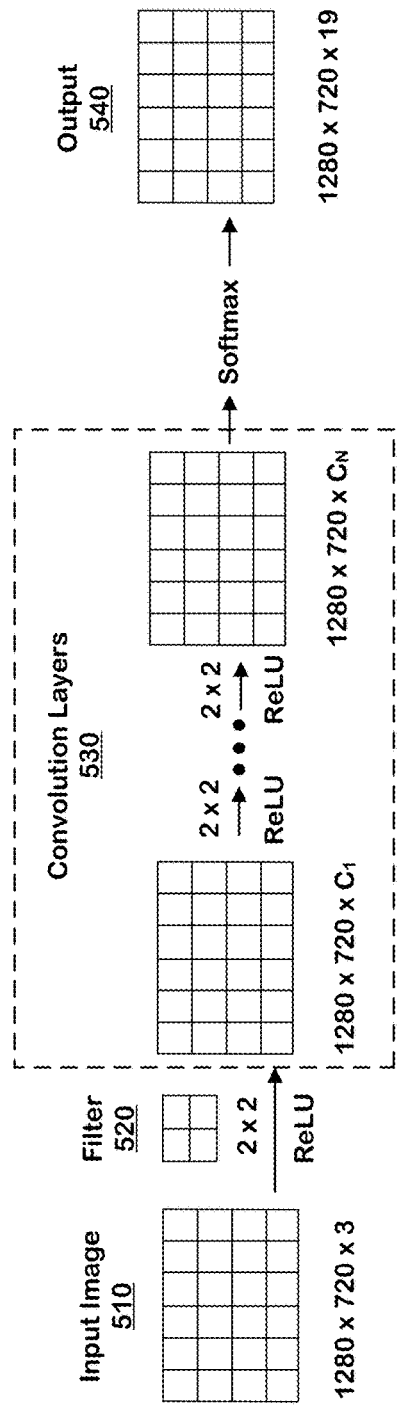
FIG. 5 illustrates a convolutional neural network illustrating identification of joints in an image recognition engine of FIG. 1.

FIG. 5 illustrates processing of image frames by a CNN referred to by a numeral 500. The input image 510 is a matrix consisting of image pixels arranged in rows and columns. In one embodiment, the input image 510 has a width of 1280 pixels, height of 720 pixels and 3 channels red, blue, and green also referred to as RGB. The channels can be imagined as three 1280×720 two-dimensional images stacked over one another. Therefore, the input image has dimensions of 1280×720×3 as shown in FIG. 5.

A 2×2 filter 520 is convolved with the input image 510. In this embodiment, no padding is applied when the filter is convolved with the input. Following this, a nonlinearity function is applied to the convolved image. In the present embodiment, rectified linear unit (ReLU) activations are used. Other examples of nonlinear functions include sigmoid, hyperbolic tangent (tan h) and variations of ReLU such as leaky ReLU. A search is performed to find hyper-parameter values. The hyper-parameters are $C_1$, $C_2$, $C_N$ where $C_N$ means the number of channels for convolution layer "N". Typical values of N and C are shown in FIG. 5. There are twenty five (25) layers in the CNN as represented by N equals 25. The values of C are the number of channels in each convolution layer for layers 1 to 25. In other embodiments, additional features are added to the CNN 500 such as residual connections, squeeze-excitation modules, and multiple resolutions.

In typical CNNs used for image classification, the size of the image (width and height dimensions) is reduced as the image is processed through convolution layers. That is helpful in feature identification as the goal is to predict a class for the input image. However, in the illustrated embodiment, the size of the input image (i.e. image width and height dimensions) is not reduced, as the goal is to not only to identify a joint (also referred to as a feature) in the image frame, but also to identify its location in the image so it can be mapped to coordinates in the real space. Therefore, as shown FIG. 5, the width and height dimensions of the image remain unchanged as the processing proceeds through convolution layers of the CNN, in this example.

In one embodiment, the CNN 500 identifies one of the 19 possible joints of the subjects at each element of the image. The possible joints can be grouped in two categories: foot joints and non-foot joints. The $19^{th}$ type of joint classification is for all non-joint features of the subject (i.e. elements of the image not classified as a joint).

> Foot Joints:
>     Ankle joint (left and right)
> Non-foot Joints:
>     Neck
>     Nose
>     Eyes (left and right)
>     Ears (left and right)
>     Shoulders (left and right)
>     Elbows (left and right)
>     Wrists (left and right)
>     Hip (left and right)
>     Knees (left and right)
> Not a joint As can be seen, a "joint" for the purposes of this description is a trackable feature of a subject in the real space. A joint may correspond to physiological joints on the subjects, or other features such as the eye, or nose.

The first set of analyses on the stream of input images identifies trackable features of subjects in real space. In one embodiment, this is referred to as "joints analysis". In such an embodiment, the CNN used for joints analysis is referred to as "joints CNN". In one embodiment, the joints analysis is performed thirty times per second over thirty frames per second received from the corresponding camera. The analysis is synchronized in time i.e., at $\frac{1}{30}^{th}$ of a second, images from all cameras 114 are analyzed in the corresponding joints CNNs to identify joints of all subjects in the real space. The results of this analysis of the images from a single moment in time from plural cameras is stored as a "snapshot".

A snapshot can be in the form of a dictionary containing arrays of joints data structures from images of all cameras 114 at a moment in time, representing a constellation of candidate joints within the area of real space covered by the system. In one embodiment, the snapshot is stored in the subject database 140.

In this example CNN, a softmax function is applied to every element of the image in the final layer of convolution layers 530. The softmax function transforms a K-dimensional vector of arbitrary real values to a K-dimensional vector of real values in the range [0, 1] that add up to 1. In one embodiment, an element of an image is a single pixel. The softmax function converts the 19-dimensional array (also referred to a 19-dimensional vector) of arbitrary real values for each pixel to a 19-dimensional confidence array of real values in the range [0, 1] that add up to 1. The 19 dimensions of a pixel in the image frame correspond to the 19 channels in the final layer of the CNN which further correspond to 19 types of joints of the subjects.

A large number of picture elements can be classified as one of each of the 19 types of joints in one image depending on the number of subjects in the field of view of the source camera for that image.

The image recognition engines 112a-112n process images to generate confidence arrays for elements of the image. A confidence array for a particular element of an image includes confidence values for a plurality of joint types for the particular element. Each one of the image recognition engines 112a-112n, respectively, generates an output matrix 540 of confidence arrays per image. Finally, each image recognition engine generates arrays of joints data structures corresponding to each output matrix 540 of confidence arrays per image. The arrays of joints data structures corresponding to particular images classify elements of the particular images by joint type, time of the particular image, and coordinates of the element in the particular image. A joint type for the joints data structure of the particular elements in each image is selected based on the values of the confidence array.

Each joint of the subjects can be considered to be distributed in the output matrix 540 as a heat map. The heat map can be resolved to show image elements having the highest values (peak) for each joint type. Ideally, for a given picture element having high values of a particular joint type, surrounding picture elements outside a range from the given picture element will have lower values for that joint type, so that a location for a particular joint having that joint type can be identified in the image space coordinates. Correspondingly, the confidence array for that image element will have the highest confidence value for that joint and lower confidence values for the remaining 18 types of joints.

In one embodiment, batches of images from each camera 114 are processed by respective image recognition engines. For example, six contiguously timestamped images are processed sequentially in a batch to take advantage of cache coherence. The parameters for one layer of the CNN 500 are loaded in memory and applied to the batch of six image frames. Then the parameters for the next layer are loaded in memory and applied to the batch of six images. This is repeated for all convolution layers 530 in the CNN 500. The cache coherence reduces processing time and improves performance of the image recognition engines.

In one such embodiment, referred to as three dimensional (3D) convolution, a further improvement in performance of the CNN 500 is achieved by sharing information across image frames in the batch. This helps in more precise identification of joints and reduces false positives. For examples, features in the image frames for which pixel values do not change across the multiple image frames in a given batch are likely static objects such as a shelf. The change of values for the same pixel across image frames in a given batch indicates that this pixel is likely a joint. Therefore, the CNN 500 can focus more on processing that pixel to accurately identify the joint identified by that pixel.

Joints Data Structure

The output of the CNN 500 is a matrix of confidence arrays for each image per camera. The matrix of confidence arrays is transformed into an array of joints data structures. A joints data structure 600 as shown in FIG. 6 is used to store the information of each joint. The joints data structure 600 identifies x and y positions of the element in the particular image in the 2D image space of the camera from which the image is received. A joint number identifies the type of joint identified. For example, in one embodiment, the values range from 1 to 19. A value of 1 indicates that the joint is a left-ankle, a value of 2 indicates the joint is a right-ankle and so on. The type of joint is selected using the confidence array for that element in the output matrix 540. For example, in one embodiment, if the value corresponding to the left-ankle joint is highest in the confidence array for that image element, then the value of the joint number is "1".

A confidence number indicates the degree of confidence of the CNN 500 in predicting that joint. If the value of confidence number is high, it means the CNN is confident in its prediction. An integer-Id is assigned to the joints data structure to uniquely identify it. Following the above mapping, the output matrix 540 of confidence arrays per image is converted into an array of joints data structures for each image.

The image recognition engines 112a-112n receive the sequences of images from cameras 114 and process images to generate corresponding arrays of joints data structures as described above. An array of joints data structures for a particular image classifies elements of the particular image by joint type, time of the particular image, and the coordinates of the elements in the particular image. In one embodiment, the image recognition engines 112a-112n are convolutional neural networks CNN 500, the joint type is one of the 19 types of joints of the subjects, the time of the particular image is the timestamp of the image generated by the source camera 114 for the particular image, and the coordinates (x, y) identify the position of the element on a 2D image plane.

In one embodiment, the joints analysis includes performing a combination of k-nearest neighbors, mixture of Gaussians, various image morphology transformations, and joints CNN on each input image. The result comprises arrays of joints data structures which can be stored in the form of a bit mask in a ring buffer that maps image numbers to bit masks at each moment in time.

Tracking Engine

Figure 7:
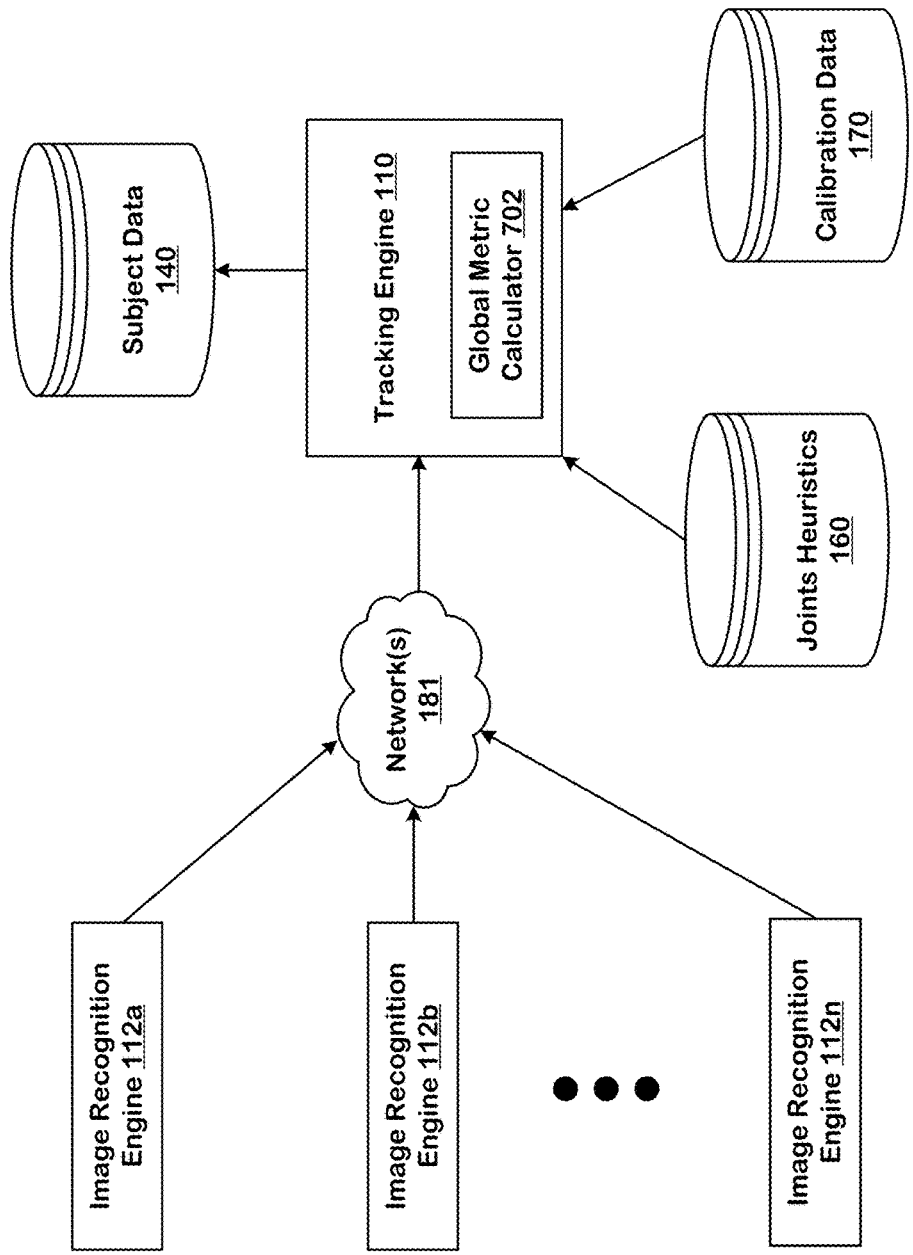
FIG. 7 illustrates the tracking engine of FIG. 1 with a global metric calculator.

The tracking engine 110 is configured to receive arrays of joints data structures generated by the image recognition engines 112a-112n corresponding to images in sequences of images from cameras having overlapping fields of view. The arrays of joints data structures per image are sent by image recognition engines 112a-112n to the tracking engine 110 via the network(s) 181 as shown in FIG. 7. The tracking engine 110 translates the coordinates of the elements in the arrays of joints data structures corresponding to images in different sequences into candidate joints having coordinates in the real space. The tracking engine 110 comprises logic to identify sets of candidate joints having coordinates in real space (constellations of joints) as subjects in the real space. In one embodiment, the tracking engine 110 accumulates arrays of joints data structures from the image recognition engines for all the cameras at a given moment in time and stores this information as a dictionary in the subject database 140, to be used for identifying a constellation of candidate joints. The dictionary can be arranged in the form of key-value pairs, where keys are camera ids and values are arrays of joints data structures from the camera. In such an embodiment, this dictionary is used in heuristics-based analysis to determine candidate joints and for assignment of joints to subjects. In such an embodiment, a high-level input, processing and output of the tracking engine 110 is illustrated in table 1.

TABLE 1

Inputs, processing and outputs from tracking engine 110 in an example embodiment.

| Inputs | Processing | Output |
|---|---|---|
| Arrays of joints data structures per image and for each joints data structure Unique ID Confidence number Joint number (x, y) position in image space | Create joints dictionary Reproject joint positions in the fields of view of cameras with overlapping fields of view to candidate joints | List of subjects in the real space at a moment in time |

Grouping Joints into Candidate Joints

The tracking engine 110 receives arrays of joints data structures along two dimensions: time and space. Along the time dimension, the tracking engine receives sequentially timestamped arrays of joints data structures processed by image recognition engines 112a-112n per camera. The joints data structures include multiple instances of the same joint of the same subject over a period of time in images from cameras having overlapping fields of view. The (x, y) coordinates of the element in the particular image will usually be different in sequentially timestamped arrays of joints data structures because of the movement of the subject to which the particular joint belongs. For example, twenty picture elements classified as left-wrist joints can appear in many sequentially timestamped images from a particular camera, each left-wrist joint having a position in real space that can be changing or unchanging from image to image. As a result, twenty left-wrist joints data structures 600 in many sequentially timestamped arrays of joints data structures can represent the same twenty joints in real space over time.

Because multiple cameras having overlapping fields of view cover each location in the real space, at any given moment in time, the same joint can appear in images of more than one of the cameras 114. The cameras 114 are synchronized in time, therefore, the tracking engine 110 receives joints data structures for a particular joint from multiple cameras having overlapping fields of view, at any given moment in time. This is the space dimension, the second of the two dimensions: time and space, along which the tracking engine 110 receives data in arrays of joints data structures.

The tracking engine 110 uses an initial set of heuristics stored in the heuristics database 160 to identify candidate joints data structures from the arrays of joints data structures. The goal is to minimize a global metric over a period of time. A global metric calculator 702 calculates the global metric. The global metric is a summation of multiple values described below. Intuitively, the value of the global metric is minimum when the joints in arrays of joints data structures received by the tracking engine 110 along the time and space dimensions are correctly assigned to respective subjects. For example, consider the embodiment of the shopping store with customers moving in the aisles. If the left-wrist of a customer A is incorrectly assigned to a customer B, then the value of the global metric will increase. Therefore, minimizing the global metric for each joint for each customer is an optimization problem. One option to solve this problem is to try all possible connections of joints. However, this can become intractable as the number of customers increases.

A second approach to solve this problem is to use heuristics to reduce possible combinations of joints identified as members of a set of candidate joints for a single subject. For example, a left-wrist joint cannot belong to a subject far apart in space from other joints of the subject because of known physiological characteristics of the relative positions of joints. Similarly, a left-wrist joint having a small change in position from image to image is less likely to belong to a subject having the same joint at the same position from an image far apart in time, because the subjects are not expected to move at a very high speed. These initial heuristics are used to build boundaries in time and space for constellations of candidate joints that can be classified as a particular subject. The joints in the joints data structures within a particular time and space boundary are considered as "candidate joints" for assignment to sets of candidate joints as subjects present in the real space. These candidate joints include joints identified in arrays of joints data structures from multiple images from a same camera over a period of time (time dimension) and across different cameras with overlapping fields of view (space dimension).

Foot Joints

The joints can be divided for the purposes of a procedure for grouping the joints into constellations, into foot and non-foot joints as shown above in the list of joints. The left and right-ankle joint types in the current example, are considered foot joints for the purpose of this procedure. The tracking engine 110 can start identification of sets of candidate joints of particular subjects using foot joints. In the embodiment of the shopping store, the feet of the customers are on the floor 220 as shown in FIG. 2. The distance of the cameras 114 to the floor 220 is known. Therefore, when combining the joints data structures of foot joints from arrays of data joints data structures corresponding to images of cameras with overlapping fields of view, the tracking engine 110 can assume a known depth (distance along z axis). The value depth for foot joints is zero i.e. (x, y, 0) in the (x, y, z) coordinate system of the real space. Using this information, the image tracking engine 110 applies homographic mapping to combine joints data structures of foot joints from cameras with overlapping fields of view to identify the candidate foot joint. Using this mapping, the location of the joint in (x, y) coordinates in image space is converted to the location in the (x, y, z) coordinates in the real space, resulting in a candidate foot joint. This process is performed separately to identify candidate left and right foot joints using respective joints data structures.

Following this, the tracking engine 110 can combine a candidate left foot joint and a candidate right foot joint (assigns them to a set of candidate joints) to create a subject. Other joints from the galaxy of candidate joints can be linked to the subject to build a constellation of some or all of the joint types for the created subject.

If there is only one left candidate foot joint and one right candidate foot joint then it means there is only one subject in the particular space at the particular time. The tracking engine 110 creates a new subject having the left and the right candidate foot joints belonging to its set of joints. The subject is saved in the subject database 140. If there are multiple candidate left and right foot joints, then the global metric calculator 702 attempts to combine each candidate left foot joint to each candidate right foot joint to create subjects such that the value of the global metric is minimized.

Non-Foot Joints

To identify candidate non-foot joints from arrays of joints data structures within a particular time and space boundary, the tracking engine 110 uses the non-linear transformation (also referred to as a fundamental matrix) from any given camera A to its neighboring camera B with overlapping fields of view. The non-linear transformations are calculated using a single multi-joint subject and stored in the calibration database 170 as described above. For example, for two cameras A and B with overlapping fields of view, the candidate non-foot joints are identified as follows. The non-foot joints in arrays of joints data structures corresponding to elements in image frames from camera A are mapped to epipolar lines in synchronized image frames from camera B. A joint (also referred to as a feature in machine vision literature) identified by a joints data structure in an array of joints data structures of a particular image of camera A will appear on a corresponding epipolar line if it appears in the image of camera B. For example, if the joint in the joints data structure from camera A is a left-wrist joint, then a left-wrist joint on the epipolar line in the image of camera B represents the same left-wrist joint from the perspective of camera B. These two points in images of cameras A and B are projections of the same point in the 3D scene in real space and are referred to as a "conjugate pair".

Machine vision techniques such as the technique by Longuet-Higgins published in the paper, titled, "A computer algorithm for reconstructing a scene from two projections" in Nature, Volume 293, 10 Sep. 1981, are applied to conjugate pairs of corresponding points to determine height of joints from the floor 220 in the real space. Application of the above method requires predetermined mapping between cameras with overlapping fields of view. That data is stored in the calibration database 170 as non-linear functions determined during the calibration of the cameras 114 described above.

The tracking engine 110 receives the arrays of joints data structures corresponding to images in sequences of images from cameras having overlapping fields of view, and translates the coordinates of the elements in the arrays of joints data structures corresponding to images in different sequences into candidate non-foot joints having coordinates in the real space. The identified candidate non-foot joints are grouped into sets of subjects having coordinates in real space using the global metric calculator 702. The global metric calculator 702 calculates the global metric value and attempts to minimize the value by checking different combinations of non-foot joints. In one embodiment, the global metric is a sum of heuristics organized in four categories. The logic to identify sets of candidate joints comprises heuristic functions based on physical relationships among joints of subjects in real space to identify sets of candidate joints as subjects. Examples of physical relationships among joints are considered in the heuristics as described below.

First Category of Heuristics

The first category of heuristics includes metrics to ascertain similarity between two proposed subject-joint locations in the same camera view at the same or different moments in time. In one embodiment, these metrics are floating point values, where higher values mean two lists of joints are likely to belong to the same subject. Consider the example embodiment of the shopping store, the metrics determine the distance between a customer's same joints in one camera from one image to the next image along the time dimension. Given a customer A in the field of view of the camera 412, the first set of metrics determines the distance between each of person A's joints from one image from the camera 412 to the next image from the camera 412. The metrics are applied to joints data structures 600 in arrays of joints data structures per image from cameras 114.

In one embodiment, two example metrics in the first category of heuristics are listed below:
1. The inverse of the Euclidean 2D coordinate distance (using x, y coordinate values for a particular image from a particular camera) between the left ankle-joint of two subjects on the floor and the right ankle-joint of the two subjects on the floor summed together.
2. The sum of the inverse of Euclidean 2D coordinate distance between every pair of non-foot joints of subjects in the image frame.

Second Category of Heuristics

The second category of heuristics includes metrics to ascertain similarity between two proposed subject-joint locations from the fields of view of multiple cameras at the same moment in time. In one embodiment, these metrics are floating point values, where higher values mean two lists of joints are likely to belong to the same subject. Consider the example embodiment of the shopping store, the second set of metrics determines the distance between a customer's same joints in image frames from two or more cameras (with overlapping fields of view) at the same moment in time.

In one embodiment, two example metrics in the second category of heuristics are listed below:
1. The inverse of the Euclidean 2D coordinate distance (using x, y coordinate values for a particular image from a particular camera) between the left ankle-joint of two subjects on the floor and the right ankle-joint of the two subjects on the floor summed together. The first subject's ankle-joint locations are projected to the camera in which the second subject is visible through homographic mapping.
2. The sum of all pairs of joints of inverse of Euclidean 2D coordinate distance between a line and a point, where the line is the epipolar line of a joint of an image from a first camera having a first subject in its field of view to a second camera with a second subject in its field of view and the point is the joint of the second subject in the image from the second camera.

Third Category of Heuristics

The third category of heuristics include metrics to ascertain similarity between all joints of a proposed subject-joint location in the same camera view at the same moment in time. Consider the example embodiment of the shopping store, this category of metrics determines distance between joints of a customer in one frame from one camera.

Fourth Category of Heuristics

The fourth category of heuristics includes metrics to ascertain dissimilarity between proposed subject-joint locations. In one embodiment, these metrics are floating point values. Higher values mean two lists of joints are more likely to not be the same subject. In one embodiment, two example metrics in this category include:
1. The distance between neck joints of two proposed subjects.
2. The sum of the distance between pairs of joints between two subjects.

In one embodiment, various thresholds which can be determined empirically are applied to the above listed metrics as described below:
1. Thresholds to decide when metric values are small enough to consider that a joint belongs to a known subject.
2. Thresholds to determine when there are too many potential candidate subjects that a joint can belong to with too good of a metric similarity score.
3. Thresholds to determine when collections of joints over time have high enough metric similarity to be considered a new subject, previously not present in the real space.
4. Thresholds to determine when a subject is no longer in the real space.
5. Thresholds to determine when the tracking engine 110 has made a mistake and has confused two subjects.

The tracking engine 110 includes logic to store the sets of joints identified as subjects. The logic to identify sets of candidate joints includes logic to determine whether a candidate joint identified in images taken at a particular time corresponds with a member of one of the sets of candidate joints identified as subjects in preceding images. In one embodiment, the tracking engine 110 compares the current joint-locations of a subject with previously recorded joint-locations of the same subject at regular intervals. This comparison allows the tracking engine 110 to update the joint locations of subjects in the real space. Additionally, using this, the tracking engine 110 identifies false positives (i.e., falsely identified subjects) and removes subjects no longer present in the real space.

Consider the example of the shopping store embodiment, in which the tracking engine 110 created a customer (subject) at an earlier moment in time, however, after some time, the tracking engine 110 does not have current joint-locations for that particular customer. It means that the customer was incorrectly created. The tracking engine 110 deletes incorrectly generated subjects from the subject database 140. In one embodiment, the tracking engine 110 also removes positively identified subjects from the real space using the above described process. Consider the example of the shopping store, when a customer leaves the shopping store, the tracking engine 110 deletes the corresponding customer record from the subject database 140. In one such embodiment, the tracking engine 110 updates this customer's record in the subject database 140 to indicate that "customer has left the store".

In one embodiment, the tracking engine 110 attempts to identify subjects by applying the foot and non-foot heuristics simultaneously. This results in "islands" of connected joints of the subjects. As the tracking engine 110 processes further arrays of joints data structures along the time and space dimensions, the size of the islands increases. Eventually, the islands of joints merge to other islands of joints forming subjects which are then stored in the subject database 140. In one embodiment, the tracking engine 110 maintains a record of unassigned joints for a predetermined period of time. During this time, the tracking engine attempts to assign the unassigned joint to existing subjects or create new multi joint entities from these unassigned joints. The tracking engine 110 discards the unassigned joints after a predetermined period of time. It is understood that, in other embodiments, different heuristics than the ones listed above are used to identify and track subjects.

In one embodiment, a user interface output device connected to the node 102 hosting the tracking engine 110 displays position of each subject in the real spaces. In one such embodiment, the display of the output device is refreshed with new locations of the subjects at regular intervals.

Subject Data Structure

The joints of the subjects are connected to each other using the metrics described above. In doing so, the tracking engine 110 creates new subjects and updates the locations of existing subjects by updating their respective joint locations. FIG. 8 shows the subject data structure 800 to store the subject. The data structure 800 stores the subject related data as a key-value dictionary. The key is a frame_number and value is another key-value dictionary where key is the camera_id and value is a list of 18 joints (of the subject) with their locations in the real space. The subject data is stored in the subject database 140. Every new subject is also assigned a unique identifier that is used to access the subject's data in the subject database 140.

In one embodiment, the system identifies joints of a subject and creates a skeleton of the subject. The skeleton is projected into the real space indicating the position and orientation of the subject in the real space. This is also referred to as "pose estimation" in the field of machine vision. In one embodiment, the system displays orientations and positions of subjects in the real space on a graphical user interface (GUI). In one embodiment, the image analysis is anonymous, i.e., a unique identifier assigned to a subject created through joints analysis does not identify personal identification details (such as names, email addresses, mailing addresses, credit card numbers, bank account numbers, driver's license number, etc.) of any specific subject in the real space.

Process Flow of Subject Tracking

A number of flowcharts illustrating logic are described herein. The logic can be implemented using processors configured as described above programmed using computer programs stored in memory accessible and executable by the processors, and in other configurations, by dedicated logic hardware, including field programmable integrated circuits, and by combinations of dedicated logic hardware and computer programs. With all flowcharts herein, it will be appreciated that many of the steps can be combined, performed in parallel, or performed in a different sequence, without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the embodiments, and it will be understood that numerous additional steps for accomplishing other functions can be performed before, after and between those shown.

Figure 9:
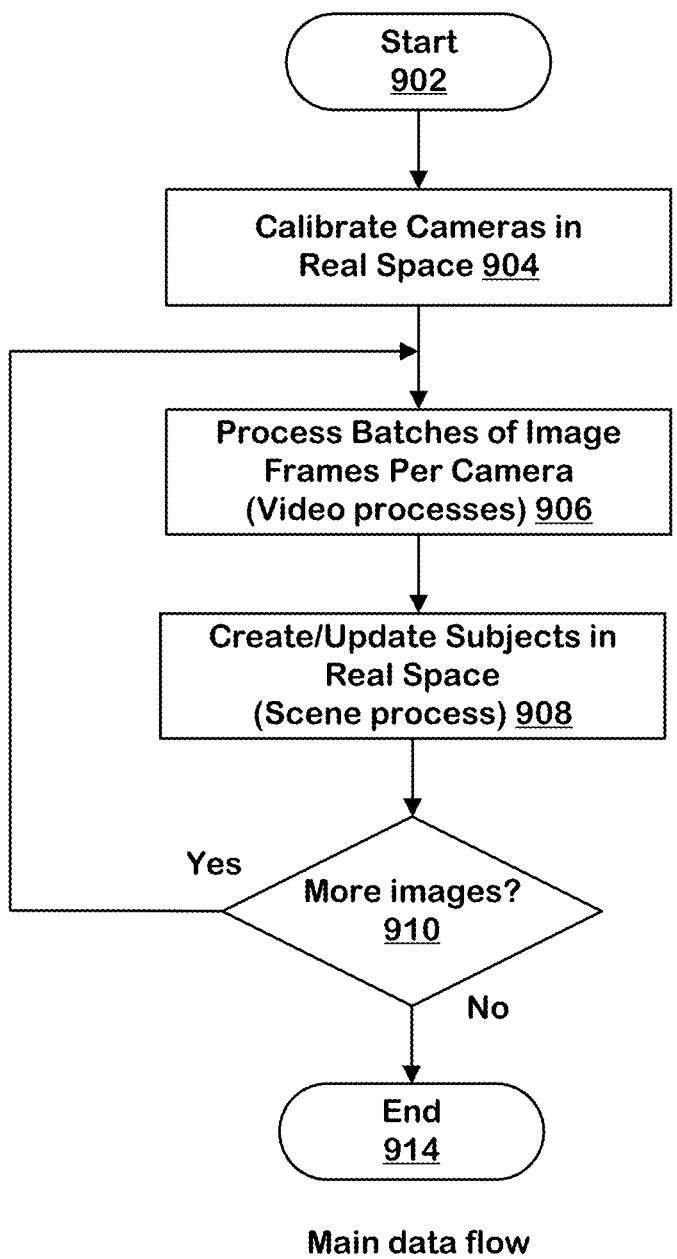
FIG. 9 is a flowchart illustrating process steps for tracking subjects by the system of FIG. 1.

FIG. 9 is a flowchart illustrating process steps for tracking subjects. The process starts at step 902. The cameras 114 having field of view in an area of the real space are calibrated in process step 904. Video processes are performed at step 906 by image recognition engines 112a-112n. In one embodiment, the video process is performed per camera to process batches of image frames received from respective cameras. The output of all video processes from respective image recognition engines 112a-112n are given as input to a scene process performed by the tracking engine 110 at step 908. The scene process identifies new subjects and updates the joint locations of existing subjects. At step 910, it is checked if there are more image frames to be processed. If there are more image frames, the process continues at step 906, otherwise the process ends at step 914.

Figure 10:
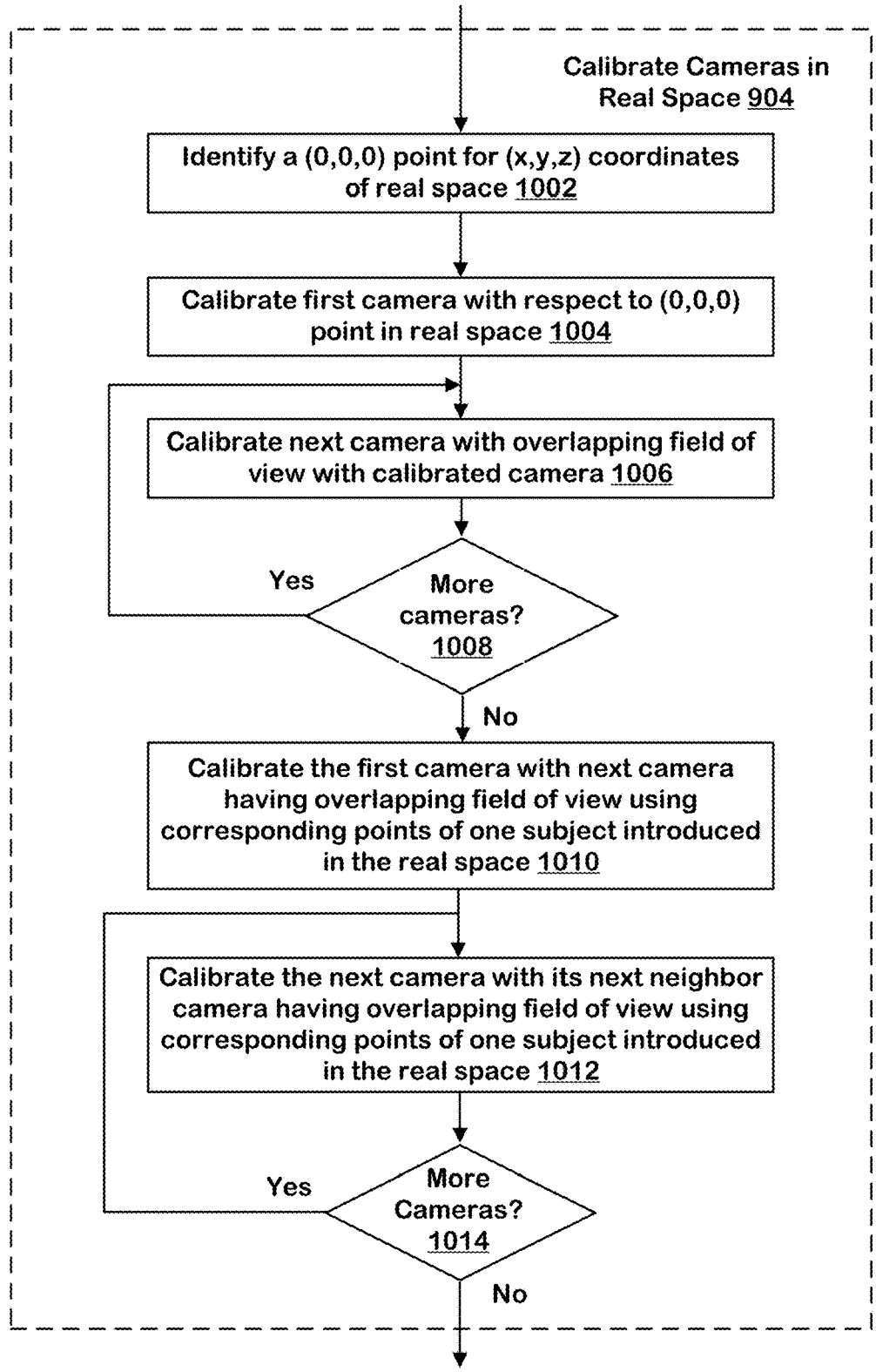
FIG. 10 is a flowchart showing more detailed process steps for a camera calibration step of FIG. 9.

More detailed process steps of the process step 904 "calibrate cameras in real space" are presented in a flowchart in FIG. 10. The calibration process starts at step 1002 by identifying a (0, 0, 0) point for (x, y, z) coordinates of the real space. At step 1004, a first camera with the location (0, 0, 0) in its field of view is calibrated. More details of camera calibration are presented earlier in this application. At step 1006, a next camera with overlapping field of view with the first camera is calibrated. At step 1008, it is checked whether there are more cameras to calibrate. The process is repeated at step 1006 until all cameras 114 are calibrated.

In a next process step 1010, a subject is introduced in the real space to identify conjugate pairs of corresponding points between cameras with overlapping fields of view. Some details of this process are described above. The process is repeated for every pair of overlapping cameras at step 1012. The process ends if there are no more cameras (step 1014).

Figure 11:
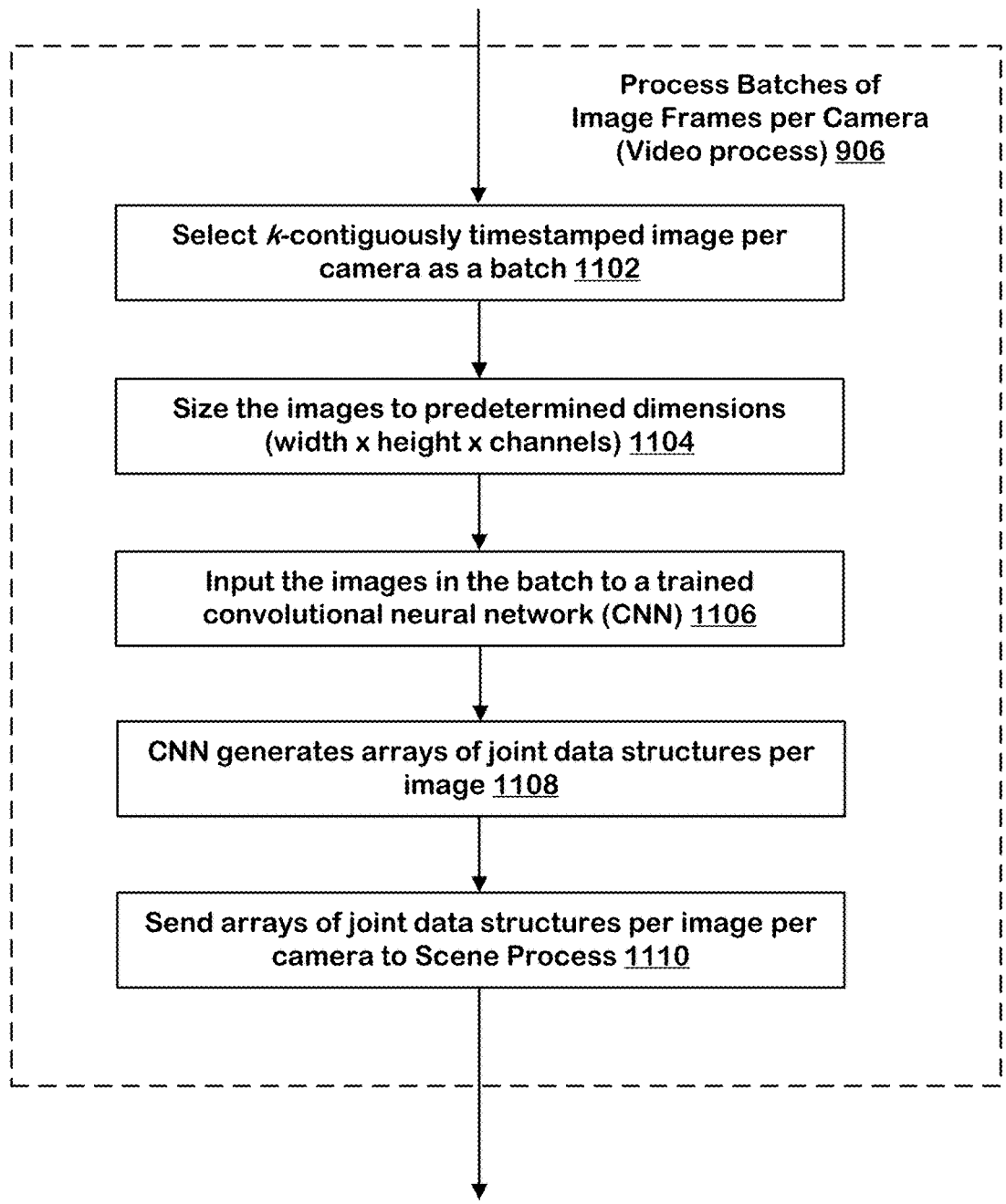
FIG. 11 is a flowchart showing more detailed process steps for a video process step of FIG. 9.

A flowchart in FIG. 11 shows more detailed steps of the "video process" step 906. At step 1102, k-contiguously timestamped images per camera are selected as a batch for further processing. In one embodiment, the value of k=6 which is calculated based on available memory for the video process in the network nodes 101a-101n, respectively hosting image recognition engines 112a-112n. In a next step 1104, the size of images is set to appropriate dimensions. In one embodiment, the images have a width of 1280 pixels, height of 720 pixels and three channels RGB (representing red, green and blue colors). At step 1106, a plurality of trained convolutional neural networks (CNN) process the images and generate arrays of joints data structures per image. The output of the CNNs are arrays of joints data structures per image (step 1108). This output is sent to a scene process at step 1110.

Figure 12A:
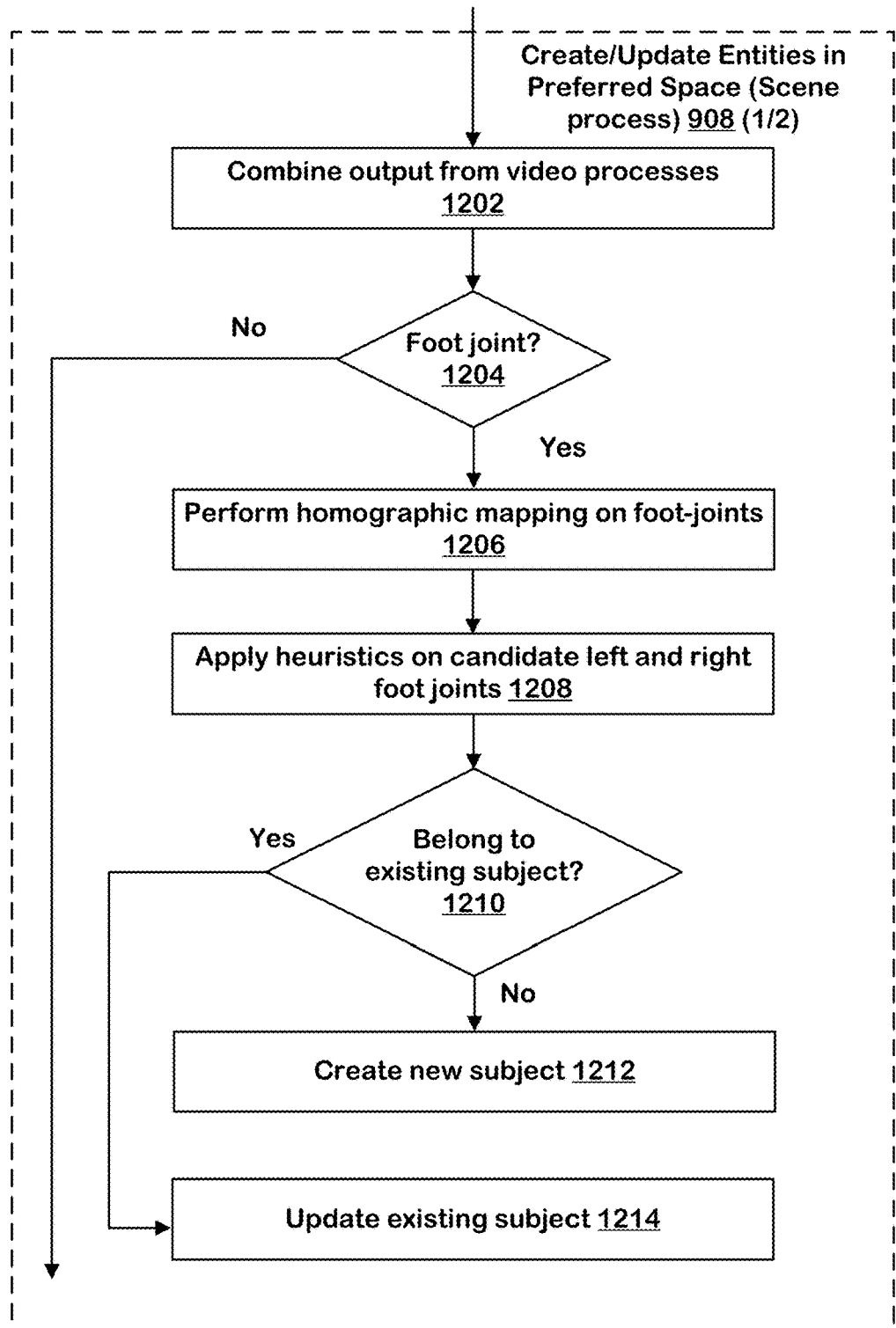
FIG. 12A is a flowchart showing a first part of more detailed process steps for the scene process of FIG. 9.

FIG. 12A is a flowchart showing a first part of more detailed steps for "scene process" step 908 in FIG. 9. The scene process combines outputs from multiple video processes at step 1202. At step 1204, it is checked whether a joints data structure identifies a foot joint or a non-foot joint. If the joints data structure is of a foot-joint, homographic mapping is applied to combine the joints data structures corresponding to images from cameras with overlapping fields of view at step 1206. This process identifies candidate foot joints (left and right foot joints). At step 1208 heuristics are applied on candidate foot joints identified in step 1206 to identify sets of candidate foot joints as subjects. It is checked at step 1210 whether the set of candidate foot joints belongs to an existing subject. If not, a new subject is created at step 1212. Otherwise, the existing subject is updated at step 1214.

Figure 12B:
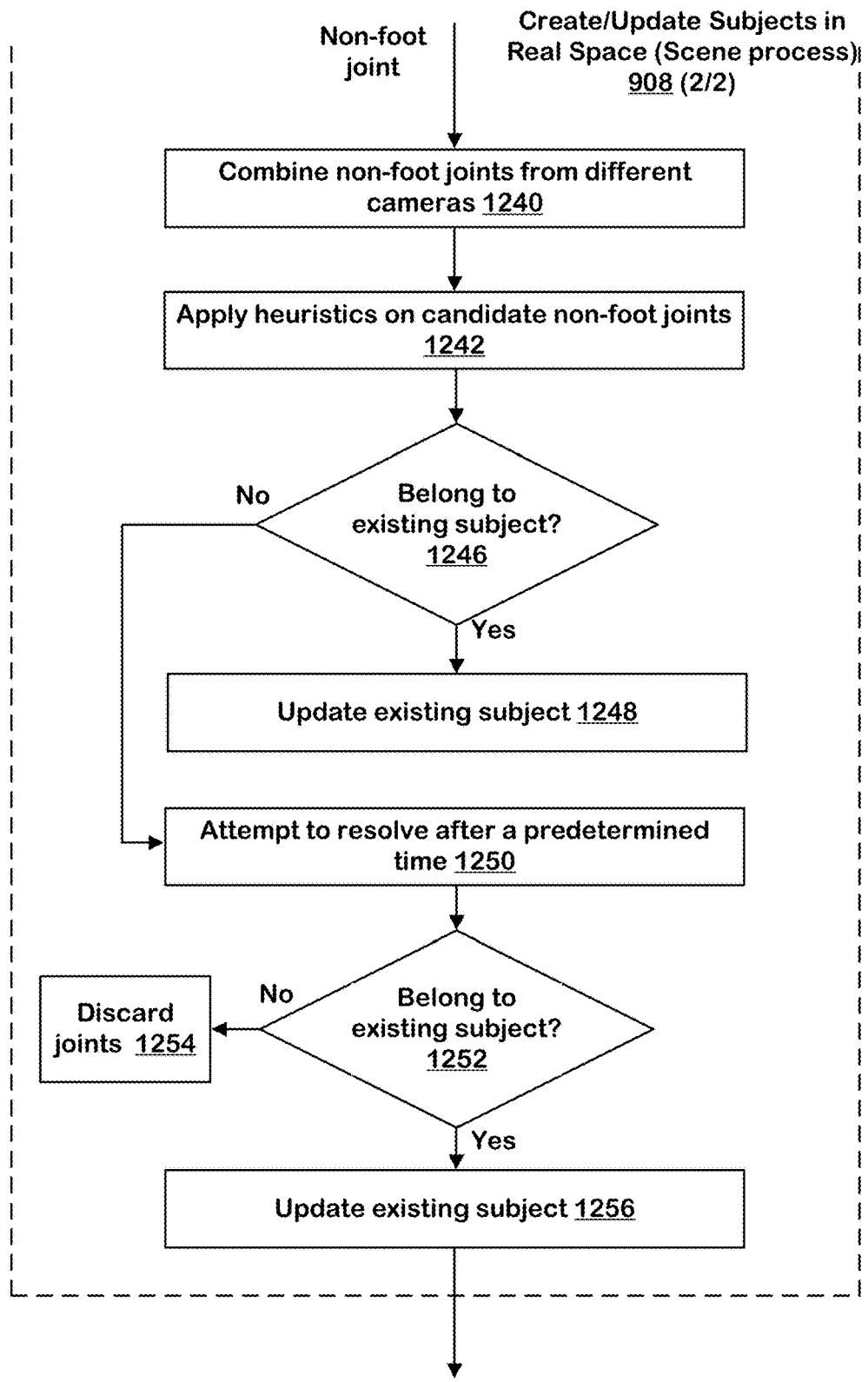
FIG. 12B is a flowchart showing a second part of more detailed process steps for the scene process of FIG. 9.

A flowchart FIG. 12B illustrates a second part of more detailed steps for the "scene process" step 908. At step 1240, the data structures of non-foot joints are combined from multiple arrays of joints data structures corresponding to images in the sequence of images from cameras with overlapping fields of view. This is performed by mapping corresponding points from a first image from a first camera to a second image from a second camera with overlapping fields of view. Some details of this process are described above. Heuristics are applied at step 1242 to candidate non-foot joints. At step 1246 it is determined whether a candidate non-foot joint belongs to an existing subject. If so, the existing subject is updated at step 1248. Otherwise, the candidate non-foot joint is processed again at step 1250 after a predetermined time to match it with an existing subject. At step 1252 it is checked whether the non-foot joint belongs to an existing subject. If true, the subject is updated at step 1256. Otherwise, the joint is discarded at step 1254.

In an example embodiment, the processes to identify new subjects, track subjects and eliminate subjects (who have left the real space or were incorrectly generated) are implemented as part of an "entity cohesion algorithm" performed by the runtime system (also referred to as the inference system). An entity is a constellation of joints referred to as subject above. The entity cohesion algorithm identifies entities in the real space and updates locations of the joints in real space to track movement of the entity.

Figure 14:
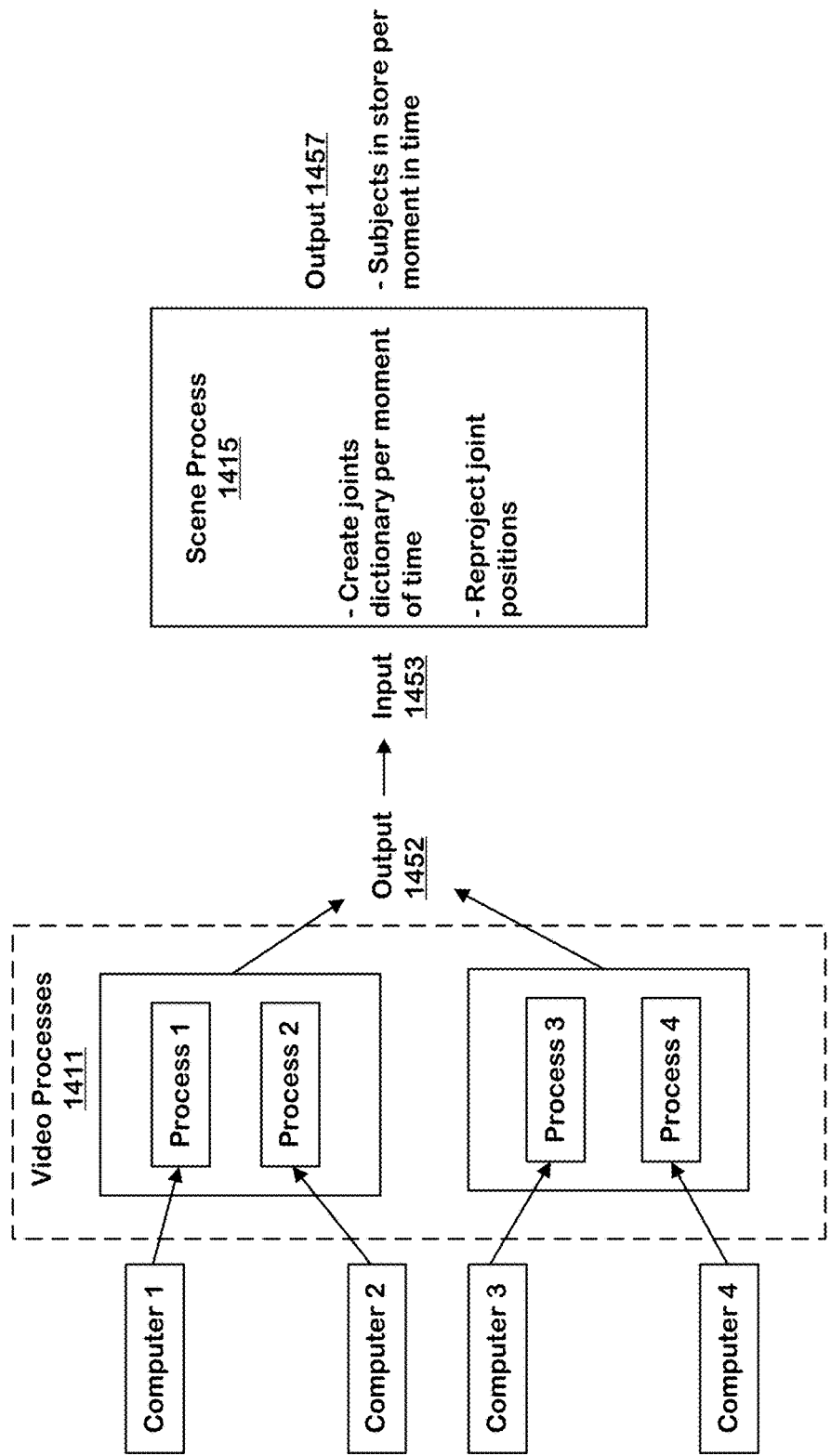
FIG. 14 is an illustration of video and scene processes in an embodiment of the system of FIG. 1.

FIG. 14 presents an illustration of video processes 1411 and scene process 1415. In the illustrated embodiment, four video processes are shown, each processing images from one or more cameras 114. The video processes, process images as described above and identify joints per frame. In one embodiment, each video process identifies the 2D coordinates, a confidence number, a joint number and a unique ID per joint per frame. The outputs 1452 of all video processes are given as input 1453 to the scene process 1415. In one embodiment, the scene process creates a joint key-value dictionary per moment in time in which the key is the camera identifier and the value is the arrays of joints. The joints are re-projected into perspectives of cameras with overlapping fields of view. The re-projected joints are stored as a key-value dictionary, and can be used to produce foreground subject masks for each image in each camera as discussed below. The key in this dictionary is a combination of joint id and camera_id. The values in the dictionary are 2D coordinates of the joint re-projected into the target camera's perspective.

The scene process 1415 produces an output 1457 comprising a list of all subjects in the real space at a moment in time. The list includes a key-value dictionary per subject. The key is a unique identifier of a subject and the value is another key-value dictionary with the key as the frame number and the value as the camera-subject joint key-value dictionary. The camera-subject joint key-value dictionary is a per subject dictionary in which the key is the camera identifier and the value is a list of joints.

Image Analysis to Identify and Track Inventory Items Per Subject

A system and various implementations for tracking puts and takes of inventory items by subjects in an area of real space are described with reference to FIGS. 15A to 25. The system and processes are described with reference to FIG. 15A, an architectural level schematic of a system in accordance with an implementation. Because FIG. 15A is an architectural diagram, certain details are omitted to improve the clarity of the description.

Architecture of Multi-CNN Pipelines

Figure 15A:
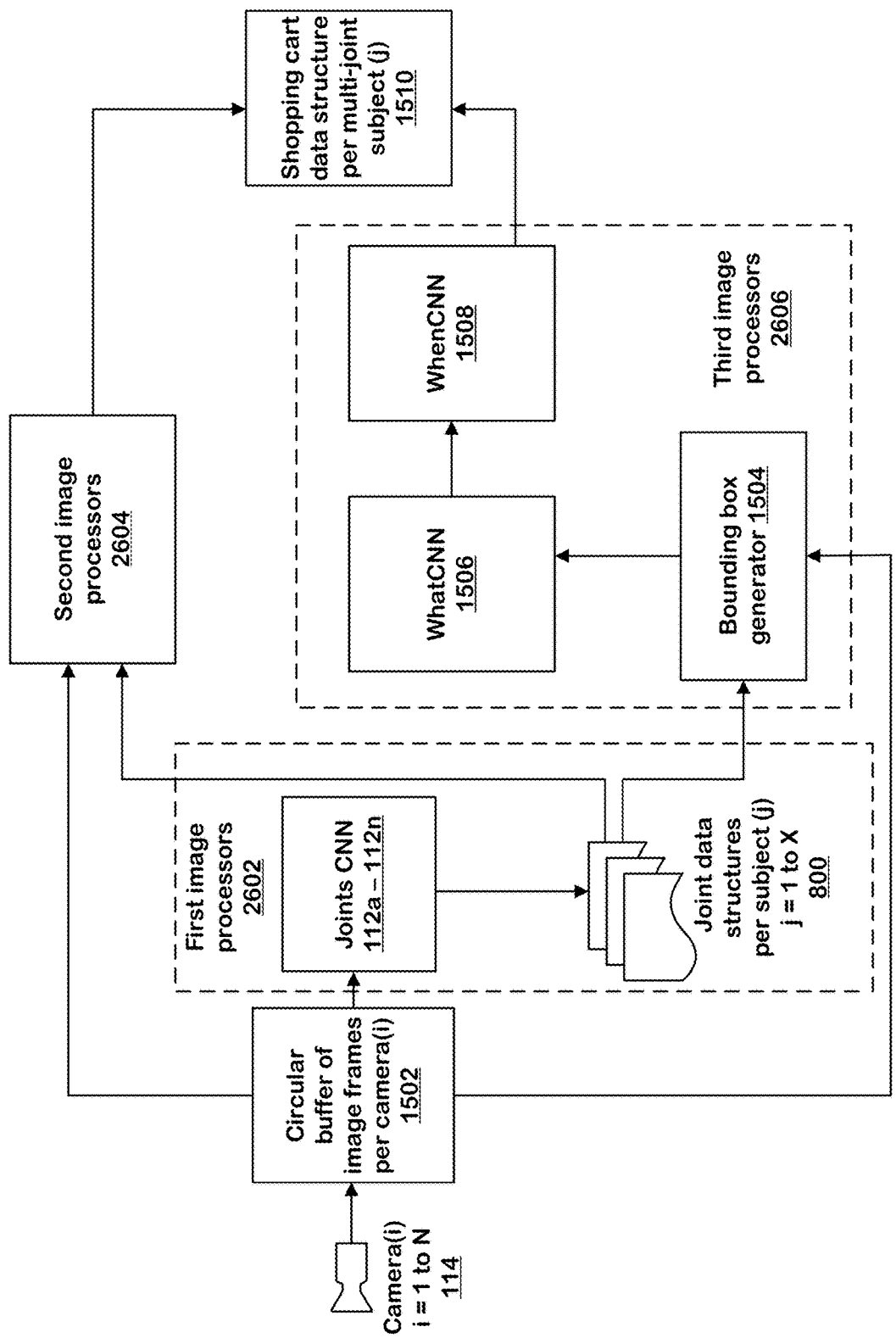
FIG. 15a is a schematic showing a pipeline with multiple convolutional neural networks (CNNs) including joints-CNN, WhatCNN and WhenCNN to generate a shopping cart data structure per subject in the real space.

FIG. 15A is a high-level architecture of pipelines of convolutional neural networks (also referred to as multi-CNN pipelines) processing image frames received from cameras 114 to generate shopping cart data structures for each subject in the real space. The system described here includes per camera image recognition engines as described above for identifying and tracking multi joint subjects.

Alternative image recognition engines can be used, including examples in which only one "joint" is recognized and tracked per individual, or other features or other types of images data over space and time are utilized to recognize and track subjects in the real space being processed.

The multi-CNN pipelines run in parallel per camera, moving images from respective cameras to image recognition engines 112a-112n via circular buffers 1502 per camera. In one embodiment, the system is comprised of three subsystems: first image processors subsystem 2602, second image processors subsystem 2604 and third image processors subsystem 2606. In one embodiment, the first image processors subsystem 2602 includes image recognition engines 112a-112n implemented as convolutional neural networks (CNNs) and referred to as joint CNNs 112a-112n. As described in relation to FIG. 1, cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space.

In one embodiment, the cameras 114 are installed in a shopping store (such as a supermarket) such that sets of cameras (two or more) with overlapping fields of view are positioned over each aisle to capture images of real space in the store. There are N cameras in the real space, however, for simplification, only one camera is shown in FIG. 17A as camera(i) where the value of i ranges from 1 to N. Each camera produces a sequence of images of real space corresponding to its respective field of view.

In one embodiment, the image frames corresponding to sequences of images from each camera are sent at the rate of 30 frames per second (fps) to respective image recognition engines 112a-112n. Each image frame has a timestamp, identity of the camera (abbreviated as "camera_id"), and a frame identity (abbreviated as "frame_id") along with the image data. The image frames are stored in a circular buffer 1502 (also referred to as a ring buffer) per camera 114. Circular buffers 1502 store a set of consecutively time-stamped image frames from respective cameras 114.

A joints CNN processes sequences of image frames per camera and identifies 18 different types of joints of each subject present in its respective field of view. The outputs of joints CNNs 112a-112n corresponding to cameras with overlapping fields of view are combined to map the location of joints from 2D image coordinates of each camera to 3D coordinates of real space. The joints data structures 800 per subject (j) where j equals 1 to x, identify locations of joints of a subject (j) in the real space. The details of subject data structure 800 are presented in FIG. 8. In one example embodiment, the joints data structure 800 is a two level key-value dictionary of joints of each subject. A first key is the frame number and the value is a second key-value dictionary with the key as the camera_id and the value as the list of joints assigned to a subject.

The data sets comprising subjects identified by joints data structures 800 and corresponding image frames from sequences of image frames per camera are given as input to a bounding box generator 1504 in the third image processors subsystem 2606. The third image processors subsystem further comprise foreground image recognition engines. In one embodiment, the foreground image recognition engines recognize semantically significant objects in the foreground (i.e. shoppers, their hands and inventory items) as they relate to puts and takes of inventory items for example, over time in the images from each camera. In the example implementation shown in FIG. 15A, the foreground image recognition engines are implemented as WhatCNN 1506 and WhenCNN 1508. The bounding box generator 1504 implements the logic to process the data sets to specify bounding boxes which include images of hands of identified subjects in images in the sequences of images. The bounding box generator 1504 identifies locations of hand joints in each source image frame per camera using locations of hand joints in the multi-joints data structures 800 corresponding to the respective source image frame. In one embodiment, in which the coordinates of the joints in subject data structure indicate location of joints in 3D real space coordinates, the bounding box generator maps the joint locations from 3D real space coordinates to 2D coordinates in the image frames of respective source images.

The bounding box generator 1504 creates bounding boxes for hand joints in image frames in a circular buffer per camera 114. In one embodiment, the bounding box is a 128 pixels (width) by 128 pixels (height) portion of the image frame with the hand joint located in the center of the bounding box. In other embodiments, the size of the bounding box is 64 pixels×64 pixels or 32 pixels×32 pixels. Form subjects in an image frame from a camera, there can be a maximum of 2 m hand joints, thus 2 m bounding boxes. However, in practice fewer than 2 m hands are visible in an image frame because of occlusions due to other subjects or other objects. In one example embodiment, the hand locations of subjects are inferred from locations of elbow and wrist joints. For example, the right hand location of a subject is extrapolated using the location of the right elbow (identified as p1) and the right wrist (identified as p2) as extrapolation_amount*(p2−p1)+p2 where extrapolation_amount equals 0.4. In another embodiment, the joints CNN 112a-112n are trained using left and right hand images. Therefore, in such an embodiment, the joints CNN 112a-112n directly identify locations of hand joints in image frames per camera. The hand locations per image frame are used by the bounding box generator 1504 to create a bounding box per identified hand joint.

WhatCNN 1506 is a convolutional neural network trained to process the specified bounding boxes in the images to generate a classification of hands of the identified subjects. One trained WhatCNN 1506 processes image frames from one camera. In the example embodiment of the shopping store, for each hand joint in each image frame, the WhatCNN 1506 identifies whether the hand joint is empty. The WhatCNN 1506 also identifies a SKU (stock keeping unit) number of the inventory item in the hand joint, a confidence value indicating the item in the hand joint is a non-SKU item (i.e. it does not belong to the shopping store inventory) and a context of the hand joint location in the image frame.

The outputs of WhatCNN models 1506 for all cameras 114 are processed by a single WhenCNN model 1508 for a pre-determined window of time. In the example of a shopping store, the WhenCNN 1508 performs time series analysis for both hands of subjects to identify whether a subject took a store inventory item from a shelf or put a store inventory item on a shelf. A shopping cart data structure 1510 (also referred to as a log data structure including a list of inventory items) is created per subject to keep a record of the store inventory items in a shopping cart (or basket) associated with the subject.

The second image processors subsystem 2604 receives the same data sets comprising subjects identified by joints data structures 800 and corresponding image frames from sequences of image frames per camera as given input to the third image processors. The subsystem 2604 includes background image recognition engines, recognizing semantically significant differences in the background (i.e. inventory display structures like shelves) as they relate to puts and takes of inventory items for example, over time in the images from each camera. A selection logic component (not shown in FIG. 15A) uses a confidence score to select output from either the second image processors or the third image processors to generate the shopping cart data structure 1510.

Figure 15B:
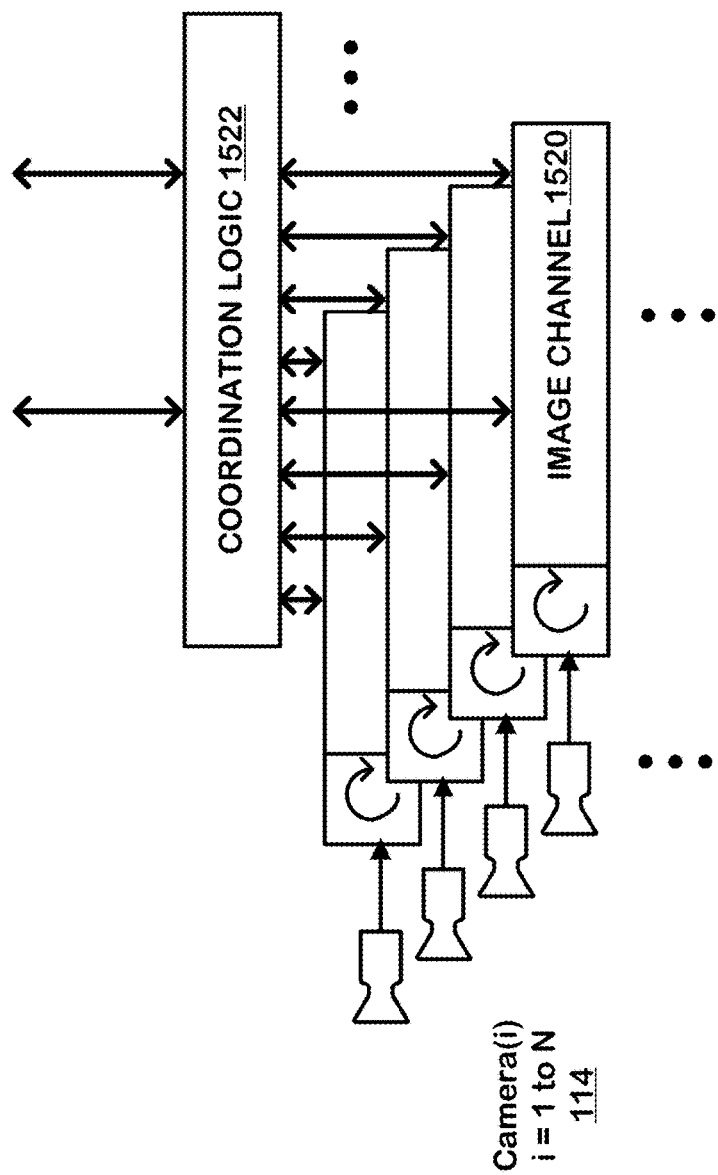
FIG. 15b shows multiple image channels from multiple cameras and coordination logic for the subjects and their respective shopping cart data structures.

FIG. 15B shows coordination logic module 1522 combining results of multiple WhatCNN models and giving it as input to a single WhenCNN model. As mentioned above, two or more cameras with overlapping fields of view capture images of subjects in real space. Joints of a single subject can appear in image frames of multiple cameras in respective image channel 1520. A separate WhatCNN model identifies SKUs of inventory items in hands (represented by hand joints) of subjects. The coordination logic module 1522 combines the outputs of WhatCNN models into a single consolidated input for the WhenCNN model. The WhenCNN model 1508 operates on the consolidated input to generate the shopping cart of the subject.

Figure 16:
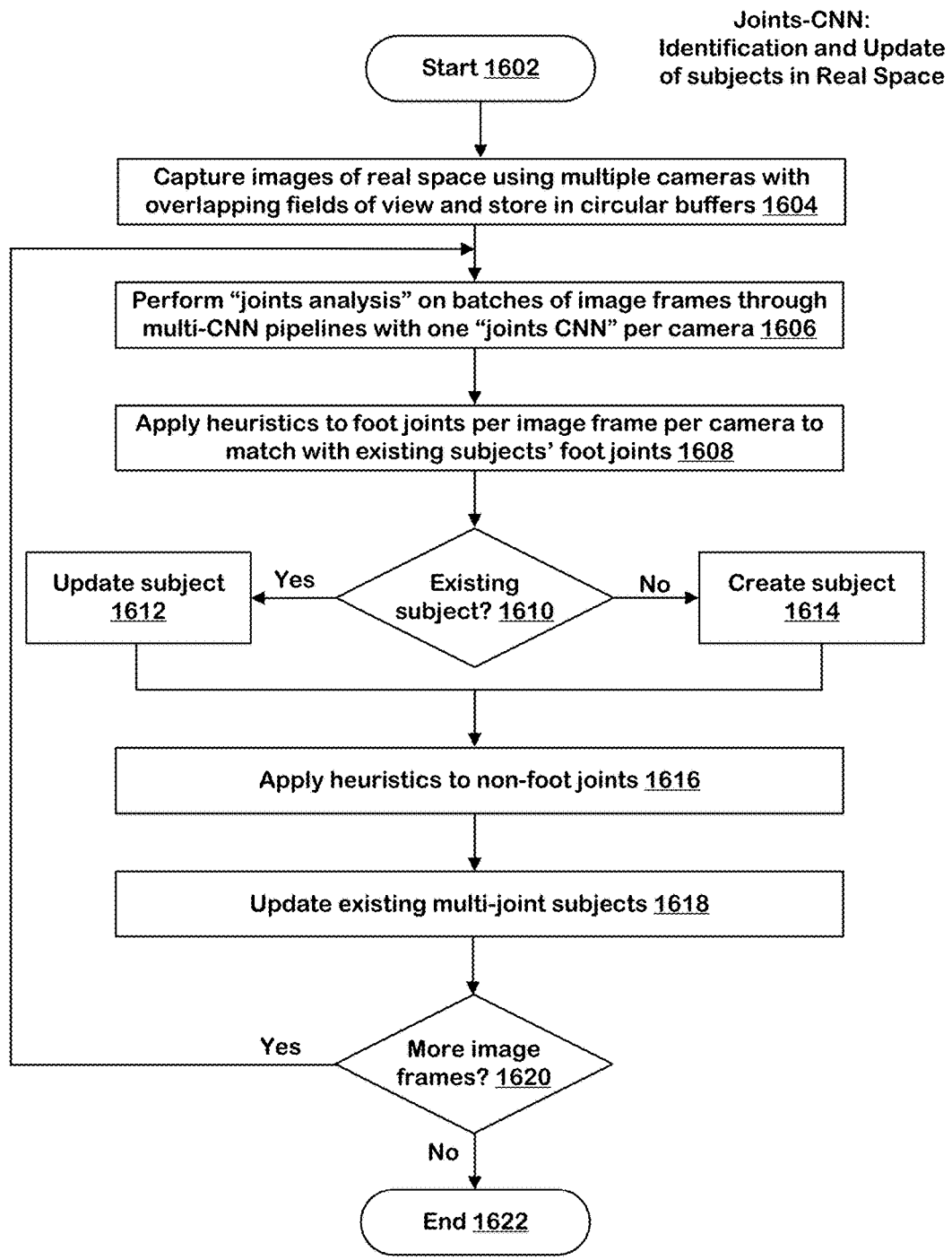
FIG. 16 is a flowchart illustrating process steps for identifying and updating subjects in the real space.
Figure 17:
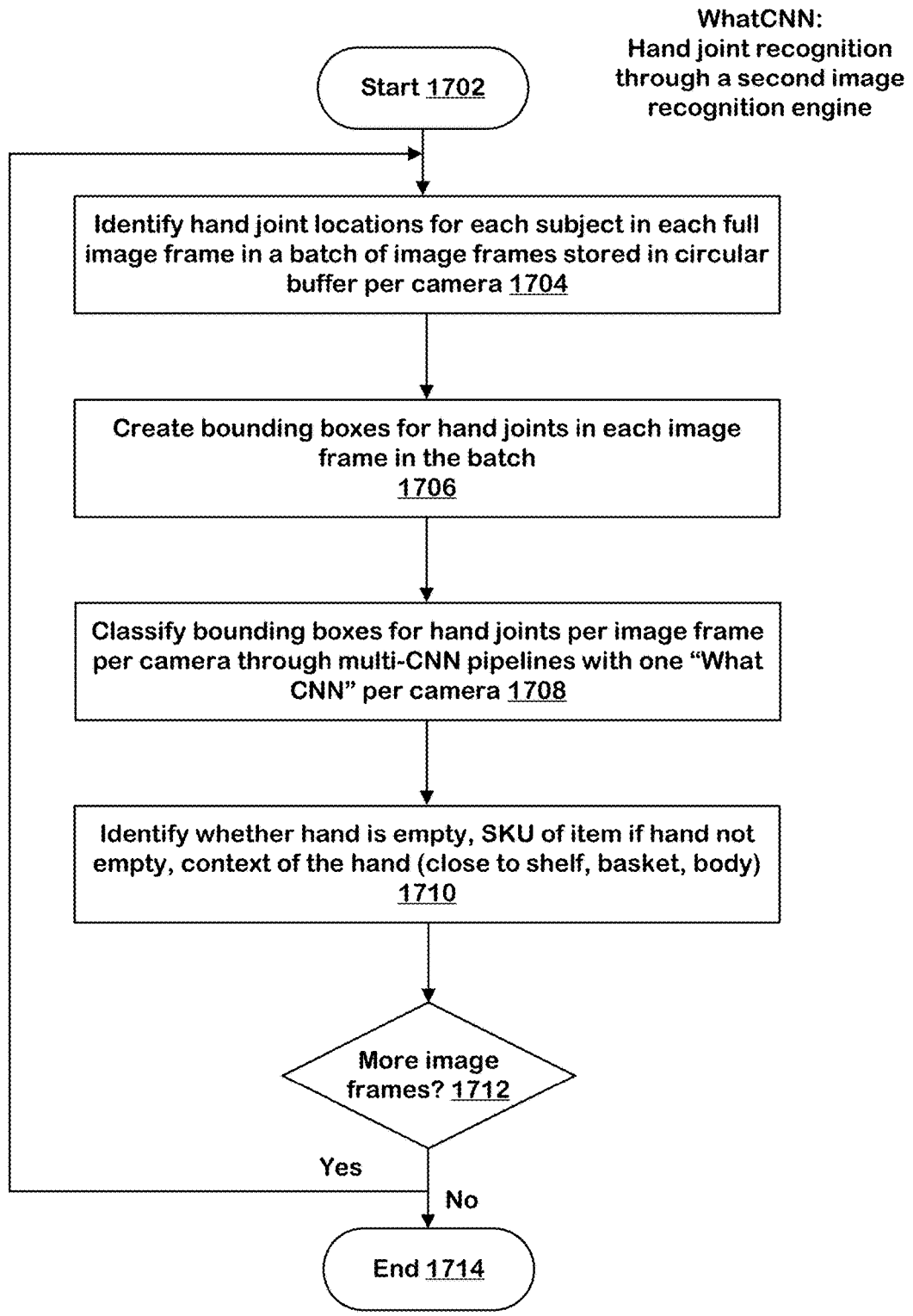
FIG. 17 is a flowchart showing process steps for processing hand joints of subjects to identify inventory items.
Figure 18:
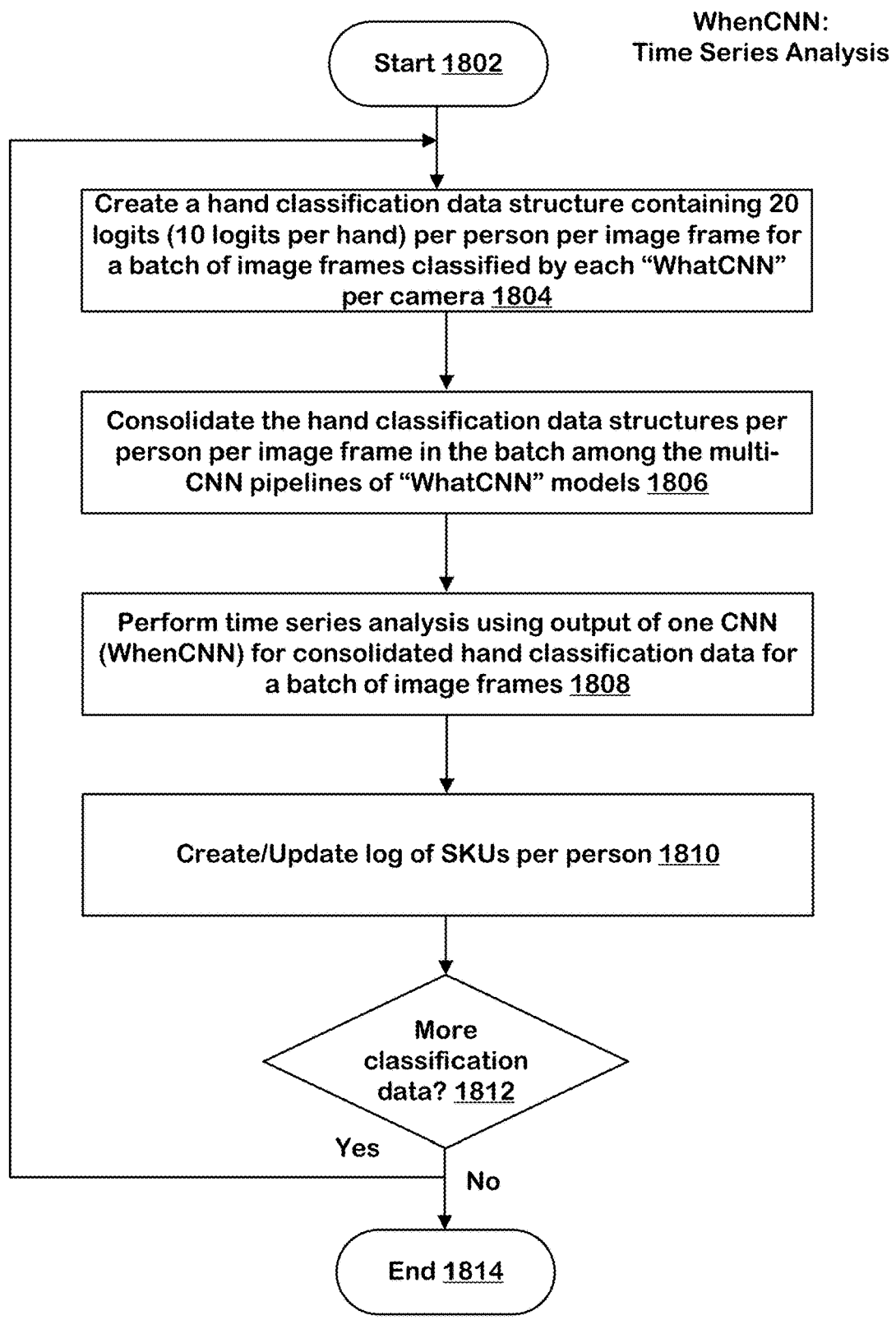
FIG. 18 is a flowchart showing process steps for time series analysis of inventory items per hand joint to create a shopping cart data structure per subject.

Detailed implementation of the system comprising multi-CNN pipelines of FIG. 15A is presented in FIGS. 16, 17, and 18. In the example of the shopping store, the system tracks puts and takes of inventory items by subjects in an area of real space. The area of real space is the shopping store with inventory items placed in shelves organized in aisles as shown in FIGS. 2 and 3. It is understood that shelves containing inventory items can be organized in a variety of different arrangements. For example, shelves can be arranged in a line with their back sides against a wall of the shopping store and the front side facing towards an open area in the real space. A plurality of cameras 114 with overlapping fields of view in the real space produce sequences of images of their corresponding fields of view. The field of view of one camera overlaps with the field of view of at least one other camera as shown in FIGS. 2 and 3.

Joints CNN—Identification and Update of Subjects

FIG. 16 is a flowchart of processing steps performed by joints CNN 112a-112n to identify subjects in the real space. In the example of a shopping store, the subjects are customers moving in the store in aisles between shelves and other open spaces. The process starts at step 1602. Note that, as described above, the cameras are calibrated before sequences of images from cameras are processed to identify subjects. Details of camera calibration are presented above. Cameras 114 with overlapping fields of view capture images of real space in which subjects are present (step 1604). In one embodiment, the cameras are configured to generate synchronized sequences of images. The sequences of images of each camera are stored in respective circular buffers 1502 per camera. A circular buffer (also referred to as a ring buffer) stores the sequences of images in a sliding window of time. In an embodiment, a circular buffer stores 110 image frames from a corresponding camera. In another embodiment, each circular buffer 1502 stores image frames for a time period of 3.5 seconds. It is understood, in other embodiments, the number of image frames (or the time period) can be greater than or less than the example values listed above.

Joints CNNs 112a-112n, receive sequences of image frames from corresponding cameras 114 (step 1606). Each joints CNN processes batches of images from a corresponding camera through multiple convolution network layers to identify joints of subjects in image frames from corresponding camera. The architecture and processing of images by an example convolutional neural network is presented FIG. 5. As cameras 114 have overlapping fields of view, the joints of a subject are identified by more than one joints-CNN. The two dimensional (2D) coordinates of joints data structures 600 produced by joints-CNN are mapped to three dimensional (3D) coordinates of the real space to identify joints locations in the real space. Details of this mapping are presented in discussion of FIG. 7 in which the tracking engine 110 translates the coordinates of the elements in the arrays of joints data structures corresponding to images in different sequences of images into candidate joints having coordinates in the real space.

The joints of a subject are organized in two categories (foot joints and non-foot joints) for grouping the joints into constellations, as discussed above. The left and right-ankle joint type in the current example, are considered foot joints for the purpose of this procedure. At step 1608, heuristics are applied to assign a candidate left foot joint and a candidate right foot joint to a set of candidate joints to create a subject. Following this, at step 1610, it is determined whether the newly identified subject already exists in the real space. If not, then a new subject is created at step 1614, otherwise, the existing subject is updated at step 1612.

Other joints from the galaxy of candidate joints can be linked to the subject to build a constellation of some or all of the joint types for the created subject. At step 1616, heuristics are applied to non-foot joints to assign those to the identified subjects. The global metric calculator 702 calculates the global metric value and attempts to minimize the value by checking different combinations of non-foot joints. In one embodiment, the global metric is a sum of heuristics organized in four categories as described above.

The logic to identify sets of candidate joints comprises heuristic functions based on physical relationships among joints of subjects in real space to identify sets of candidate joints as subjects. At step 1618, the existing subjects are updated using the corresponding non-foot joints. If there are more images for processing (step 1620), steps 1606 to 1618 are repeated, otherwise the process ends at step 1622. A first data sets are produced at the end of the process described above. The first data sets identify subject and the locations of the identified subjects in the real space. In one embodiment, the first data sets are presented above in relation to FIG. 15A as joints data structures 800 per subject.

WhatCNN—Classification of Hand Joints

FIG. 17 is a flowchart illustrating processing steps to identify inventory items in hands of subjects identified in the real space. In the example of a shopping store, the subjects are customers in the shopping store. As the customers move in the aisles and opens spaces, they pick up inventory items stocked in the shelves and put the items in their shopping cart or basket. The image recognition engines identify subjects in the sets of images in the sequences of images received from the plurality of cameras. The system includes the logic to process sets of images in the sequences of images that include the identified subjects to detect takes of inventory items by identified subjects and puts of inventory items on the shelves by identified subjects.

In one embodiment, the logic to process sets of images includes, for the identified subjects, logic to process images to generate classifications of the images of the identified subjects. The classifications include whether the identified subject is holding an inventory item. The classifications include a first nearness classification indicating a location of a hand of the identified subject relative to a shelf. The classifications include a second nearness classification indicating a location a hand of the identified subject relative to a body of the identified subject. The classifications further include a third nearness classification indicating a location a hand of the identified subject relative to a basket associated with an identified subject. Finally, the classifications include an identifier of a likely inventory item.

In another embodiment, the logic to process sets of images includes, for the identified subjects, logic to identify bounding boxes of data representing hands in images in the sets of images of the identified subjects. The data in the bounding boxes is processed to generate classifications of data within the bounding boxes for the identified subjects. In such an embodiment, the classifications include whether the identified subject is holding an inventory item. The classifications include a first nearness classification indicating a location of a hand of the identified subject relative to a shelf. The classifications include a second nearness classification indicating a location of a hand of the identified subject relative to a body of the identified subject. The classifications include a third nearness classification indicating a location of a hand of the identified subject relative to a basket associated with an identified subject. Finally, the classifications include an identifier of a likely inventory item.

The process starts at step 1702. At step 1704, locations of hands (represented by hand joints) of subjects in image frames are identified. The bounding box generator 1504 identifies hand locations of subjects per frame from each camera using joint locations identified in the first data sets generated by joints CNNs 112a-112n as described in FIG. 18. Following this, at step 1706, the bounding box generator 1504 processes the first data sets to specify bounding boxes which include images of hands of identified multi joint subjects in images in the sequences of images. Details of bounding box generator are presented above in discussion of FIG. 15A.

A second image recognition engine receives sequences of images from the plurality of cameras and processes the specified bounding boxes in the images to generate a classification of hands of the identified subjects (step 1708). In one embodiment, each of the image recognition engines used to classify the subjects based on images of hands comprises a trained convolutional neural network referred to as a WhatCNN 1506. WhatCNNs are arranged in multi-CNN pipelines as described above in relation to FIG. 15A. In one embodiment, the input to a WhatCNN is a multi-dimensional array B×W×H×C (also referred to as a B×W×H×C tensor). "B" is the batch size indicating the number of image frames in a batch of images processed by the WhatCNN. "W" and "H" indicate the width and height of the bounding boxes in pixels, "C" is the number of channels. In one embodiment, there are 30 images in a batch (B=30), so the size of the bounding boxes is 32 pixels (width) by 32 pixels (height). There can be six channels representing red, green, blue, foreground mask, forearm mask and upperarm mask, respectively. The foreground mask, forearm mask and upperarm mask are additional and optional input data sources for the WhatCNN in this example, which the CNN can include in the processing to classify information in the RGB image data. The foreground mask can be generated using mixture of Gaussian algorithms, for example. The forearm mask can be a line between the wrist and elbow providing context produced using information in the Joints data structure. Likewise the upperarm mask can be a line between the elbow and shoulder produced using information in the Joints data structure. Different values of B, W, H and C parameters can be used in other embodiments. For example, in another embodiment, the size of the bounding boxes is larger e.g., 64 pixels (width) by 64 pixels (height) or 128 pixels (width) by 128 pixels (height).

Each WhatCNN 1506 processes batches of images to generate classifications of hands of the identified subjects. The classifications include whether the identified subject is holding an inventory item. The classifications include one or more classifications indicating locations of the hands relative to the shelf and relative to the subject, usable to detect puts and takes. In this example, a first nearness classification indicates a location of a hand of the identified subject relative to a shelf. The classifications include in this example a second nearness classification indicating a location a hand of the identified subject relative to a body of the identified subject, where a subject may hold an inventory item during shopping. The classifications in this example further include a third nearness classification indicating a location of a hand of the identified subject relative to a basket associated with an identified subject, where a "basket" in this context is a bag, a basket, a cart or other object used by the subject to hold the inventory items during shopping. Finally, the classifications include an identifier of a likely inventory item. The final layer of the WhatCNN 1506 produces logits which are raw values of predictions. The logits are represented as floating point values and further processed, as described below, for generating a classification result. In one embodiment, the outputs of the WhatCNN model, include a multi-dimensional array B×L (also referred to as a B×L tensor). "B" is the batch size, and "L=N+5" is the number of logits output per image frame. "N" is the number of SKUs representing "N" unique inventory items for sale in the shopping store.

The output "L" per image frame is a raw activation from the WhatCNN 1506. Logits "L" are processed at step 1710 to identify inventory item and context. The first "N" logits represent confidence that the subject is holding one of the "N" inventory items. Logits "L" include an additional five (5) logits which are explained below. The first logit represents confidence that the image of the item in hand of the subject is not one of the store SKU items (also referred to as non-SKU item). The second logit indicates a confidence whether the subject is holding an item or not. A large positive value indicates that WhatCNN model has a high level of confidence that the subject is holding an item. A large negative value indicates that the model is confident that the subject is not holding any item. A close to zero value of the second logit indicates that WhatCNN model is not confident in predicting whether the subject is holding an item or not.

The next three logits represent first, second and third nearness classifications, including a first nearness classification indicating a location of a hand of the identified subject relative to a shelf, a second nearness classification indicating a location of a hand of the identified subject relative to a body of the identified subject, and a third nearness classification indicating a location of a hand of the identified subject relative to a basket associated with an identified subject. Thus, the three logits represent context of the hand location with one logit each indicating confidence that the context of the hand is near to a shelf, near to a basket (or a shopping cart), or near to a body of the subject. In one embodiment, the WhatCNN is trained using a training dataset containing hand images in the three contexts: near to a shelf, near to a basket (or a shopping cart), and near to a body of a subject. In another embodiment, a "nearness"

parameter is used by the system to classify the context of the hand. In such an embodiment, the system determines the distance of a hand of the identified subject to the shelf, basket (or a shopping cart), and body of the subject to classify the context.

The output of a WhatCNN is "L" logits comprised of N SKU logits, 1 Non-SKU logit, 1 holding logit, and 3 context logits as described above. The SKU logits (first N logits) and the non-SKU logit (the first logit following the N logits) are processed by a softmax function. As described above with reference to FIG. 5, the softmax function transforms a K-dimensional vector of arbitrary real values to a K-dimensional vector of real values in the range [0, 1] that add up to 1. A softmax function calculates the probabilities distribution of the item over N+1 items. The output values are between 0 and 1, and the sum of all the probabilities equals one. The softmax function (for multi-class classification) returns the probabilities of each class. The class that has the highest probability is the predicted class (also referred to as target class).

The holding logit is processed by a sigmoid function. The sigmoid function takes a real number value as input and produces an output value in the range of 0 to 1. The output of the sigmoid function identifies whether the hand is empty or holding an item. The three context logits are processed by a softmax function to identify the context of the hand joint location. At step 1712, it is checked if there are more images to process. If true, steps 1704-1710 are repeated, otherwise the process ends at step 1714.

WhenCNN—Time Series Analysis to Identify Puts and Takes of Items

In one embodiment, the system implements logic to perform time sequence analysis over the classifications of subjects to detect takes and puts by the identified subjects based on foreground image processing of the subjects. The time sequence analysis identifies gestures of the subjects and inventory items associated with the gestures represented in the sequences of images.

The outputs of WhatCNNs 1506 in the multi-CNN pipelines are given as input to the WhenCNN 1508 which processes these inputs to detect takes and puts by the identified subjects. Finally, the system includes logic, responsive to the detected takes and puts, to generate a log data structure including a list of inventory items for each identified subject. In the example of a shopping store, the log data structure is also referred to as a shopping cart data structure 1510 per subject.

FIG. 18 presents a process implementing the logic to generate a shopping cart data structure per subject. The process starts at step 1802. The input to WhenCNN 1508 is prepared at step 1804. The input to the WhenCNN is a multi-dimensional array B×C×T×Cams, where B is the batch size, C is the number of channels, T is the number of frames considered for a window of time, and Cams is the number of cameras 114. In one embodiment, the batch size "B" is 64 and the value of "T" is 110 image frames or the number of image frames in 3.5 seconds of time.

For each subject identified per image frame, per camera, a list of 10 logits per hand joint (20 logits for both hands) is produced. The holding and context logits are part of the "L" logits generated by WhatCNN 1506 as described above.

[
| | |
|---|---|
| holding, | # 1 logit |
| context, | # 3 logits |
| slice_dot(sku, log_sku), | # 1 logit |
| slice_dot(sku, log_other_sku), | # 1 logit |
| slice_dot(sku, roll(log_sku, −30)), | # 1 logit |
| slice_dot(sku, roll(log_sku, 30)), | # 1 logit |
| slice_dot(sku, roll(log_other_sku, −30)), | # 1 logit |
| slice_dot(sku, roll(log_other_sku, 30)) | # 1 logit |
]

The above data structure is generated for each hand in an image frame and also includes data about the other hand of the same subject. For example, if data is for the left hand joint of a subject, corresponding values for the right hand are included as "other" logits. The fifth logit (item number 3 in the list above referred to as log_sku) is the log of SKU logit in "L" logits described above. The sixth logit is the log of SKU logit for other hand. A "roll" function generates the same information before and after the current frame. For example, the seventh logit (referred to as roll(log_sku, −30)) is the log of the SKU logit, 30 frames earlier than the current frame. The eighth logit is the log of the SKU logits for the hand, 30 frames later than the current frame. The ninth and tenth data values in the list are similar data for the other hand 30 frames earlier and 30 frames later than the current frame. A similar data structure for the other hand is also generated, resulting in a total of 20 logits per subject per image frame per camera. Therefore, the number of channels in the input to the WhenCNN is 20 (i.e. C=20 in the multi-dimensional array B×C×T×Cams).

For all image frames in the batch of image frames (e.g., B=64) from each camera, similar data structures of 20 hand logits per subject, identified in the image frame, are generated. A window of time (T=3.5 seconds or 110 image frames) is used to search forward and backward image frames in the sequence of image frames for the hand joints of subjects. At step 1806, the 20 hand logits per subject per frame are consolidated from multi-CNN pipelines. In one embodiment, the batch of image frames (64) can be imagined as a smaller window of image frames placed in the middle of a larger window of image frame 110 with additional image frames for forward and backward search on both sides. The input B×C×T×Cams to WhenCNN 1508 is composed of 20 logits for both hands of subjects identified in batch "B" of image frames from all cameras 114 (referred to as "Cams"). The consolidated input is given to a single trained convolutional neural network referred to as WhenCNN model 1508.

The output of the WhenCNN model comprises of 3 logits, representing confidence in three possible actions of an identified subject: taking an inventory item from a shelf, putting an inventory item back on the shelf, and no action. The three output logits are processed by a softmax function to predict an action performed. The three classification logits are generated at regular intervals for each subject and results are stored per person along with a time stamp. In one embodiment, the three logits are generated every twenty frames per subject. In such an embodiment, at an interval of every 20 image frames per camera, a window of 110 image frames is formed around the current image frame.

A time series analysis of these three logits per subject over a period of time is performed (step 1808) to identify gestures corresponding to true events and their time of occurrence. A non-maximum suppression (NMS) algorithm is used for this purpose. As one event (i.e. put or take of an item by a subject) is detected by WhenCNN 1508 multiple times (both from the same camera and from multiple cameras), the NMS removes superfluous events for a subject. NMS is a rescoring technique comprising two main tasks: "matching loss" that penalizes superfluous detections and "joint processing" of neighbors to know if there is a better detection close-by.

The true events of takes and puts for each subject are further processed by calculating an average of the SKU logits for 30 image frames prior to the image frame with the true event. Finally, the arguments of the maxima (abbreviated arg max or argmax) is used to determine the largest value. The inventory item classified by the argmax value is used to identify the inventory item put or take from the shelf. The inventory item is added to a log of SKUs (also referred to as shopping cart or basket) of respective subjects in step 1810. The process steps 1804 to 1810 are repeated, if there is more classification data (checked at step 1812). Over a period of time, this processing results in updates to the shopping cart or basket of each subject. The process ends at step 1814.

WhatCNN with Scene and Video Processes

Figure 19:
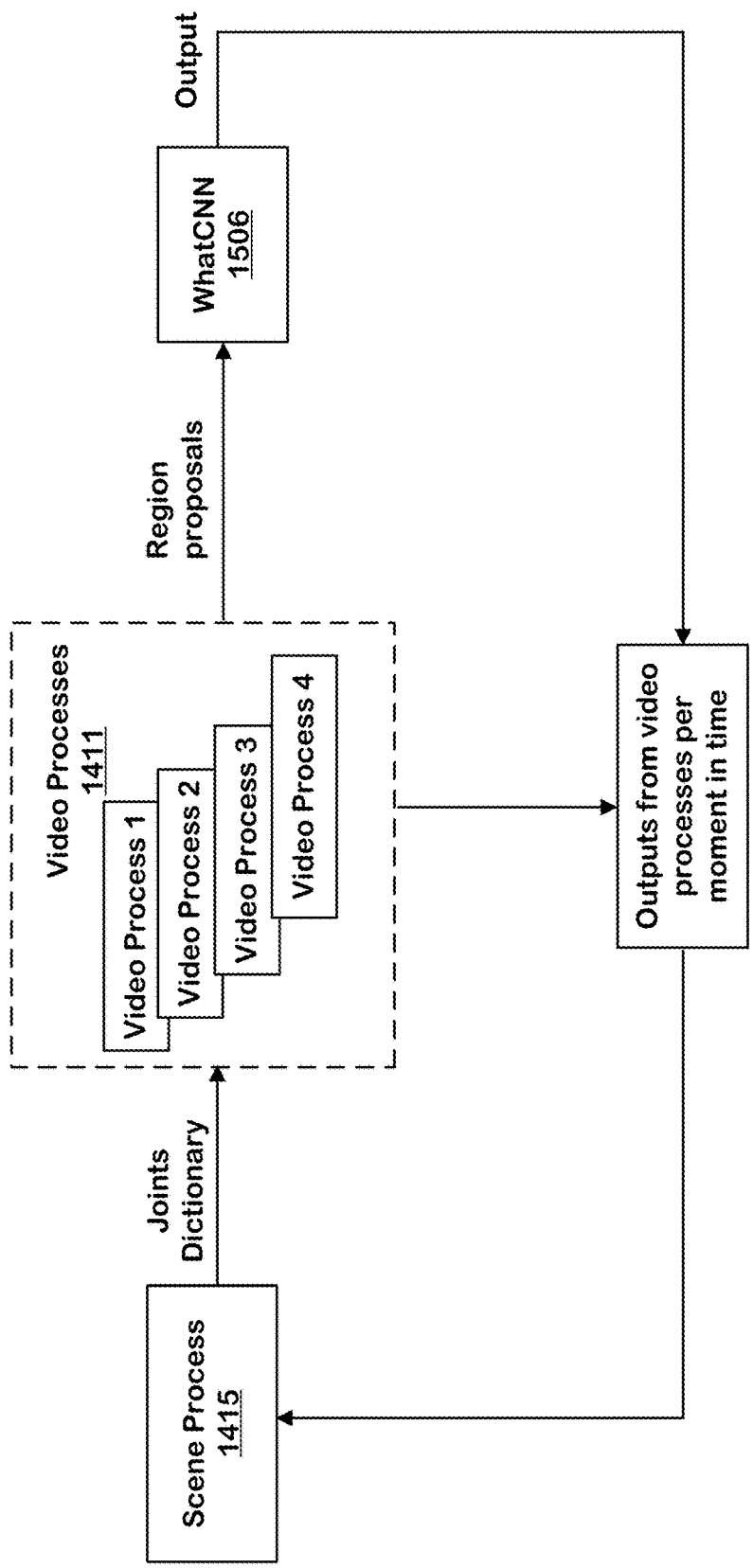

FIG. 19 presents an embodiment of the system in which data from scene process 1415 and video processes 1411 is given as input to WhatCNN model 1506 to generate hand image classifications. Note that the output of each video process is given to a separate WhatCNN model. The output from the scene process 1415 is a joints dictionary. In this dictionary, keys are unique joint identifiers and values are unique subject identifiers with which the joint is associated. If no subject is associated with a joint, then it is not included in the dictionary. Each video process 1411 receives a joints dictionary from the scene process and stores it into a ring buffer that maps frame numbers to the returned dictionary. Using the returned key-value dictionary, the video processes select subsets of the image at each moment in time that are near hands associated with identified subjects. These portions of image frames around hand joints can be referred to as region proposals.

In the example of a shopping store, a region proposal is the frame image of hand location from one or more cameras with the subject in their corresponding fields of view. A region proposal is generated by every camera in the system. It includes empty hands as well as hands carrying shopping store inventory items and items not belonging to shopping store inventory. Video processes select portions of image frames containing hand joint per moment in time. Similar slices of foreground masks are generated. The above (image portions of hand joints and foreground masks) are concatenated with the joints dictionary (indicating subjects to whom respective hand joints belong) to produce a multi-dimensional array. This output from video processes is given as input to the WhatCNN model.

The classification results of the WhatCNN model are stored in the region proposal data structures (produced by video processes). All regions for a moment in time are then given back as input to the scene process. The scene process stores the results in a key-value dictionary, where the key is a subject identifier and the value is a key-value dictionary, where the key is a camera identifier and the value is a region's logits. This aggregated data structure is then stored in a ring buffer that maps frame numbers to the aggregated structure for each moment in time.

WhenCNN with Scene and Video Processes

Figure 20:
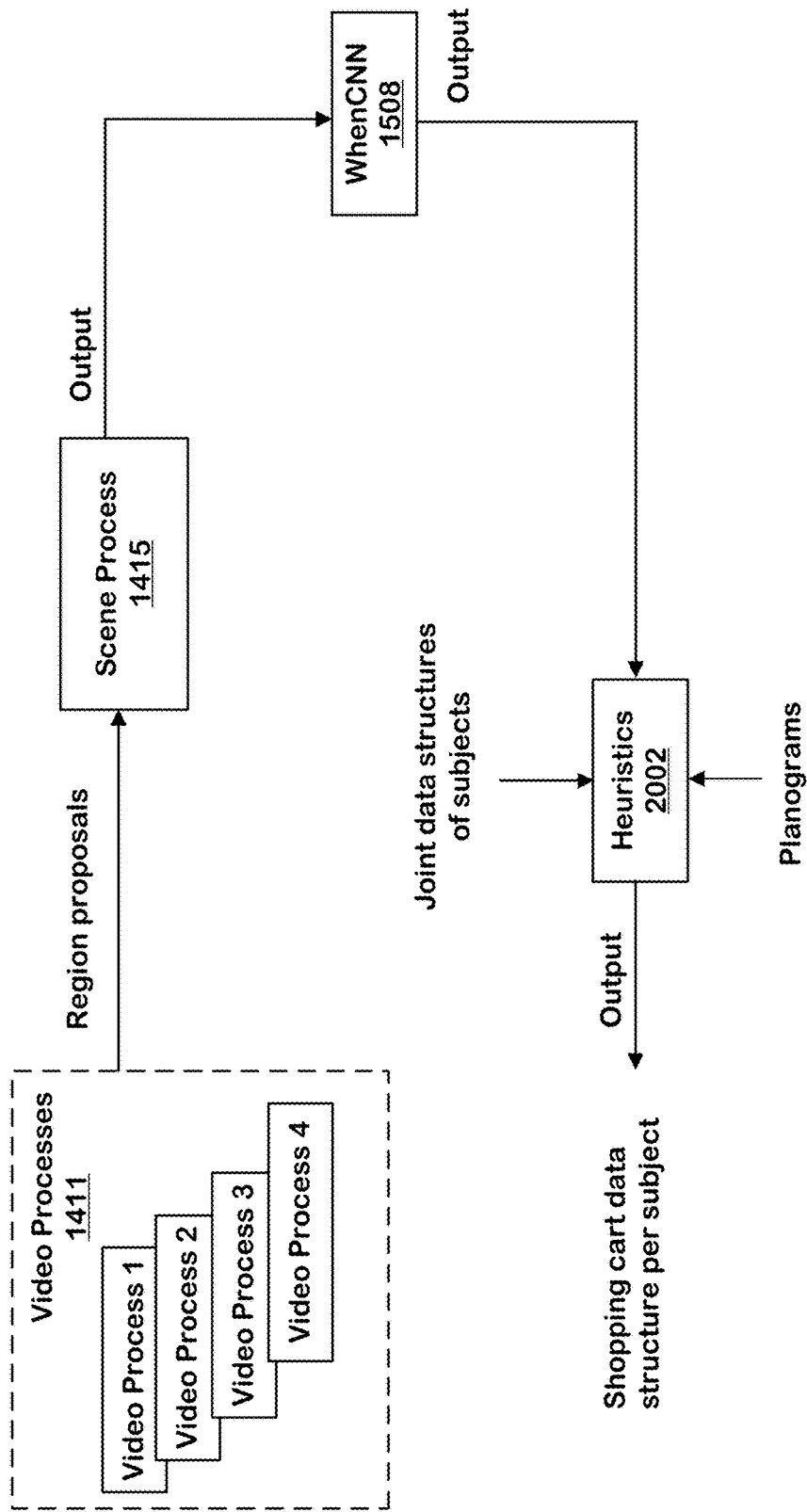

FIG. 20 presents an embodiment of the system in which the WhenCNN 1508 receives output from a scene process following the hand image classifications performed by the WhatCNN models per video process as explained in FIG. 19. Region proposal data structures for a period of time e.g., for one second, are given as input to the scene process. In one embodiment, in which cameras are taking images at the rate of 30 frames per second, the input includes 30 time periods and corresponding region proposals. The scene process reduces 30 region proposals (per hand) to a single integer representing the inventory item SKU. The output of the scene process is a key-value dictionary in which the key is a subject identifier and the value is the SKU integer.

The WhenCNN model 1508 performs a time series analysis to determine the evolution of this dictionary over time. This results in identification of items taken from shelves and put on shelves in the shopping store. The output of the WhenCNN model is a key-value dictionary in which the key is the subject identifier and the value is logits produced by the WhenCNN. In one embodiment, a set of heuristics 2002 is used to determine the shopping cart data structure 1510 per subject. The heuristics are applied to the output of the WhenCNN, joint locations of subjects indicated by their respective joints data structures, and planograms. The planograms are precomputed maps of inventory items on shelves. The heuristics 2002 determine, for each take or put, whether the inventory item is put on a shelf or taken from a shelf, whether the inventory item is put in a shopping cart (or a basket) or taken from the shopping cart (or the basket) or whether the inventory item is close to the identified subject's body.

Example Architecture of What-CNN Model

Figure 21:
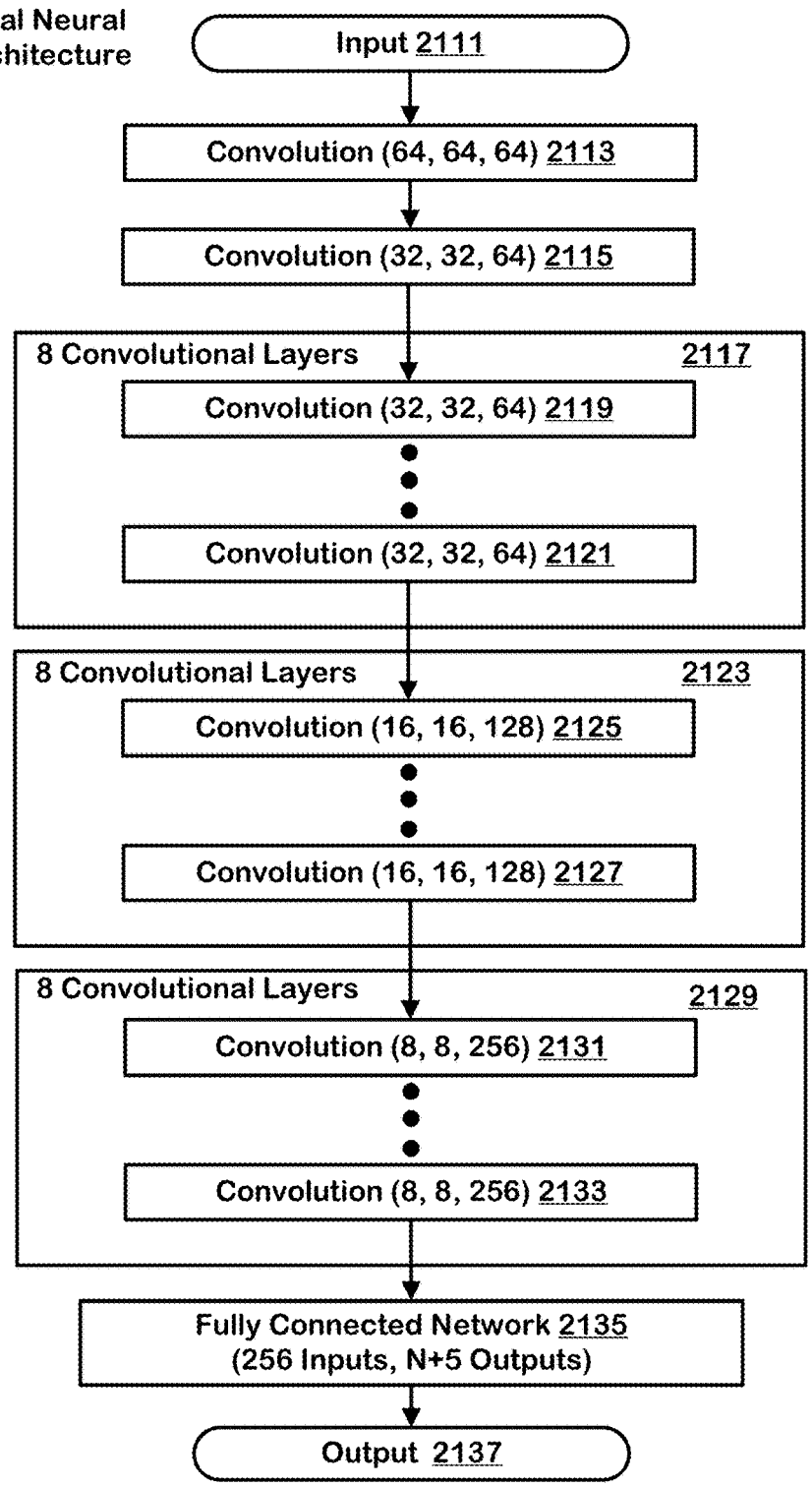
FIG. 21 presents an example architecture of a WhatCNN model identifying the dimensionality of convolutional layers.

FIG. 21 presents an example architecture of WhatCNN model 1506. In this example architecture, there are a total of 26 convolutional layers. The dimensionality of different layers in terms of their respective width (in pixels), height (in pixels) and number of channels is also presented. The first convolutional layer 2113 receives input 2111 and has a width of 64 pixels, height of 64 pixels and has 64 channels (written as 64×64×64). The details of input to the WhatCNN are presented above. The direction of arrows indicates flow of data from one layer to the following layer. The second convolutional layer 2115 has a dimensionality of 32×32×64. Followed by the second layer, there are eight convolutional layers (shown in box 2117) each with a dimensionality of 32×32×64. Only two layers 2119 and 2121 are shown in the box 2117 for illustration purposes. This is followed by another eight convolutional layers 2123 of 16×16×128 dimensions. Two such convolutional layers 2125 and 2127 are shown in FIG. 21. Finally, the last eight convolutional layers 2129, have a dimensionality of 8×8×256 each. Two convolutional layers 2131 and 2133 are shown in the box 2129 for illustration.

There is one fully connected layer 2135 with 256 inputs from the last convolutional layer 2133 producing N+5 outputs. As described above, "N" is the number of SKUs representing "N" unique inventory items for sale in the shopping store. The five additional logits include the first logit representing confidence that item in the image is a non-SKU item, and the second logit representing confidence whether the subject is holding an item. The next three logits represent first, second and third nearness classifications, as described above. The final output of the WhatCNN is shown at 2137. The example architecture uses batch normalization (BN). Distribution of each layer in a convolutional neural network (CNN) changes during training and it varies from one layer to another. This reduces convergence speed of the optimization algorithm. Batch normalization (Ioffe and Szegedy 2015) is a technique to overcome this problem. ReLU (Rectified Linear Unit) activation is used for each layer's non-linearity except for the final output where softmax is used.

Figure 22:
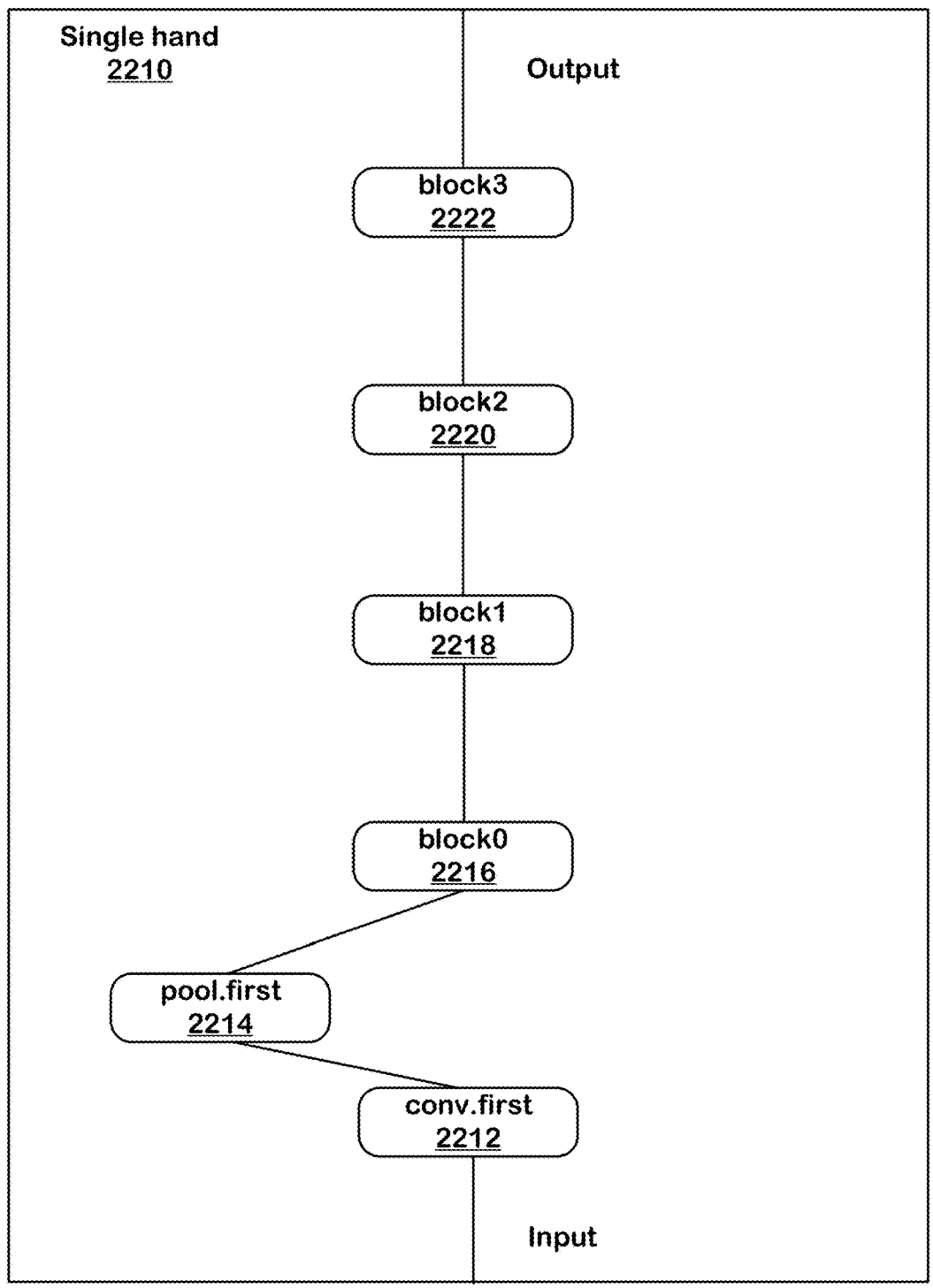
FIG. 22 presents a high level block diagram of an embodiment of a WhatCNN model for classification of hand images.
Figure 23:
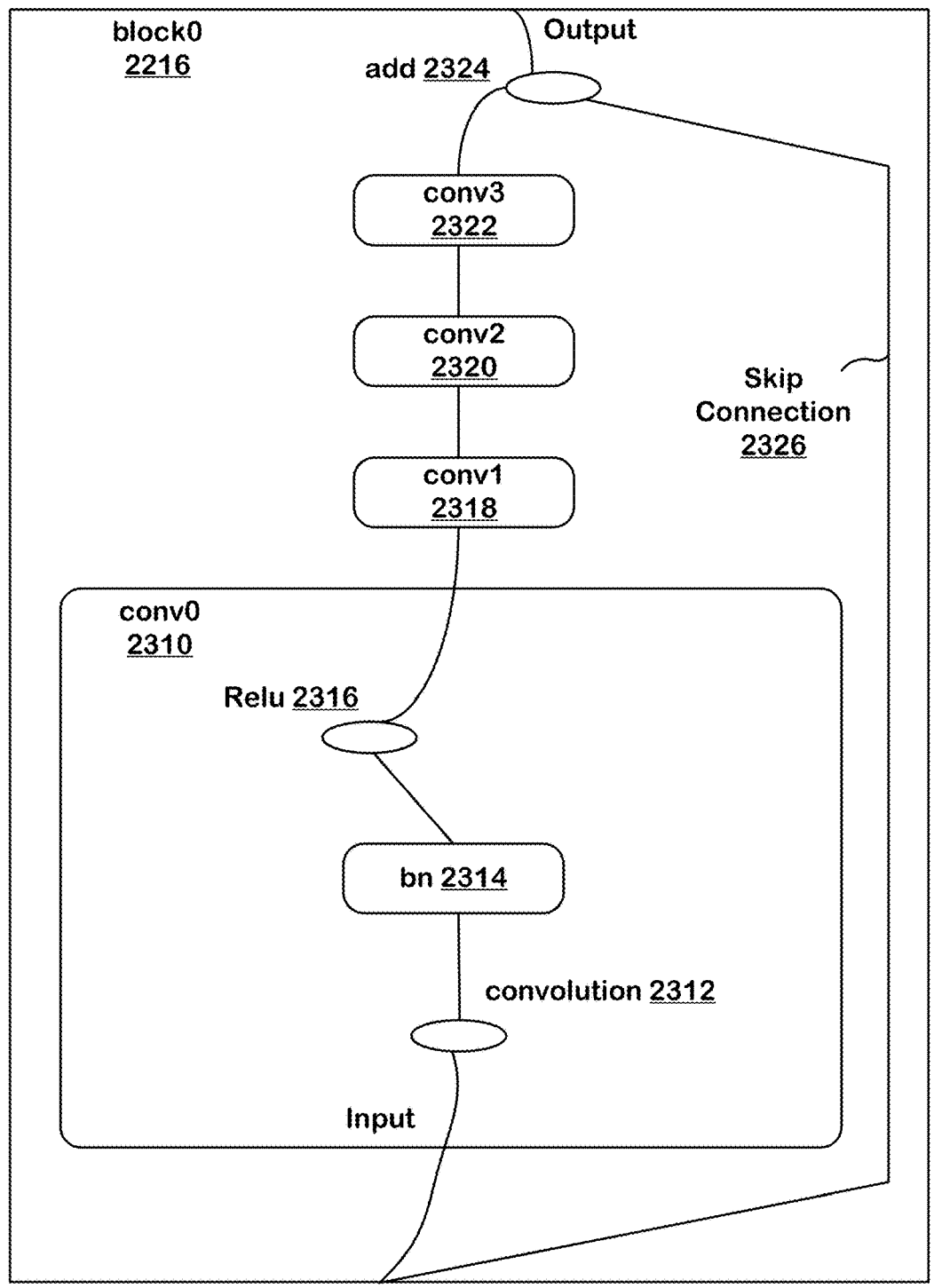
FIG. 23 presents details of a first block of the high level block diagram of a WhatCNN model presented in FIG. 22.
Figure 24:
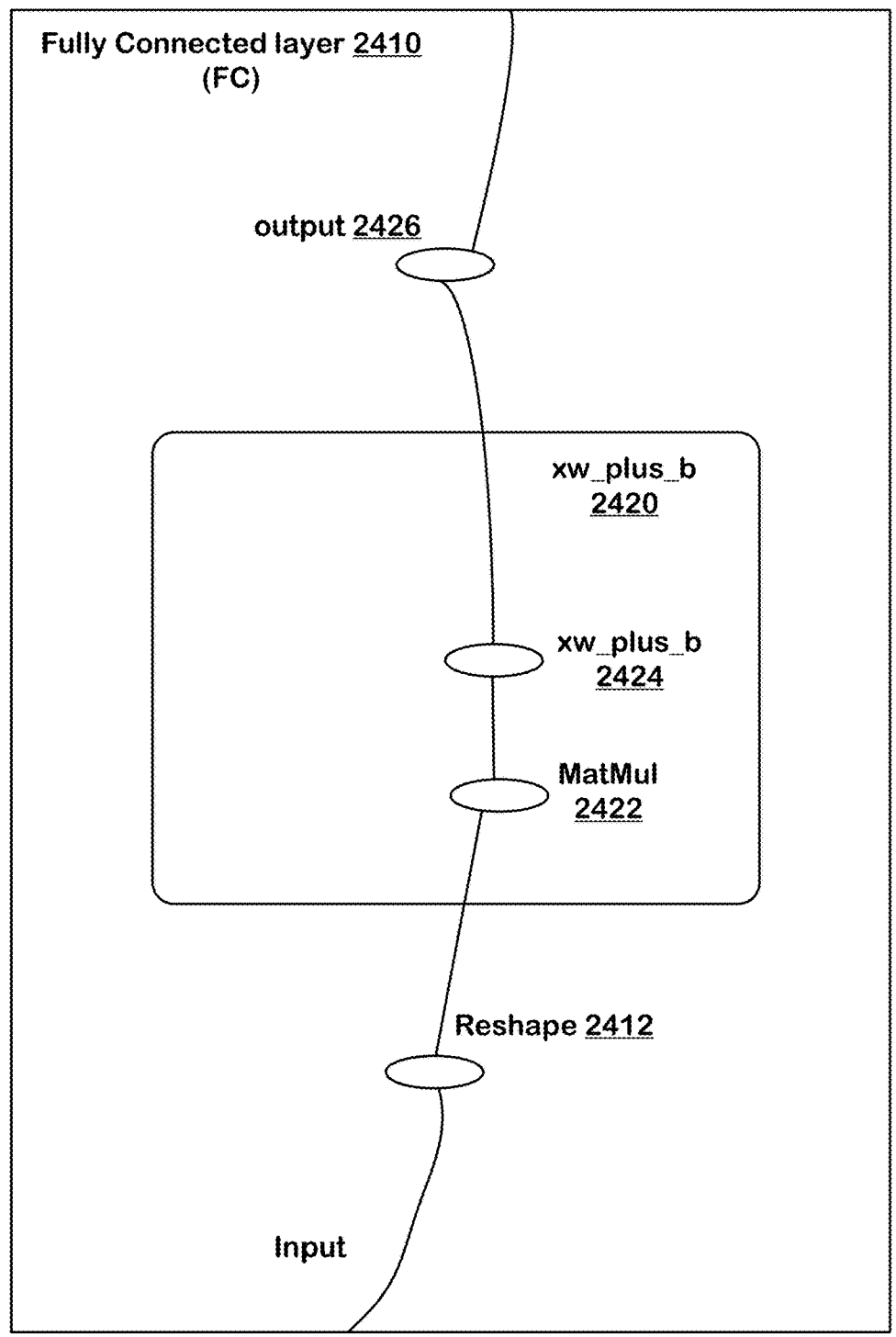
FIG. 24 presents operators in a fully connected layer in the example WhatCNN model presented in FIG. 22.

FIGS. 22, 23, and 24 are graphical visualizations of different parts of an implementation of WhatCNN 1506. The figures are adapted from graphical visualizations of a WhatCNN model generated by TensorBoard™. TensorBoard™ is a suite of visualization tools for inspecting and understanding deep learning models e.g., convolutional neural networks.

FIG. 22 shows a high level architecture of the convolutional neural network model that detects a single hand ("single hand" model 2210). WhatCNN model 1506 comprises two such convolutional neural networks for detecting left and right hands, respectively. In the illustrated embodiment, the architecture includes four blocks referred to as block0 2216, block1 2218, block2 2220, and block3 2222. A block is a higher-level abstraction and comprises multiple nodes representing convolutional layers. The blocks are arranged in a sequence from lower to higher such that output from one block is input to a successive block. The architecture also includes a pooling layer 2214 and a convolution layer 2212. In between the blocks, different non-linearities can be used. In the illustrated embodiment, a ReLU non-linearity is used as described above.

In the illustrated embodiment, the input to the single hand model 2210 is a B×W×H×C tensor defined above in description of WhatCNN 1506. "B" is the batch size, "W" and "H" indicate the width and height of the input image, and "C" is the number of channels. The output of the single hand model 2210 is combined with a second single hand model and passed to a fully connected network.

During training, the output of the single hand model 2210 is compared with ground truth. A prediction error calculated between the output and the ground truth is used to update the weights of convolutional layers. In the illustrated embodiment, stochastic gradient descent (SGD) is used for training WhatCNN 1506.

FIG. 23 presents further details of the block0 2216 of the single hand convolutional neural network model of FIG. 22. It comprises four convolutional layers labeled as conv0 in box 2310, conv1 2318, conv2 2320, and conv3 2322. Further details of the convolutional layer conv0 are presented in the box 2310. The input is processed by a convolutional layer 2312. The output of the convolutional layer is processed by a batch normalization layer 2314. ReLU non-linearity 2316 is applied to the output of the batch normalization layer 2314. The output of the convolutional layer conv0 is passed to the next layer conv1 2318. The output of the final convolutional layer conv3 is processed through an addition operation 2324. This operation sums the output from the layer conv3 2322 to unmodified input coming through a skip connection 2326. It has been shown by He et al. in their paper titled, "Identity mappings in deep residual networks" (published at https://arxiv.org/pdf/1603.05027.pdf on Jul. 25, 2016) that forward and backward signals can be directly propagated from one block to any other block. The signal propagates unchanged through the convolutional neural network. This technique improves training and test performance of deep convolutional neural networks.

As described in FIG. 21, the output of convolutional layers of a WhatCNN is processed by a fully connected layer. The outputs of two single hand models 2210 are combined and passed as input to a fully connected layer. FIG. 24 is an example implementation of a fully connected layer (FC) 2410. The input to the FC layer is processed by a reshape operator 2412. The reshape operator changes the shape of the tensor before passing it to a next layer 2420. Reshaping includes flattening the output from the convolutional layers i.e., reshaping the output from a multi-dimensional matrix to a one-dimensional matrix or a vector. The output of the reshape operator 2412 is passed to a matrix multiplication operator labelled as MatMul 2422. The output from the MatMul 2422 is passed to a matrix plus addition operator labelled as xw_plus_b 2424. For each input "x", the operator 2424 multiplies the input by a matrix "w" and a vector "b" to produce the output. "w" is a trainable parameter associated with the input "x" and "b" is another trainable parameter which is called bias or intercept. The output 2426 from the fully connecter layer 2410 is a B×L tensor as explained above in the description of WhatCNN 1506. "B" is the batch size, and "L=N+5" is the number of logits output per image frame. "N" is the number of SKUs representing "N" unique inventory items for sale in the shopping store.

Training of WhatCNN Model

A training data set of images of hands holding different inventory items in different contexts, as well as empty hands in different contexts is created. To achieve this, human actors hold each unique SKU inventory item in multiple different ways, at different locations of a test environment. The context of their hands range from being close to the actor's body, being close to the store's shelf, and being close to the actor's shopping cart or basket. The actor performs the above actions with an empty hand as well. This procedure is completed for both left and right hands. Multiple actors perform these actions simultaneously in the same test environment to simulate the natural occlusion that occurs in real shopping stores.

Cameras 114 takes images of actors performing the above actions. In one embodiment, twenty cameras are used in this process. The joints CNNs 112a-112n and the tracking engine 110 process the images to identify joints. The bounding box generator 1504 creates bounding boxes of hand regions similar to production or inference. Instead of classifying these hand regions via the WhatCNN 1506, the images are saved to a storage disk. Stored images are reviewed and labelled. An image is assigned three labels: the inventory item SKU, the context, and whether the hand is holding something or not. This process is performed for a large number of images (up to millions of images).

The image files are organized according to data collection scenes. The naming convention for image file identifies content and context of the images. FIG. 25 shows an image file name in an example embodiment. A first part of the file name, referred to by a numeral 2502, identifies the data collection scene and also includes the timestamp of the image. A second part 2504 of the file name identifies the source camera. In the example shown in FIG. 25, the image is captured by "camera 4". A third part 2506 of the file name identifies the frame number from the source camera. In the illustrated example, the file name indicates it is the 94,600$^{th}$ image frame from camera 4. A fourth part 2508 of the file name identifies ranges of x and y coordinates region in the source image frame from which this hand region image is taken. In the illustrated example, the region is defined between x coordinate values from pixel 117 to 370 and y coordinates values from pixels 370 and 498. A fifth part 2510 of the file name identifies the person id of the actor in the scene. In the illustrated example, the person in the scene has an id "3". Finally, a sixth part 2512 of the file name identifies the SKU number (item=68) of the inventory item, identified in the image.

In training mode of the WhatCNN 1506, forward passes and backpropagations are performed as opposed to production mode in which only forward passes are performed. During training, the WhatCNN generates a classification of hands of the identified subjects in a forward pass. The output of the WhatCNN is compared with the ground truth. In the backpropagation, a gradient for one or more cost functions is calculated. The gradient(s) are then propagated to the convolutional neural network (CNN) and the fully connected (FC) neural network so that the prediction error is reduced causing the output to be closer to the ground truth. In one embodiment, stochastic gradient descent (SGD) is used for training WhatCNN 1506.

In one embodiment, 64 images are randomly selected from the training data and augmented. The purpose of image augmentation is to diversify the training data resulting in better performance of models. The image augmentation includes random flipping of the image, random rotation, random hue shifts, random Gaussian noise, random contrast changes, and random cropping. The amount of augmentation is a hyperparameter and is tuned through hyperparameter search. The augmented images are classified by WhatCNN 1506 during training. The classification is compared with ground truth and coefficients or weights of WhatCNN 1506 are updated by calculating gradient loss function and multiplying the gradient with a learning rate. The above process is repeated many times (e.g., approximately 1000 times) to form an epoch. Between 50 to 200 epochs are performed. During each epoch, the learning rate is slightly decreased following a cosine annealing schedule.

Training of WhenCNN Model

Training of WhenCNN 1508 is similar to the training of WhatCNN 1506 described above, using backpropagations to reduce prediction error. Actors perform a variety of actions in the training environment. In the example embodiment, the training is performed in a shopping store with shelves stocked with inventory items. Examples of actions performed by actors include, take an inventory item from a shelf, put an inventory item back on a shelf, put an inventory item into a shopping cart (or a basket), take an inventory item back from the shopping cart, swap an item between left and right hands, put an inventory item into the actor's nook. A nook refers to a location on the actor's body that can hold an inventory item besides the left and right hands. Some examples of nook include, an inventory item squeezed between a forearm and upper arm, squeezed between a forearm and a chest, squeezed between neck and a shoulder.

The cameras 114 record videos of all actions described above during training. The videos are reviewed and all image frames are labelled indicating the timestamp and the action performed. These labels are referred to as action labels for respective image frames. The image frames are processed through the multi-CNN pipelines up to the WhatCNNs 1506 as described above for production or inference. The output of WhatCNNs along with the associated action labels are then used to train the WhenCNN 1508, with the action labels acting as ground truth. Stochastic gradient descent (SGD) with a cosine annealing schedule is used for training as described above for training of WhatCNN 1506.

In addition to image augmentation (used in training of WhatCNN), temporal augmentation is also applied to image frames during training of the WhenCNN. Some examples include mirroring, adding Gaussian noise, swapping the logits associated with left and right hands, shortening the time, shortening the time series by dropping image frames, lengthening the time series by duplicating frames, and dropping the data points in the time series to simulate spottiness in the underlying model generating input for the WhenCNN. Mirroring includes reversing the time series and respective labels, for example a put action becomes a take action when reversed.

Predicting Inventory Events Using Background Image Processing

A system and various implementations for tracking changes by subjects in an area of real space are described with reference to FIGS. 26 to 28-B.

System Architecture

Figure 26:
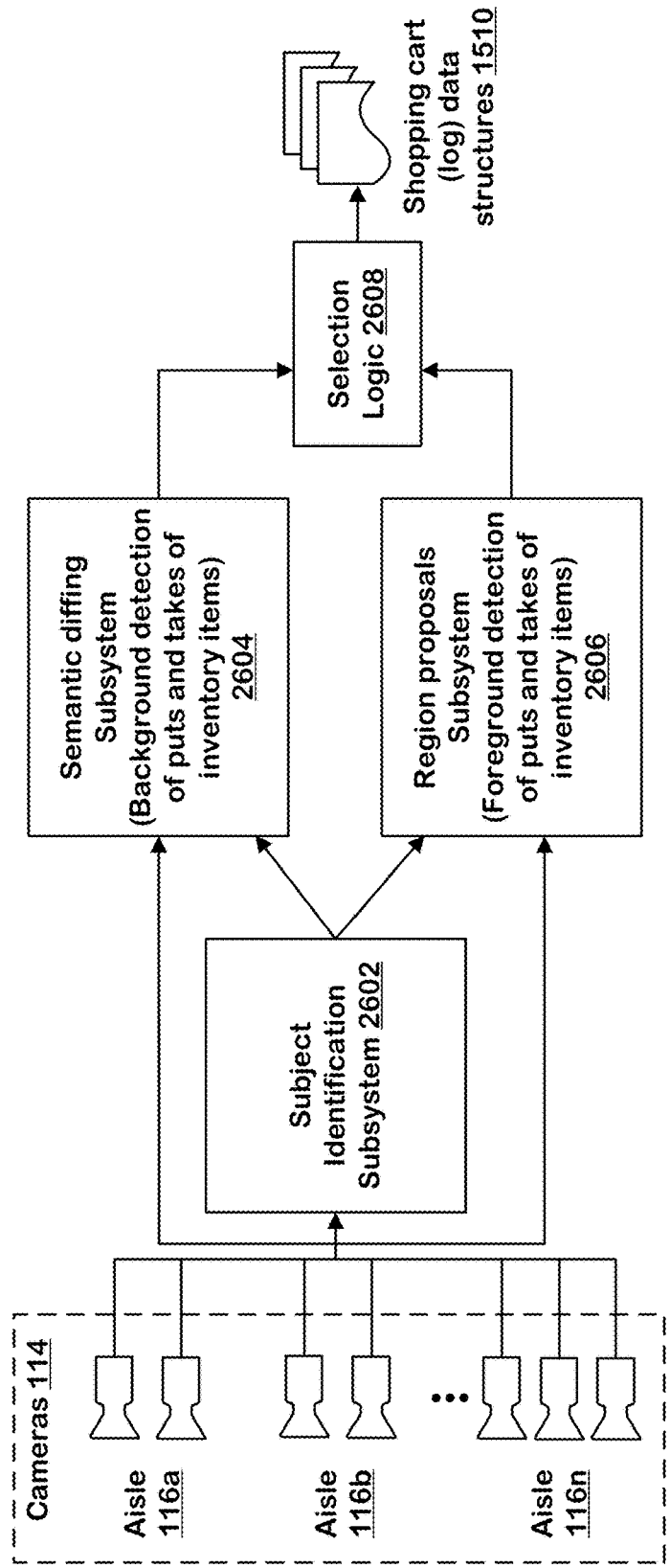
FIG. 26 is a high level architecture of a system for tracking changes by subjects in an area of real space in which a selection logic selects between a first detection using background semantic diffing and a redundant detection using foreground region proposals.

FIG. 26 presents a high level schematic of a system in accordance with an implementation. Because FIG. 26 is an architectural diagram, certain details are omitted to improve the clarity of description.

The system presented in FIG. 26 receives image frames from a plurality of cameras 114. As described above, in one embodiment, the cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space.

In one embodiment, the cameras 114 are installed in a shopping store (such as a supermarket) such that sets of cameras (two or more) with overlapping fields of view are positioned over each aisle to capture images of real space in the store. There are "n" cameras in the real space. Each camera produces a sequence of images of real space corresponding to its respective field of view.

A subject identification subsystem 2602 (also referred to as first image processors) processes image frames received from cameras 114 to identify and track subjects in the real space. The first image processors include subject image recognition engines. The subject image recognition engines receive corresponding sequences of images from the plurality of cameras, and process images to identify subjects represented in the images in the corresponding sequences of images. In one embodiment, the system includes per camera image recognition engines as described above for identifying and tracking multi-joint subjects. Alternative image recognition engines can be used, including examples in which only one "joint" is recognized and tracked per individual, or other features or other types of images data over space and time are utilized to recognize and track subjects in the real space being processed.

A "semantic diffing" subsystem 2604 (also referred to as second image processors) includes background image recognition engines, receiving corresponding sequences of images from the plurality of cameras and recognize semantically significant differences in the background (i.e. inventory display structures like shelves) as they relate to puts and takes of inventory items for example, over time in the images from each camera. The second image processors receive output of the subject identification subsystem 2602 and image frames from cameras 114 as input. The second image processors mask the identified subjects in the foreground to generate masked images. The masked images are generated by replacing bounding boxes that correspond with foreground subjects with background image data. Following this, the background image recognition engines process the masked images to identify and classify background changes represented in the images in the corresponding sequences of images. In one embodiment, the background image recognition engines comprise convolutional neural networks.

Finally, the second image processors process identified background changes to make a first set of detections of takes of inventory items by identified subjects and of puts of inventory items on inventory display structures by identified subjects. The first set of detections are also referred to as background detections of puts and takes of inventory items. In the example of a shopping store, the first detections identify inventory items taken from the shelves or put on the shelves by customers or employees of the store. The semantic diffing subsystem includes the logic to associate identified background changes with identified subjects.

A region proposals subsystem 2606 (also referred to as third image processors) include foreground image recognition engines, receiving corresponding sequences of images from the plurality of cameras 114, and recognize semantically significant objects in the foreground (i.e. shoppers, their hands and inventory items) as they relate to puts and takes of inventory items for example, over time in the images from each camera. The subsystem 2606 also receives output of the subject identification subsystem 2602. The third image processors process sequences of images from cameras 114 to identify and classify foreground changes represented in the images in the corresponding sequences of images. The third image processors process identified foreground changes to make a second set of detections of takes of inventory items by identified subjects and of puts of inventory items on inventory display structures by identified subjects. The second set of detections are also referred to as foreground detection of puts and takes of inventory items. In the example of a shopping store, the second set of detections identify takes of inventory items and puts of inventory items on inventory display structures by customers and employees of the store.

The system described in FIG. 26 includes a selection logic component 2608 to process the first and second sets of detections to generate log data structures including lists of inventory items for identified subjects. For a take or put in the real space, the selection logic 2608 selects the output from either the semantic diffing subsystem 2604 or the region proposals subsystem 2606. In one embodiment, the selection logic 2608 uses a confidence score generated by the semantic diffing subsystem for the first set of detections and a confidence score generated by the region proposals subsystem for a second set of detections to make the selection. The output of the subsystem with a higher confidence score for a particular detection is selected and used to generate a log data structure 1510 (also referred to as a shopping cart data structure) including a list of inventory items associated with identified foreground subjects.

Subsystem Components

Figure 27:
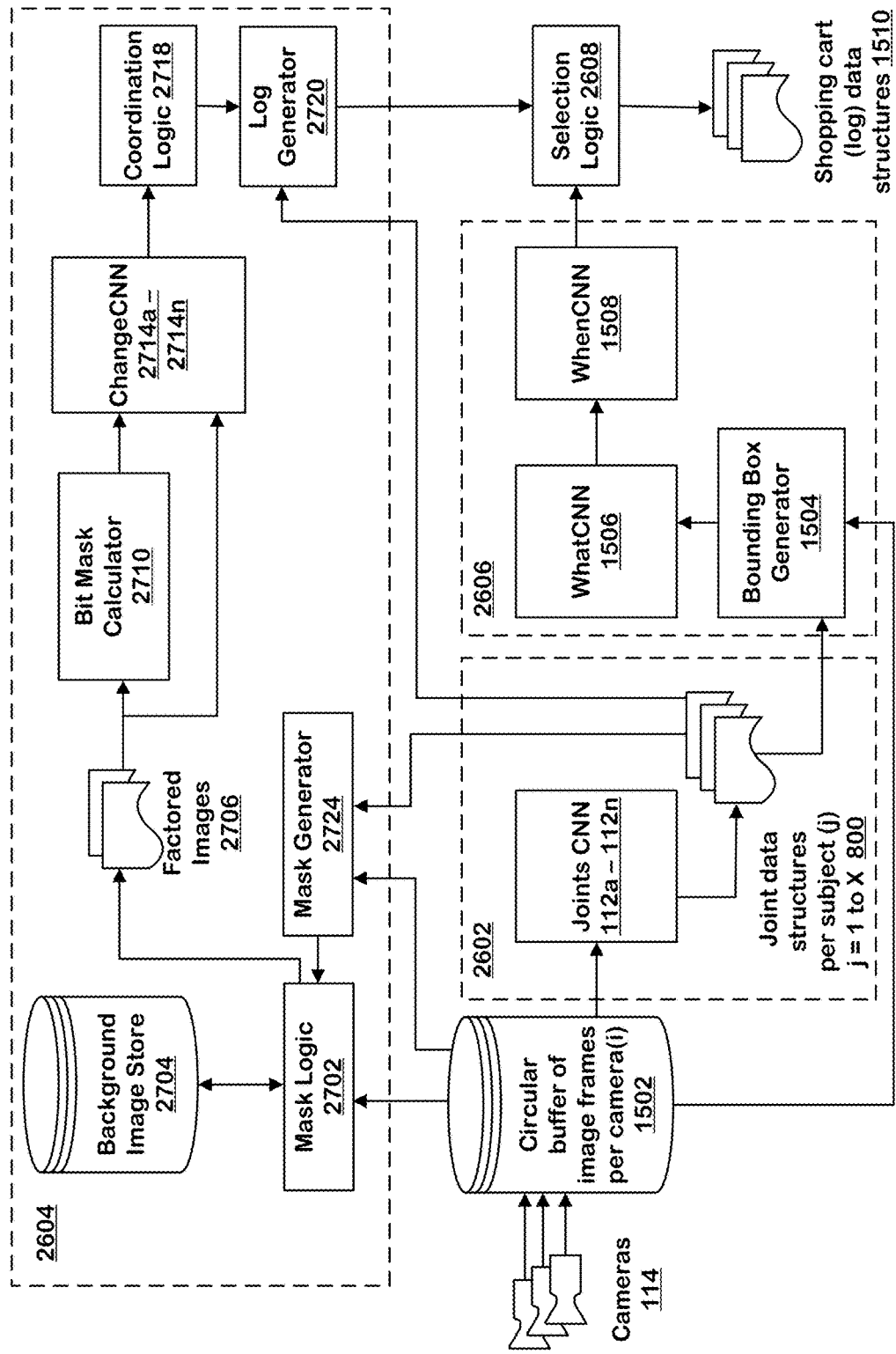
FIG. 27 presents components of subsystems implementing the system of FIG. 26.

FIG. 27 presents subsystem components implementing the system for tracking changes by subjects in an area of real space. The system comprises of the plurality of cameras 114 producing respective sequences of images of corresponding fields of view in the real space. The field of view of each camera overlaps with the field of view of at least one other camera in the plurality of cameras as described above. In one embodiment, the sequences of image frames corresponding to the images produced by the plurality of cameras 114 are stored in a circular buffer 1502 (also referred to as a ring buffer) per camera 114. Each image frame has a timestamp, identity of the camera (abbreviated as "camera_id"), and a frame identity (abbreviated as "frame_id") along with the image data. Circular buffers 1502 store a set of consecutively timestamped image frames from respective cameras 114. In one embodiment, the cameras 114 are configured to generate synchronized sequences of images.

The same cameras and the same sequences of images are used by both the foreground and background image processors in one preferred implementation. As a result, redundant detections of puts and takes of inventory items are made using the same input data allowing for high confidence, and high accuracy, in the resulting data.

The subject identification subsystem 2602 (also referred to as the first image processors), includes subject image recognition engines, receiving corresponding sequences of images from the plurality of cameras 114. The subject image recognition engines process images to identify subjects represented in the images in the corresponding sequences of images. In one embodiment, the subject image recognition engines are implemented as convolutional neural networks (CNNs) referred to as joints CNN 112*a*-112*n*. The outputs of joints CNNs 112*a*-112*n* corresponding to cameras with overlapping fields of view are combined to map the location of joints from 2D image coordinates of each camera to 3D coordinates of real space. The joints data structures 800 per subject (j) where j equals 1 to x, identify locations of joints of a subject (j) in the real space and in 2D space for each image. Some details of subject data structure 800 are presented in FIG. 8.

A background image store 2704, in the semantic diffing subsystem 2604, stores masked images (also referred to as background images in which foreground subjects have been removed by masking) for corresponding sequences of images from cameras 114. The background image store 2704 is also referred to as a background buffer. In one embodiment, the size of the masked images is the same as the size of image frames in the circular buffer 1502. In one embodiment, a masked image is stored in the background image store 2704 corresponding to each image frame in the sequences of image frames per camera.

The semantic diffing subsystem 2604 (or the second image processors) includes a mask generator 2724 producing masks of foreground subjects represented in the images in the corresponding sequences of images from a camera. In one embodiment, one mask generator processes sequences of images per camera. In the example of the shopping store, the foreground subjects are customers or employees of the store in front of the background shelves containing items for sale.

In one embodiment, the joint data structures 800 and image frames from the circular buffer 1502 are given as input to the mask generator 2724. The joint data structures identify locations of foreground subjects in each image frame. The mask generator 2724 generates a bounding box per foreground subject identified in the image frame. In such an embodiment, the mask generator 2724 uses the values of the x and y coordinates of joint locations in 2D image frame to determine the four boundaries of the bounding box. A minimum value of x (from all x values of joints for a subject) defines the left vertical boundary of the bounding box for the subject. A minimum value of y (from all y values of joints for a subject) defines the bottom horizontal boundary of the bounding box. Likewise, the maximum values of x and y coordinates identify the right vertical and top horizontal boundaries of the bounding box. In a second embodiment, the mask generator 2724 produces bounding boxes for foreground subjects using a convolutional neural network-based person detection and localization algorithm. In such an embodiment, the mask generator 2724 does not use the joint data structures 800 to generate bounding boxes for foreground subjects.

The semantic diffing subsystem 2604 (or the second image processors) include a mask logic to process images in the sequences of images to replace foreground image data representing the identified subjects with background image data from the background images for the corresponding sequences of images to provide the masked images, resulting in a new background image for processing. As the circular buffer receives image frames from cameras 114, the mask logic processes images in the sequences of images to replace foreground image data defined by the image masks with background image data. The background image data is taken from the background images for the corresponding sequences of images to generate the corresponding masked images.

Consider, the example of the shopping store. Initially at time t=0, when there are no customers in the store, a background image in the background image store 2704 is the same as its corresponding image frame in the sequences of images per camera. Now consider at time t=1, a customer moves in front of a shelf to buy an item in the shelf. The mask generator 2724 creates a bounding box of the customer and sends it to a mask logic component 2702. The mask logic component 2702 replaces the pixels in the image frame at t=1 inside the bounding box by corresponding pixels in the background image frame at t=0. This results in a masked image at t=1 corresponding to the image frame at t=1 in the circular buffer 1502. The masked image does not include pixels for foreground subject (or customer) which are now replaced by pixels from the background image frame at t=0. The masked image at t=1 is stored in the background image store 2704 and acts as a background image for the next image frame at t=2 in the sequence of images from the corresponding camera.

In one embodiment, the mask logic component 2702 combines, such as by averaging or summing by pixel, sets of N masked images in the sequences of images to generate sequences of factored images for each camera. In such an embodiment, the second image processors identify and classify background changes by processing the sequence of factored images. A factored image can be generated, for example, by taking an average value for pixels in the N masked images in the sequence of masked images per camera. In one embodiment, the value of N is equal to the frame rate of cameras 114, for example if the frame rate is 30 FPS (frames per second), the value of N is 30. In such an embodiment, the masked images for a time period of one second are combined to generate a factored image. Taking the average pixel values minimizes the pixel fluctuations due to sensor noise and luminosity changes in the area of real space.

The second image processors identify and classify background changes by processing the sequence of factored images. A factored image in the sequences of factored images is compared with the preceding factored image for the same camera by a bit mask calculator 2710. Pairs of factored images 2706 are given as input to the bit mask calculator 2710 to generate a bit mask identifying changes in corresponding pixels of the two factored images. The bit mask has 1s at the pixel locations where the difference between the corresponding pixels' (current and previous factored image) RGB (red, green and blue channels) values is greater than a "difference threshold". The value of the difference threshold is adjustable. In one embodiment, the value of the difference threshold is set at 0.1.

The bit mask and the pair of factored images (current and previous) from sequences of factored images per camera are given as input to background image recognition engines. In one embodiment, the background image recognition engines comprise convolutional neural networks and are referred to as ChangeCNN 2714a-2714n. A single ChangeCNN processes sequences of factored images per camera. In another embodiment, the masked images from corresponding sequences of images are not combined. The bit mask is calculated from the pairs of masked images. In this embodiment, the pairs of masked images and the bit mask is then given as input to the ChangeCNN.

The input to a ChangeCNN model in this example consists of seven (7) channels including three image channels (red, green and blue) per factored image and one channel for the bit mask. The ChangeCNN comprises of multiple convolutional layers and one or more fully connected (FC) layers. In one embodiment, the ChangeCNN comprises of the same number of convolutional and FC layers as the JointsCNN 112a-112n as illustrated in FIG. 5.

The background image recognition engines (ChangeCNN 2714a-2714n) identify and classify changes in the factored images and produce change data structures for the corresponding sequences of images. The change data structures include coordinates in the masked images of identified background changes, identifiers of an inventory item subject of the identified background changes and classifications of the identified background changes. The classifications of the identified background changes in the change data structures classify whether the identified inventory item has been added or removed relative to the background image.

As multiple items can be taken or put on the shelf simultaneously by one or more subjects, the ChangeCNN generates a number "B" overlapping bounding box predictions per output location. A bounding box prediction corresponds to a change in the factored image. Consider the shopping store has a number "C" unique inventory items, each identified by a unique SKU. The ChangeCNN predicts the SKU of the inventory item subject of the change. Finally, the ChangeCNN identifies the change (or inventory event type) for every location (pixel) in the output indicating whether the item identified is taken from the shelf or put on the shelf. The above three parts of the output from ChangeCNN are described by an expression "5*B+C+1". Each bounding box "B" prediction comprises of five (5) numbers, therefore "B" is multiplied by 5. These five numbers represent the "x" and "y" coordinates of the center of the bounding box, the width and height of the bounding box. The fifth number represents ChangeCNN model's confidence score for prediction of the bounding box. "B" is a hyperparameter that can be adjusted to improve the performance of the ChangeCNN model. In one embodiment, the value of "B" equals 4. Consider the width and height (in pixels) of the output from ChangeCNN is represented by W and H, respectively. The output of the ChangeCNN is then expressed as "W*H*(5B+C+1)". The bounding box output model is based on object detection system proposed by Redmon and Farhadi in their paper, "YOLO9000: Better, Faster, Stronger" published on Dec. 25, 2016. The paper is available at https://arxiv.org/pdf/1612.08242.pdf.

The outputs of ChangeCNN 2714a-2714n corresponding to sequences of images from cameras with overlapping fields of view are combined by a coordination logic component 2718. The coordination logic component processes change data structures from sets of cameras having overlapping fields of view to locate the identified background changes in real space. The coordination logic component 2718 selects bounding boxes representing the inventory items having the same SKU and the same inventory event type (take or put) from multiple cameras with overlapping fields of view. The selected bounding boxes are then triangulated in the 3D real space using triangulation techniques described above to identify the location of the inventory item in 3D real space. Locations of shelves in the real space are compared with the triangulated locations of the inventory items in the 3D real space. False positive predictions are discarded. For example, if triangulated location of a bounding box does not map to a location of a shelf in the real space, the output is discarded. Triangulated locations of bounding boxes in the 3D real space that map to a shelf are considered true predictions of inventory events.

In one embodiment, the classifications of identified background changes in the change data structures produced by the second image processors classify whether the identified inventory item has been added or removed relative to the background image. In another embodiment, the classifications of identified background changes in the change data structures indicate whether the identified inventory item has been added or removed relative to the background image and the system includes logic to associate background changes with identified subjects. The system makes detections of takes of inventory items by the identified subjects and of puts of inventory items on inventory display structures by the identified subjects.

A log generator 2720 implements the logic to associate changes identified by true predictions of changes with identified subjects near the location of the change. In an embodiment utilizing the joints identification engine to identify subjects, the log generator 2720 determines the positions of hand joints of subjects in the 3D real space using joint data structures 800. A subject whose hand joint location is within a threshold distance to the location of a change at the time of the change is identified. The log generator associates the change with the identified subject.

In one embodiment, as described above, N masked images are combined to generate factored images which are then given as input to the ChangeCNN. Consider, N equals the frame rate (frames per second) of the cameras 114. Thus, in such an embodiment, the positions of hands of subjects during a one second time period are compared with the location of the change to associate the changes with identified subjects. If more than one subject's hand joint locations are within the threshold distance to a location of a change, then association of the change with a subject is deferred to output of the foreground image processing subsystem 2606.

The foreground image processing (region proposals) subsystem 2606 (also referred to as the third image processors) include foreground image recognition engines receiving images from the sequences of images from the plurality of cameras. The third image processors include logic to identify and classify foreground changes represented in the images in the corresponding sequences of images. The region proposals subsystem 2606 produces a second set of detections of takes of inventory items by the identified subjects and of puts of inventory items on inventory display structures by the identified subjects. As shown in FIG. 27, the subsystem 2606 includes the bounding box generator 1504, the WhatCNN 1506 and the WhenCNN 1508. The joint data structures 800 and image frames per camera from the circular buffer 1502 are given as input to the bounding box generator 1504. The details of the bounding box generator 1504, the WhatCNN 1506 and the WhenCNN 1508 are presented earlier.

The system described in FIG. 27 includes the selection logic to process the first and second sets of detections to generate log data structures including lists of inventory items for identified subjects. The first set of detections of takes of inventory items by the identified subjects and of puts of inventory items on inventory display structures by the identified subjects are generated by the log generator 2720. The first set of detections are determined using the outputs of second image processors and the joint data structures 800 as described above. The second set of detections of takes of inventory items by the identified subjects and of puts of inventory items on inventory display structures by the identified subjects are determined using the output of the third image processors. For each true inventory event (take or put), the selection logic controller 2608 selects the output from either the second image processors (semantic diffing subsystem 2604) or the third image processors (region proposals subsystem 2606). In one embodiment, the selection logic selects the output from an image processor with a higher confidence score for prediction of that inventory event.

Process Flow of Background Image Semantic Diffing

Figure 28A:
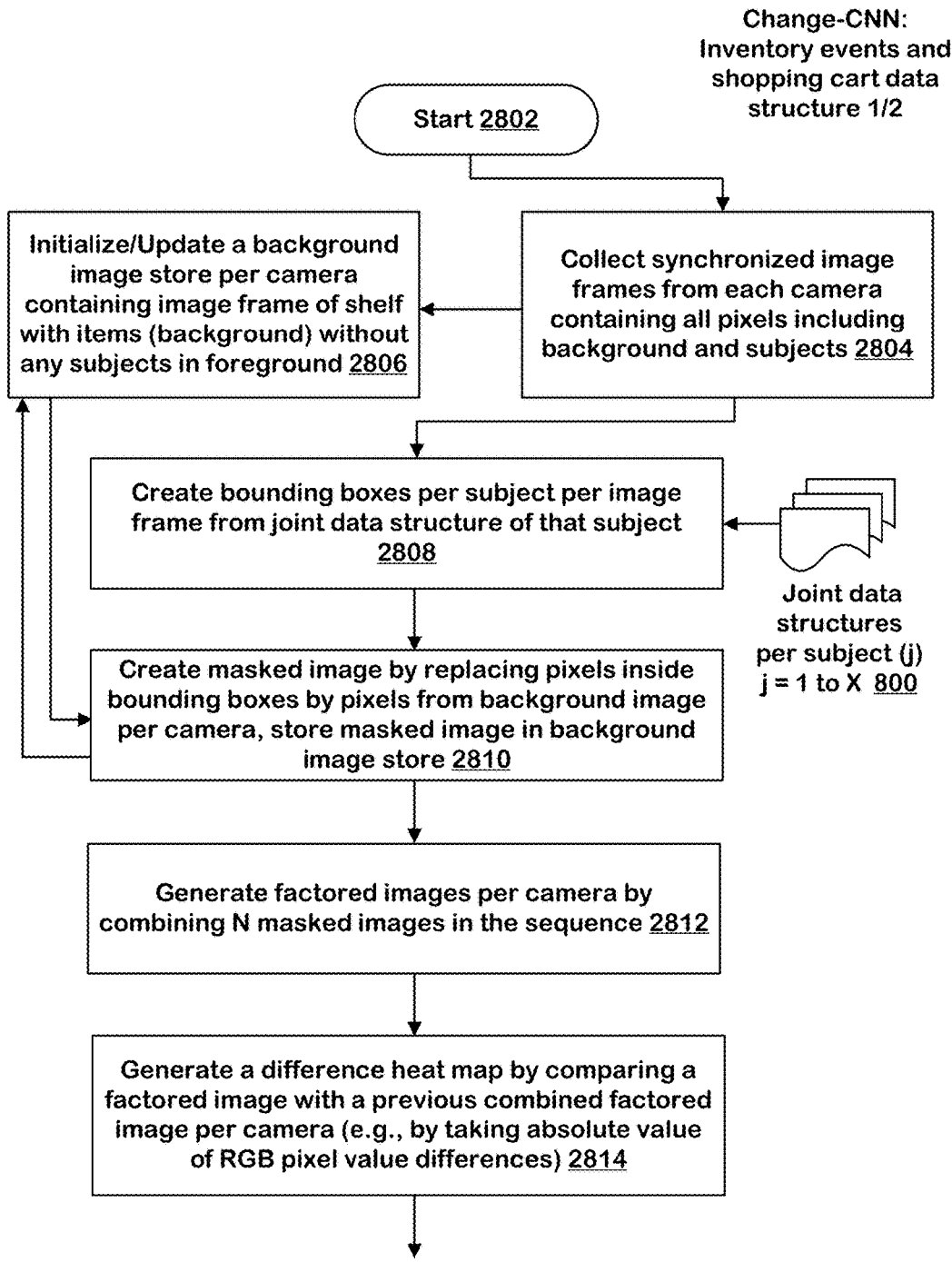
FIG. 28A is a flowchart showing a first part of detailed process steps for determining inventory events and generation of the shopping cart data structure.
Figure 28B:
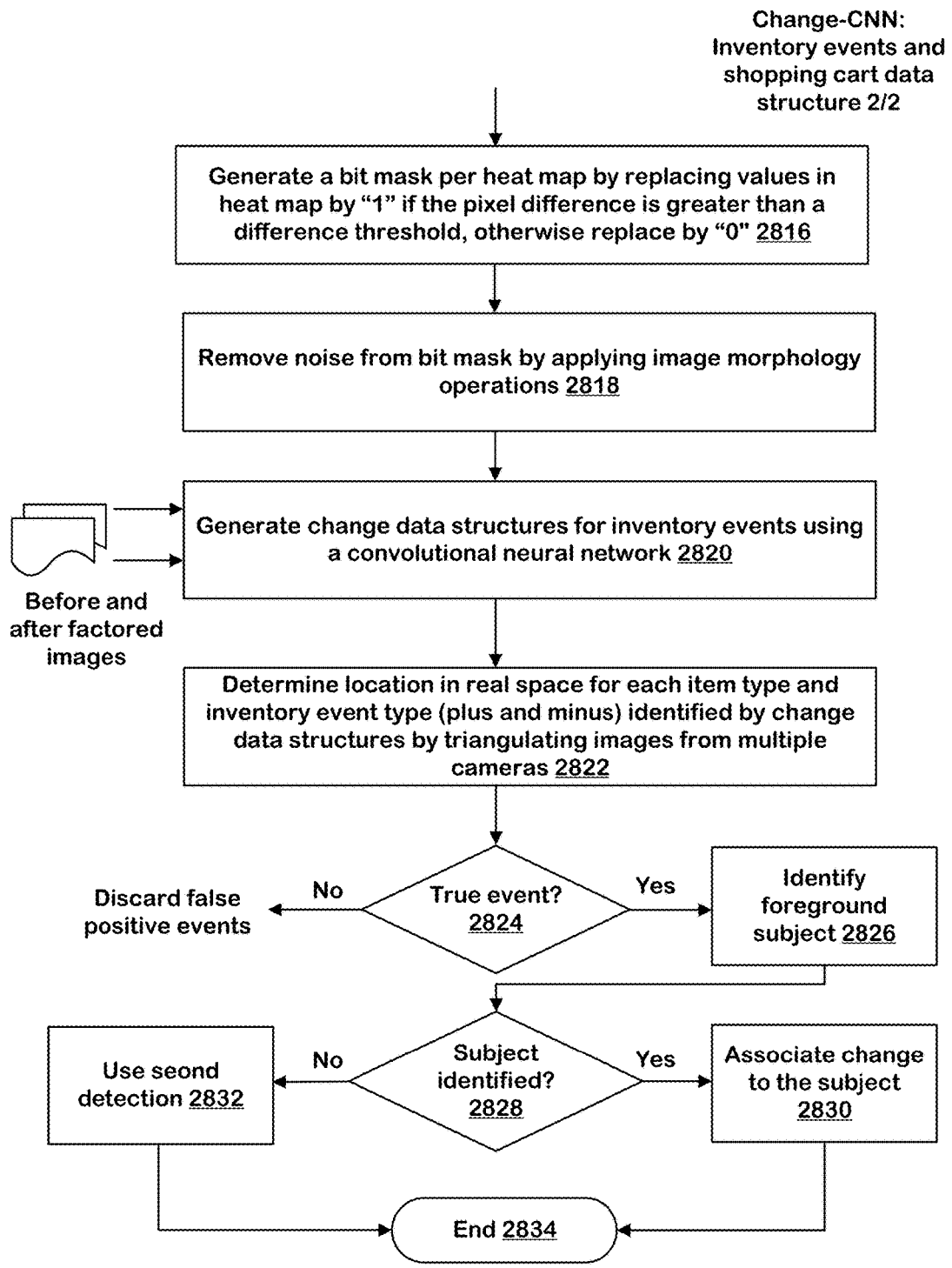
FIG. 28B is a flowchart showing a second part of detailed process steps for determining inventory events and generation of the shopping cart data structure.

FIGS. 28A and 28B present detailed steps performed by the semantic diffing subsystem 2604 to track changes by subjects in an area of real space. In the example of a shopping store the subjects are customers and employees of the store moving in the store in aisles between shelves and other open spaces. The process starts at step 2802. As described above, the cameras 114 are calibrated before sequences of images from cameras are processed to identify subjects. Details of camera calibration are presented above. Cameras 114 with overlapping fields of view capture images of real space in which subjects are present. In one embodiment, the cameras are configured to generate synchronized sequences of images at the rate of N frames per second. The sequences of images of each camera are stored in respective circular buffers 1502 per camera at step 2804. A circular buffer (also referred to as a ring buffer) stores the sequences of images in a sliding window of time. The background image store 2704 is initialized with initial image frame in the sequence of image frames per camera with no foreground subjects (step 2806).

As subjects move in front of the shelves, bounding boxes per subject are generated using their corresponding joint data structures 800 as described above (step 2808). At a step 2810, a masked image is created by replacing the pixels in the bounding boxes per image frame by pixels at the same locations from the background image from the background image store 2704. The masked image corresponding to each image in the sequences of images per camera is stored in the background image store 2704. The ith masked image is used as a background image for replacing pixels in the following (i+1) image frame in the sequence of image frames per camera.

At a step 2812, N masked images are combined to generate factored images. At a step 2814, a difference heat map is generated by comparing pixel values of pairs of factored images. In one embodiment, the difference between pixels at a location (x, y) in a 2D space of the two factored images (fi1 and fi2) is calculated as shown below in equation 1:

$$\sqrt{((fi1[x, y][red] - fi2[x, y][red])^2 + (fi1[x, y][green] - fi2[x, y][green])^2 + (fi1[x, y][blue] - fi2[x, y][blue])^2)} \quad (1)$$

The difference between the pixels at the same x and y locations in the 2D space is determined using the respective intensity values of red, green and blue (RGB) channels as shown in the equation. The above equation gives a magnitude of the difference (also referred to as Euclidean norm) between corresponding pixels in the two factored images.

The difference heat map can contain noise due to sensor noise and luminosity changes in the area of real space. In FIG. 28B, at a step 2816, a bit mask is generated for a difference heat map. Semantically meaningful changes are identified by clusters of is (ones) in the bit mask. These clusters correspond to changes identifying inventory items taken from the shelf or put on the shelf. However, noise in the difference heat map can introduce random is in the bit mask. Additionally, multiple changes (multiple items take from or put on the shelf) can introduce overlapping clusters of 1s. At a next step (2818) in the process flow, image morphology operations are applied to the bit mask. The image morphology operations remove noise (unwanted 1s) and also attempt to separate overlapping clusters of 1s. This results in a cleaner bit mask comprising clusters of 1s corresponding to semantically meaningful changes.

Two inputs are given to the morphological operation. The first input is the bit mask and the second input is called a structuring element or kernel. Two basic morphological operations are "erosion" and "dilation". A kernel consists of is arranged in a rectangular matrix in a variety of sizes. Kernels of different shapes (for example, circular, elliptical or cross-shaped) are created by adding 0's at specific locations in the matrix. Kernels of different shapes are used in image morphology operations to achieve desired results in cleaning bit masks. In erosion operation, a kernel slides (or moves) over the bit mask. A pixel (either 1 or 0) in the bit mask is considered 1 if all the pixels under the kernel are 1s. Otherwise, it is eroded (changed to 0). Erosion operation is useful in removing isolated is in the bit mask. However, erosion also shrinks the clusters of is by eroding the edges.

Dilation operation is the opposite of erosion. In this operation, when a kernel slides over the bit mask, the values of all pixels in the bit mask area overlapped by the kernel are changed to 1, if value of at least one pixel under the kernel is 1. Dilation is applied to the bit mask after erosion to increase the size clusters of 1s. As the noise is removed in erosion, dilation does not introduce random noise to the bit mask. A combination of erosion and dilation operations are applied to achieve cleaner bit masks. For example the following line of computer program code applies a 3×3 filter of is to the bit mask to perform an "open" operation which applies erosion operation followed by dilation operation to remove noise and restore the size of clusters of is in the bit mask as described above. The above computer program code uses OpenCV (open source computer vision) library of programming functions for real time computer vision applications. The library is available at https://opencv.org/. _bit_mask=cv2.morphologyEx(bit_mask, cv2.MORPH_OPEN, self.kernel_3×3, dst=_bit_mask)

A "close" operation applies dilation operation followed by erosion operation. It is useful in closing small holes inside the clusters of 1s. The following program code applies a close operation to the bit mask using a 30×30 cross-shaped filter. _bit_mask=cv2.morphologyEx(bit_mask, cv2.MORPH_CLOSE, self.kernel_30×30_cross, dst=_bit_mask)

The bit mask and the two factored images (before and after) are given as input to a convolutional neural network (referred to as ChangeCNN above) per camera. The outputs of ChangeCNN are the change data structures. At a step 2822, outputs from ChangeCNNs with overlapping fields of view are combined using triangulation techniques described earlier. A location of the change in the 3D real space is matched with locations of shelves. If location of an inventory event maps to a location on a shelf, the change is considered a true event (step 2824). Otherwise, the change is a false positive and is discarded. True events are associated with a foreground subject. At a step 2826, the foreground subject is identified. In one embodiment, the joints data structure 800 is used to determine location of a hand joint within a threshold distance of the change. If a foreground subject is identified at the step 2828, the change is associated to the identified subject at a step 2830. If no foreground subject is identified at the step 2828, for example, due to multiple subjects' hand joint locations within the threshold distance of the change. Then redundant detection of the change by region proposals subsystem is selected at a step 2832. The process ends at a step 2834.

Training the ChangeCNN

A training data set of seven channel inputs is created to train the ChangeCNN. One or more subjects acting as customers, perform take and put actions by pretending to shop in a shopping store. Subjects move in aisles, taking inventory items from shelve and putting items back on the shelves. Images of actors performing the take and put actions are collected in the circular buffer 1502. The images are processed to generate factored images as described above. Pairs of factored images 2706 and corresponding bit mask output by the bit mask calculator 2710 are manually reviewed to visually identify a change between the two factored images. For a factored image with a change, a bounding box is manually drawn around the change. This is the smallest bounding box that contains the cluster of is corresponding to the change in the bit mask. The SKU number for the inventory item in the change is identified and included in the label for the image along with the bounding box. An event type identifying take or put of inventory item is also included in the label of the bounding box. Thus the label for each bounding box identifies, its location on the factored image, the SKU of the item and the event type. A factored image can have more than one bounding boxes. The above process is repeated for every change in all collected factored images in the training data set. A pair of factored images along with the bit mask forms a seven channel input to the ChangeCNN.

During training of the ChangeCNN, forward passes and backpropagations are performed. In the forward pass, the ChangeCNN identify and classify background changes represented in the factored images in the corresponding sequences of images in the training data set. The ChangeCNN process identified background changes to make a first set of detections of takes of inventory items by identified subjects and of puts of inventory items on inventory display structures by identified subjects. During backpropagation the output of the ChangeCNN is compared with the ground truth as indicated in labels of training data set. A gradient for one or more cost functions is calculated. The gradient(s) are then propagated to the convolutional neural network (CNN) and the fully connected (FC) neural network so that the prediction error is reduced causing the output to be closer to the ground truth. In one embodiment, a softmax function and a cross-entropy loss function is used for training of the ChangeCNN for class prediction part of the output. The class prediction part of the output includes an SKU identifier of the inventory item and the event type i.e., a take or a put.

A second loss function is used to train the ChangeCNN for prediction of bounding boxes. This loss function calculates intersection over union (IOU) between the predicted box and the ground truth box. Area of intersection of bounding box predicted by the ChangeCNN with the true bounding box label is divided by the area of the union of the same bounding boxes. The value of IOU is high if the overlap between the predicted box and the ground truth boxes is large. If more than one predicted bounding boxes overlap the ground truth bounding box, then the one with highest IOU value is selected to calculate the loss function. Details of the loss function are presented by Redmon et. al., in their paper, "You Only Look Once: Unified, Real-Time Object Detection" published on May 9, 2016. The paper is available at https://arxiv.org/pdf/1506.02640.pdf.

Particular Implementations

In various embodiments, the system for tracking puts and takes of inventory items by subjects in an area of real space described above also includes one or more of the following features.

1. Region Proposals

A region proposal is the frame image of hand location from all different cameras covering the person. A region proposal is generated by every camera in the system. It includes empty hands as well as hands carrying store items.

1.1 The WhatCNN Model

A region proposal can be used as input to image classification using a deep learning algorithm. This classification engine is called a "WhatCNN" model. It is an in-hand classification model. It classifies the things that are in hands. In-hand image classification can operate even though parts of the object are occluded by the hand. Smaller items may be occluded up to 90% by the hand. The region for image analysis by the WhatCNN model is intentionally kept small in some embodiments because it is computationally expensive. Each camera can have a dedicated GPU. This is performed for every hand image from every camera for every frame. In addition to the above image analysis by the WhatCNN model, a confidence weight is also assigned to that image (one camera, one point in time). The classification algorithm outputs logits over the entire list of stock keeping units (SKUs) to produce a product and service identification code list of the store for n items and one additional for an empty hand (n+1).

The scene process now communicates back its results to each video process by sending a key-value dictionary to each video. Here keys are unique joint IDs and values are unique person IDs with which the joint is associated. If no person was found associated with the joint, then it is not included in the dictionary.

Each video process receives the key-value dictionary from the scene process and stores it into a ring buffer that maps frame numbers to the returned dictionary.

Using the returned key-value dictionary, the video selects subsets of the image at each moment in time that are near hands associated with known people. These regions are numpy slices. We also take a similar slice around foreground masks and the raw output feature arrays of the Joints CNN. These combined regions are concatenated together into a single multidimensional numpy array and stored in a data structure that holds the numpy array as well as the person ID with which the region is associated and which hand from the person the region came from.

All proposed regions are then fed into a FIFO queue. This queue takes in regions and pushes their numpy array into memory on the GPU.

As arrays arrive on the GPU they are fed into a CNN dedicated to classification, referred to as a WhatCNN. The output of this CNN is a flat array of floats of size N+1, where N is the number of unique SKUs in the store, and the final class represents the nil class, or empty hand. The floats in this array are referred to as logits.

The results of the WhatCNN are stored back into the region data structure.

All regions for a moment in time are then sent from each video process back to the scene process.

The scene process receives all regions from all videos at a moment in time and stores the results in a key-value dictionary, where the key is a person ID and the value is a key-value dictionary, where the key is a camera ID and the value is a region's logits.

This aggregated data structure is then stored in a ring buffer that maps frame numbers to the aggregated structure for each moment in time.

1.2 The WhenCNN Model

The images from different cameras processed by the WhatCNN model are combined over a period of time (multiple cameras over a period of time). An additional input to this model is hand location in 3D space, triangulated from multiple cameras. Another input to this algorithm is the distance of a hand from a planogram of the store. In some embodiments, the planogram can be used to identify if the hand is close to a shelf containing a particular item (e.g. cheerios boxes). Another input to this algorithm is the foot location on the store.

In addition to object classification using SKU, the second classification model uses time series analysis to determine whether the object was picked up from the shelf or placed on the shelf. The images are analyzed over a period of time to make the determination of whether the object that was in the hand in earlier image frames has been put back in the shelf or has been picked up from the shelf.

For a one second time (30 frames per second) period and three cameras, the system will have 90 classifications outputs for the same hand plus confidences. This combined image analysis dramatically increases the probability of correctly identifying the object in the hand. The analysis over time improves the quality of output despite some very low confidence level outputs of individual frames. This step can take the output confidence from for example, 80% accuracy to 95% accuracy.

This model also includes output from the shelf model as its input to identify what object this person has picked.

The scene process waits for 30 or more aggregated structures to accumulate, representing at least a second of real time, and then performs a further analysis to reduce the aggregated structure down to a single integer for each person ID-hand pair, where the integer is a unique ID representing a SKU in the store. For a moment in time this information is stored in a key-value dictionary where keys are person ID-hand pairs, and values are the SKU integer. This dictionary is stored over time in a ring buffer that maps frame numbers to each dictionary for that moment in time.

An additional analysis can be then performed looking at how this dictionary changes over time in order to identify at what moments a person takes something and what it is they take. This model (WhenCNN) emits SKU logits as well as logits for each Boolean question: was something taken? was something placed?

The output of the WhenCNN is stored in a ring buffer that maps frame numbers to a key-value dictionary where keys are person IDs and values are the extended logits emitted by the WhenCNN.

A further collection of heuristics is then run on the stored results of both the WhenCNN and the stored joint locations of people, as well as a precomputed map of items on the store shelf. This collection of heuristics determines where takes and puts result in items being added to or removed from. For each take/put the heuristics determine if the take or put was from or to a shelf, from or to a basket, or from or to a person. The output is an inventory for each person, stored as an array where the array value at a SKU's index is the number of those SKUs a person has.

As a shopper nears the exit of a store the system can send the inventory list to the shopper's phone. The phone then displays the user's inventory and asks for confirmation to charge their stored credit card information. If the user accepts, their credit card will be charged. If they do not have a credit card known in the system, they will be asked to provide credit card information.

Alternatively, the shopper may also approach an in-store kiosk. The system identifies when the shopper is near the kiosk and will send a message to the kiosk to display the inventory of the shopper. The kiosk asks the shopper to accept the charges for the inventory. If the shopper accepts, they may then swipe their credit card or insert cash to pay. FIG. 16 presents an illustration of the WhenCNN model for region proposals.

2. Misplaced Items

This feature identifies misplaced items when they are placed back by a person on a random shelf. This causes problems in object identification because the foot and hand location with respect to the planogram will be incorrect. Therefore, the system builds up a modified planogram over time. Based on prior time series analysis, the system is able to determine if a person has placed an item back in the shelf. Next time, when an object is picked up from that shelf location, the system knows that there is at least one misplaced item in that hand location. Correspondingly, the algorithm will have some confidence that the person can pick up the misplaced item from that shelf. If the misplaced item is picked up from the shelf, the system subtracts that item from that location and therefore, the shelf does not have that item anymore. The system can also inform a clerk about a misplaced item via an app so that the clerk can move that item to its correct shelf.

3. Semantic Diffing (Shelf Model)

An alternative technology for background image processing comprises a background subtraction algorithm to identify changes to items (items removed or placed) on the shelves. This is based on changes at the pixel level. If there are persons in front of the shelf, then the algorithm stops so that it does not take into account pixel changes due to presence of persons. Background subtraction is a noisy process. Therefore, a cross-camera analysis is conducted. If enough cameras agree that there is a "semantically meaningful" change in the shelf, then the system records that there is a change in that part of the shelf.

The next step is to identify whether that change is a "put" or a "get" change. For this, the time series analysis of the second classification model is used. A region proposal for that particular part of the shelf is generated and passed through the deep learning algorithm. This is easier than in-hand image analysis because the object is not occluded inside a hand. A fourth input is given to the algorithm in addition to the three typical RGB inputs. The fourth channel is the background information. The output of the shelf or semantic diffing is input again to the second classification model (time-series analysis model).

Semantic diffing in this approach includes the following steps:
1. Images from a camera are compared to earlier images from the same camera.
2. Each corresponding pixel between the two images is compared via a Euclidean distance in RGB space.
3. Distances above a certain threshold are marked, resulting in a new image of just marked pixels.
4. A collection of image morphology filters are used to remove noise from the marked image.
5. We then search for large collections of marked pixels and form bounding boxes around them.
6. For each bounding box we then look at the original pixels in the two images to get two image snapshots.
7. These two image snapshots are then pushed into a CNN trained to classify whether the image region represents an item being taken or an item being placed and what the item is.

3. Store Audit

An inventory of each shelf is maintained by the system. It is updated as items are picked up by the customers. At any point in time, the system is able to generate an audit of store inventory.

4. Multiple Items in Hand

Different images are used for multiple items. Two items in the hand are treated differently as compared to one. Some algorithms can predict only one item but not multiple numbers of an item. Therefore, the CNNs are trained so the algorithms for "two" quantities of the items can be executed separately from a single item in the hand.

5. Data Collection System

Predefined shopping scripts are used to collect good quality data of images. These images are used for training of algorithms.

5.1 Shopping Scripts

Data collection includes the following steps:
1. A script is automatically generated telling a human actor what actions to take.
2. These actions are randomly sampled from a collection of actions including: take item X, place item X, hold item X for Y seconds.
3. While performing these actions the actors move and orient themselves in as many ways as possible while still succeeding at the given action.
4. During the sequences of actions a collection of cameras record the actors from many perspectives.
5. After the actors have finished the script, the camera videos are bundled together and saved along with the original script.
6. The script serves as an input label to machine learning models (such as the CNNs) that train on the videos of actors.

6. Product Line

The system and parts thereof can be used for cashier-less checkout, supported by the following apps.

6.1 Store App

The Store App has several main capabilities; providing data analytic visualizations, supporting loss prevention, and providing a platform to assist customers by showing the retailer where people are in the store and what merchandise they have collected. Permission levels and app access to employees can be dictated at the retailer's discretion.

6.1.1 Standard Analytics

Data is collected by the platform and can be used in a variety of ways.
1. The derivative data is used to perform various kinds of analytics on stores, the shopping experiences they provide, and customer interactions with products, environment, and other people.
   a. The data is stored and used in the background to perform analyses of the store and customer interactions. The Store App will display some of the visualizations of this data to retailers. Other data is stored and queried when the data point is desired. A frontend system for analytics on PC/Mac/online portal is on the roadmap for future development.

2. Heat Maps:

The platform visualizes a retailer's floor plan, shelf layouts, and other store environments with overlays showing levels of various kinds of activity.

1. Examples:
   1. Maps for places people walk past, but don't handle any of the products.
   2. Maps for where on the floor people stand when interacting with products.
   3. Misplaced Items:

The platform tracks all of a store's SKUs. When an item gets put in the incorrect place, the platform will know where that item is and build a log. At some threshold, or immediately, store employees may be alerted to the misplaced item. Alternatively, the staff may access the Misplaced Item Map in the Store App. When convenient, staff can then quickly locate and correct misplaced items.

6.1.2 Standard Assist

The Store App will display a store's floor plan.

It will display a graphic to represent each person in the store.

When the graphic is selected, via touch, click, or other means, pertinent information to store employees will be displayed. For example: Shopping Cart items (items they have collected) will appear in a list.

If the platform has a confidence level below a predetermined threshold for a particular item(s) and for a period of time that is in a person's possession (Shopping Cart), their graphic (currently a dot) will indicate the difference. Currently the app uses a color change. Green indicates high confidence and yellow/orange indicates lower confidence.

Store employees with the Store App can be notified of the lower confidence. They can go make sure the customer's Shopping Cart is accurate.

Through the Store App, employees of the retailer will be able to adjust a customer's Shopping Cart items (add or delete).

6.1.3 Standard LP

If a shopper is using the Shopper App, they simply exit the store and are charged. However, if they are not, they will need to use the Guest App to pay for the items in their Shopping Cart.

If the shopper bypasses the Guest App on their way out of the store, their graphic indicates they must be approached before exiting. Currently the App uses a change of color to red. Staff also receive a notification of potential loss.

Through the Store App, employees of the retailer will be able to adjust a customer's Shopping Cart items (add or delete).

6.2 Non-Store App

The following analytic features represent additional capabilities of the platform. These analytics, however, are not available on the Store App. They are available through the backend system. The ability to access through a frontend experience for PC/Mac or via online portal is built part of the development roadmap.

6.2.1 Standard Analytics

1. Product Interactions:

Granular breakdown of product interactions such as:
   a. Interaction time to conversion ratios for each product.
   b. AB comparisons (color, style, etc.). Some of the smaller products on display have multiple options like colors, flavors, etc.
      Is the rose gold handled more than the silver?
      Do blue cans attract more interactions than red ones?

2. Directional Impressions:

Know the difference between a location based impression and where the shopper's gaze is. If they are looking at a product that is 15 feet away, for 20 seconds, the impression should not count for where they are, but for where they are looking.

3. Customer Recognition:

Remember repeat shoppers and their associated email address (collected in a variety of ways by the retailer) and shopping profiles. The current system would require them to opt in each time they visit, but will allow for auto recognition in the future.

4. Group Dynamics:

Decide when a shopper is watching someone else interact with a product.
   Answer whether that person interacts with the product afterwards?
   Did those people enter the store together, or are they likely strangers?
   Do individuals or groups of people spend more time in the store?

5. Customer Touchback:

Offer customers targeted information, post store experience. This feature may have a slightly different implementation with each retailer depending on particular practices and policies. It may require integration and/or development from the retailer to adopt the feature.
   Shoppers would be asked if they wished to receive notifications about products they might be interested in. That step may be integrated with the store's method of collecting emails.
   After leaving the store, a customer may receive an email with the products they spent time with at the store. An interaction threshold for duration, touch, and sight (direction impressions) will be decided. When the threshold is met, the products would make it to her list and be sent to her soon after leaving the store.
   Additionally, or alternatively, the shopper could be sent an email a period of time later that offered product(s) on sale or other special information. These products will be items they expressed interest in, but did not purchase.

6.3 Guest App

The Shopper App automatically checks people out when they exit the store. However, the platform does not require shoppers to have or use the Shopper App to use the store.

When a shopper/person does not have or use the Shopper App they walk up to a kiosk (an iPad/tablet or other screen) or they walk up to a pre-installed self-checkout machine. The display, integrated with the platform, will automatically display the customer's Shopping Cart.

The shopper will have the opportunity to review what is displayed. If they agree with the information on the display they can either enter cash into the machine (if that capability is built into the hardware (e.g. self-checkout machines)) or they swipe their credit or debit card. They can then exit the store.

If they disagree with the display, store staff is notified by their selection to challenge through a touch screen, button, or other means. (see the Store Assist under the Store App)

6.4 Shopper App

Through use of an app, the Shopper App, the customer can exit the store with merchandise and automatically be charged and given a digital receipt. The shopper must open their app at any time while within the store's shopping area. The platform will recognize a unique image that is displayed on the shopper's device. The platform will tie them to their account (Customer Association), and regardless if they keep the app open or not, will be able to remember who they are throughout their time in the store's shopping area.

As the shopper gathers items, the Shopper App will display the items in shopper's Shopping Cart. If the shopper wishes, they can view product information about each item they pick up (i.e. gets added to their shopping cart). Product information is stored either with the store's systems or added to a platform. The ability for updating that information, such as offering product sales or displaying prices, is an option the retailer can request/purchase or develop.

When a shopper puts an item down, it is removed from their Shopping Cart on the backend and on the Shopper App.

If the Shopper App is opened, and then closed after Customer Association is completed, the Platform will maintain the shopper's Shopping Cart and correctly charge them once they exit the store.

The Shopper App also has mapping information on its development roadmap. It can tell a customer where to find items in the store if the customer requests the information by typing in the item being sought. At a later date, we will take a shopper's shopping list (entered into the app manually or through other intelligent systems) and display the fastest route through the store to collect all the desired items. Other filters, such as 'Bagging Preference' may be added. The Bagging Preference filter allows a shopper to not follow the fastest route, but to gather sturdier items first, then more fragile items later.

7. Types of Customers

Member customer—First type of customer logs into the system using an app. The customer is prompted with a picture and when s/he clicks on it, the system links that to the internal id of that customer. If the customer has an account, then the account is charged automatically when the customer walks out of the store. This is the membership based store.

Guest customer—Not every store will have membership, or customers may not have a smartphone or a credit card. This type of customer will walk up to a kiosk. The kiosk will display the items that the customer has and will ask the customer to put in the money. The kiosk will already know about all the items that the customer has bought. For this type of customer, the system is able to identify if the customer has not paid for the items in the shopping cart, and prompt the checker at the door, before the customer reaches there, to let the checker know about unpaid items. The system can also prompt for one item that has not been paid for, or the system having low confidence about one item. This is referred to as predictive pathfinding.

The system assigns color codes (green and yellow) to the customers walking in the store based on the confidence level. The green color coded customers are either logged into the system or the system has a high confidence about them. Yellow color coded customers have one or more items that are not predicted with high confidence. A clerk can look at the yellow dots and click on them to identify problem items, walk up to the customer and fix the problem.

8. Analytics

A host of analytics information is gathered about the customer such as how much time a customer spent in front of a particular shelf. Additionally, the system tracks the location where a customer is looking (impression on the system), and the items which a customer picked and put back on the shelf. Such analytics are currently available in ecommerce but not available in retail stores.

9. Functional Modules

The following is a list of functional modules:

1. System capturing array of images in store using synchronized cameras.
2. System to identify joints in images, and sets of joints of individual persons.
3. System to create new persons using joint sets.
4. System to delete ghost persons using joint sets.
5. System to track individual persons over time by tracking joint sets.
6. System to generate region proposals for each person present in the store indicating the SKU number of item in the hand (WhatCNN).
7. System to perform get/put analysis for region proposals indicating if the item in the hand was picked up or placed onto the shelf (WhenCNN).
8. System to generate inventory array per person using region proposals and get/put analysis (Outputs of WhenCNN combined with heuristics, stored joint locations of persons, and precomputed map of items on the store shelves).
9. System to identify, track and update locations of misplaced items on shelves.
10. System to track changes (get/put) to items on shelves using pixel-based analysis.
11. System to perform inventory audit of store.
12. System to identify multiple items in hands.
13. System to collect item image data from store using shopping scripts.
14. System to perform checkout and collect payment from member customers.
15. System to perform checkout and collect payment from guest customers.
16. System to perform loss-prevention by identifying un-paid items in a cart.
17. System to track customers using color codes to help clerks identify incorrectly identified items in a customer's cart.
18. System to generate customer shopping analytics including location-based impressions, directional impressions, AB analysis, customer recognition, group dynamics etc.
19. System to generate targeted customer touchback using shopping analytics.
20. System to generate heat map overlays of the store to visualize different activities.

The technology described herein can support Cashier-free Checkout. Go to Store. Take Things. Leave.

Cashier-free Checkout is a pure machine vision and deep learning based system. Shoppers skip the line and get what they want faster and easier. No RFID tags. No changes to store's backend systems. Can be integrated with $3^{rd}$ party Point of Sale and Inventory Management systems.

Real time 30 FPS analysis of every video feed.

On-premise, cutting edge GPU cluster.

Recognizes shoppers and the items they interact with.

No internet dependencies in example embodiment.

Multiple state-of-the-art deep learning models, including proprietary custom algorithms, to resolve gaps in machine vision technology for the first time.

Techniques & Capabilities include the following:
1. Standard Cognition's machine learning pipeline solves:
   a) People Detection.
   b) Entity Tracking.
   c) Multicamera Person Agreement.
   d) Hand Detection.
   e) Item Classification.
   f) Item Ownership Resolution.

Combining these techniques, we can:
1. Keep track of all people throughout their shopping experience in real time.
2. Know what shoppers have in their hand, where they stand, and what items they place back.
3. Know which direction shoppers are facing and for how long.
4. Recognize misplaced items and perform 24/7 Visual Merchandizing Audits.

Can detect exactly what a shopper has in their hand and in their basket.

Learning Your Store:

Custom neural networks trained on specific stores and items. Training data is reusable across all store locations.

Standard Deployment:

Ceiling cameras must be installed with double coverage of all areas of the store. Requires between 2 and 6 cameras for a typical aisle.

An on-premise GPU cluster can fit into one or two server racks in a back office.

Example systems can be integrated with or include Point of Sale and Inventory Management systems.

A first system, method and computer program product for capturing arrays of images in stores using synchronized cameras.

A second system, method and computer program product to identify joints in images, and sets of joints of individual persons.

A third system, method and computer program product to create new persons using joint sets.

A fourth system, method and computer program product to delete ghost persons using joint sets.

A fifth system, method and computer program product to track individual persons over time by tracking joint sets.

A sixth system, method and computer program product to generate region proposals for each person present in the store indicating the SKU number of an item in the hand (WhatCNN).

A seventh system, method and computer program product to perform get/put analysis for region proposals indicating if the item in the hand was picked up or placed onto the shelf (WhenCNN).

An eighth system, method and computer program product to generate an inventory array per person using region proposals and get/put analysis (e.g. Outputs of WhenCNN combined with heuristics, stored joint locations of persons, and precomputed map of items on the store shelves).

A ninth system, method and computer program product to identify, track and update locations of misplaced items on shelves.

A tenth system, method and computer program product to track changes (get/put) to items on shelves using pixel-based analysis.

An eleventh system, method and computer program product to perform inventory audits of a store.

A twelfth system, method and computer program product to identify multiple items in hands.

A thirteenth system, method and computer program product to collect item image data from a store using shopping scripts.

A fourteenth system, method and computer program product to perform checkout and collect payment from member customers.

A fifteenth system, method and computer program product to perform checkout and collect payment from guest customers.

A sixteenth system, method and computer program product to perform loss-prevention by identifying un-paid items in a cart.

A seventeenth system, method and computer program product to track customers using for example color codes to help clerks identify incorrectly identified items in a customer's cart.

An eighteenth system, method and computer program product to generate customer shopping analytics including one or more of location-based impressions, directional impressions, AB analysis, customer recognition, group dynamics etc.

A nineteenth system, method and computer program product to generate targeted customer touchback using shopping analytics.

A twentieth system, method and computer program product to generate heat map overlays of the store to visualize different activities.

A twenty first system, method and computer program for Hand Detection.

A twenty second system, method and computer program for Item Classification.

A twenty third system, method and computer program for Item Ownership Resolution.

A twenty fourth system, method and computer program for Item People Detection.

A twenty fifth system, method and computer program for Item Entity Tracking.

A twenty sixth method and computer program for Item Multicamera Person Agreement.

A twenty seventh system, method and computer program product for cashier-less checkout substantially as described herein.

Combinations of any of systems 1-26 with any other system or systems in systems 1-26 listed above.

Described herein is a method for tracking puts and takes of inventory items by subjects in an area of real space, comprising:
   using a plurality of cameras to produce respective sequences of images of corresponding fields of view in the real space, the field of view of each camera overlapping with the field of view of at least one other camera in the plurality of cameras;
   receiving the sequences of images from the plurality of cameras, and using first image recognition engines to process images to generate first data sets that identify subjects and locations of the identified subjects in the real space;
   processing the first data sets to specify bounding boxes which include images of hands of identified subjects in images in the sequences of images;
   receiving the sequences of images from the plurality of cameras, and processing the specified bounding boxes in the images to generate a classification of hands of the identified subjects using second image recognition engines, the classification including whether the identified subject is holding an inventory item, a first nearness classification indicating a location of a hand of the identified subject relative to a shelf, a second nearness classification indicating a location of a hand of the identified subject relative to a body of the identified subject, a third nearness classification indicating a location of a hand of the identified subject relative to a basket associated with an identified subject, and an identifier of a likely inventory item; and processing the classifications of hands for sets of images in the sequences of images of identified subjects to detect takes of inventory items by identified subjects and puts of inventory items on inventory display structures by identified subjects.

In this described method the first data sets can comprise for each identified subject sets of candidate joints having coordinates in real space.

This described method can include processing the first data sets to specify bounding boxes includes specifying bounding boxes based on locations of joints in the sets of candidate joints for each subject.

In this described method one or both of the first and the second image recognition engines can comprise convolutional neural networks.

This described method can include processing the classifications of bounding boxes using convolutional neural networks.

A computer program product and products are described which include a computer readable memory comprising a non-transitory data storage medium, and computer instructions stored in the memory executable by a computer to track puts and takes of inventory items by subjects in an area of real space by any of the herein described processes.

A system is described comprising a plurality of cameras producing a sequences of images including a hand of a subject; and a processing system coupled to the plurality of cameras, the processing system including a hand image recognition engine, receiving the sequence of images, to generate classifications of the hand in time sequence, and logic to process the classifications of the hand from the sequence of images to identify an action by the subject, wherein, the action is one of puts and takes of inventory items.

The system can include logic to identify locations of joints of the subject in the images in the sequences of images, and to identify bounding boxes in corresponding images that include the hands of the subject based on the identified joints.

A computer program listing appendix accompanies the specification, and includes portions of an example of a computer program to implement certain parts of the system provided in this application. The appendix includes examples of heuristics to identify joints of subjects and inventory items. The appendix presents computer program code to update a subject's shopping cart data structure. The appendix also includes a computer program routine to calculate learning rate during training of a convolutional neural network. The appendix includes a computer program routine to store classification results of hands of subjects from a convolutional neural network in a data structure per hand per subject per image frame from each camera.

What is claimed is:

1. A system for tracking subjects, in an area of real space, comprising:
    a processing system receiving a plurality of synchronized sequences of images of respective fields of view in the real space at image capturing cycles, the processing including:
        logic to process images in a first set of sequences including more than one member in the plurality of synchronized sequences at a first image capturing cycle at a first time to identify locations of a plurality of tracked subjects by identifying features of the tracked subjects, the features having first locations represented by positions in three dimensions of the area of real space;
        logic to process images in a second set of sequences including more than one member in the plurality of synchronized sequences at a second image capturing cycle at a second time to identify candidate features for matching with features of the plurality of tracked subjects, the candidate features having second locations represented by positions in three dimensions of the area of real space; and
        logic to track movement of the plurality of tracked subjects by matching the features of particular subjects from the first image capturing cycle with the candidate features in the second image capturing cycle and to update the identified locations of subjects in the plurality of tracked subjects with locations of the candidate features, wherein the features comprise joints of a plurality of different types, and subjects in the plurality of subjects are represented by constellations of said joints, and including logic to update the constellations of joints representing tracked subjects using the candidate features.

2. The system of claim 1, wherein the first set of sequences includes at least a first sequence and a second sequence in the plurality of synchronized sequences and the second set of sequences includes at least the second sequence and a third sequence not in the first set in the plurality of synchronized sequences.

3. The system of claim 2, wherein the field of view of the images of the first sequence does not overlap with the field of view of the images of the third sequence.

4. The system of claim 1, wherein the first set of sequences includes at least a first sequence and a second sequence in the plurality of synchronized sequences and the second set of sequences includes at least a third sequence and a fourth sequence in the plurality of synchronized sequences not in the first set.

5. The system of claim 4, wherein the images in the first sequence and the second sequence have overlapping fields of view and the images in the third sequence and the fourth sequence have overlapping fields of view.

6. The system of claim 4, wherein the fields of view of the images in the first set do not overlap with the fields of view of the images in the second set.

7. The system of claim 1, wherein the logic that tracks movement of the plurality of tracked subjects includes logic that determines distances between the features of particular tracked subjects from the first image capturing cycle and the candidate features in the second image capturing cycle.

8. The system of claim 1, wherein the logic to process images in the first set of sequences includes image recognition engines configured to receive sequences of images to identify the features of the tracked subjects.

9. The system of claim 8, wherein the image recognition engines comprise convolutional neural networks.

10. A method for tracking subjects, in an area of real space, the method including:
    identifying locations of a plurality of tracked subjects by identifying features of the tracked subjects, the features having first locations represented by positions in three dimensions of the area of real space using data in a first set of sequences of images of respective fields of view including more than one member at a first image capturing cycle;

identifying candidate features for matching with features of the plurality of tracked subjects, the candidate features having second locations represented by positions in three dimensions of the area of real space using data in a second set of sequences of images of respective fields of view including more than one member at a second image capturing cycle;

tracking movement of the plurality of tracked subjects by matching the features of particular subjects from the first image capturing cycle with the candidate features in the second image capturing cycle; and updating the identified locations of subjects in the plurality of tracked subjects with locations of the candidate features, wherein the features comprise joints of a plurality of different types, and subjects in the plurality of subjects are represented by constellations of said joints, and including logic to update the constellations of joints representing tracked subjects using the candidate features.

11. The method of claim 10, wherein the first set of sequences of images includes at least a first sequence and a second sequence and the second set of sequences of images includes at least the second sequence and a third sequence not in the first set.

12. The method of claim 11, wherein the field of view of the first sequence in the first set of sequences of images does not overlap with the field of view of the third sequence in the second set of sequences of images.

13. The method of claim 10, wherein the first set of sequences of includes at least a first sequence and a second sequence and the second set of sequences of images includes at least a third sequence and a fourth sequence not in the first set.

14. The method of claim 13, wherein the first sequence and the second sequence in the first set of sequences of images have overlapping fields of view and the third sequence and the fourth sequence in the second set of sequences of images have overlapping fields of view.

15. The method of claim 13, wherein the fields of view of images in the first set of sequences of images do not overlap with the fields of view of sequences in the second set of sequences of images.

16. A non-transitory computer readable storage medium impressed with computer program instructions to track subjects, in an area of real space, the instructions, when executed on a processor, implement a method comprising:

identifying locations of a plurality of tracked subjects by identifying features of the tracked subjects, the features having first locations represented by positions in three dimensions of the area of real space using images in a first set of sequences of images of respective fields of view including more than one member at a first data capturing cycle;

identifying candidate features for matching with features of the plurality of tracked subjects, the candidate features having second locations represented by positions in three dimensions of the area of real space using images in a second set of sequences of images of respective fields of view including more than one member at a second data capturing cycle;

tracking movement of the plurality of tracked subjects by matching the features of particular subjects from the first data capturing cycle with the candidate features in the second data capturing cycle; and updating the identified locations of subjects in the plurality of tracked subjects with locations of the candidate features, wherein the features comprise joints of a plurality of different types, and subjects in the plurality of subjects are represented by constellations of said joints, and including updating the constellations of joints representing tracked subjects using the candidate features.

17. The non-transitory computer readable storage medium of claim 16, wherein the first set of sequences of images includes at least a first sequence and a second sequence, and the second set of sequences of images includes at least a third sequence and a fourth sequence not in the first set.

18. The non-transitory computer readable storage medium of claim 17, wherein the fields of view of sequences in the first set of sequences of images do not overlap with the fields of view of sequences in the second set of sequences of images.

19. The non-transitory computer readable storage medium of claim 16, wherein the tracking movement of the plurality of tracked subjects by matching the features of particular subjects from the first data capturing cycle with the candidate features in the second data capturing cycle, includes determining distances between the features of particular tracked subjects feature from the first data capturing cycle and the candidate features in the second data capturing cycle.

20. The non-transitory computer readable storage medium of claim 16, wherein the using images in the first set of sequences of images includes using image recognition engines to identify the features of the tracked subjects.

21. The system of claim 1 further including logic to identify new subjects using the candidate features not matched to particular subjects.

22. The method of claim 10, further including identifying new subjects using the candidate features not matched to particular subjects.

23. The non-transitory computer readable storage medium of claim 16, the implemented method further including identifying new subjects using the candidate features not matched to particular subjects.

24. The system of claim 1, wherein the logic to update the constellations comprises entity cohesion logic.

25. The method of claim 10, wherein said updating the constellations comprises using entity cohesion logic.

26. The non-transitory computer readable storage medium of claim 16, the implemented method further including updating the constellations using entity cohesion logic.

27. The system of claim 1, wherein said candidate features comprise foot joints.

28. The method of claim 10, wherein said candidate features comprise foot joints.

29. The non-transitory computer readable storage medium of claim 16, wherein said candidate features comprise foot joints.

30. A system for tracking subjects, in an area of real space, comprising:

a processing system receiving a plurality of synchronized sequences of images of respective fields of view in the real space at image capturing cycles, the processing including:

logic to process images in a first set of sequences including more than one member in the plurality of synchronized sequences at a first image capturing cycle to generate an array of joint data structures, the joint data structures in the array correspond to respective tracked subjects in the area of real space, the joint data structures map first locations of a plurality of joints of the respective subjects to positions in three dimensions of the area of real space and a timestamp;

logic to process images in a second set of sequences including more than one member in the plurality of synchronized sequences at a second image capturing cycle to identify candidate joints having second locations represented by positions in three dimensions of the area of real space and a timestamp; and logic to track movement of the tracked subjects by performing entity cohesion to match the candidate joints with joints in the joint data structures in the array of joint data structures, and update the joint data structures matched to the candidate joints with locations of the candidate joints.

* * * * *